United States Patent [19]

Schiebe et al.

[11] 4,430,702

[45] Feb. 7, 1984

[54] NETWORK ACCESS DEVICE

[75] Inventors: Lowell H. Schiebe, Brooklyn Center; Bruce E. Russo, Minneapolis; Edward V. Urness, Shoreview; William C. Hohn, St. Paul, all of Minn.

[73] Assignee: Control Data Corporation, Minneapolis, Minn.

[21] Appl. No.: 471,568

[22] Filed: Mar. 2, 1983

Related U.S. Application Data

[63] Continuation of Ser. No. 148,639, May 12, 1980, abandoned.

[51] Int. Cl.³ .............. G06F 15/16; G06F 13/00
[52] U.S. Cl. ..................................... 364/200
[58] Field of Search .................. 364/200, 900

[56] References Cited

U.S. PATENT DOCUMENTS

| | | | |
|---|---|---|---|
| 3,975,712 | 8/1976 | Hepworth et al. | 364/200 |
| 4,004,281 | 1/1977 | Bennett et al. | 364/200 |
| 4,016,548 | 4/1977 | Law et al. | 364/200 |
| 4,032,899 | 6/1977 | Jenny et al. | 364/200 |
| 4,062,059 | 12/1977 | Suzuki et al. | 364/200 |
| 4,071,887 | 1/1978 | Daly et al. | 364/200 |
| 4,074,352 | 2/1978 | Cook et al. | 364/200 |
| 4,228,496 | 10/1980 | Katzman et al. | 364/200 |
| 4,254,462 | 3/1981 | Raymond et al. | 364/200 |
| 4,261,033 | 4/1981 | Lemay et al. | 364/200 |
| 4,261,035 | 4/1981 | Raymond | 364/200 |
| 4,342,083 | 7/1982 | Freedman | 364/200 |

*Primary Examiner*—James D. Thomas
*Assistant Examiner*—David Y. Eng
*Attorney, Agent, or Firm*—William J. McGinnis; Joseph A. Genovese

[57] ABSTRACT

A network access device (NAD) is comprised of a data set for coupling to a data communication trunk, a trunk control unit (TCU) connected with the data set, a trunk control interface (TCI) connecting the TCU to an internal data bus, an internal memory, a microprocessor control and a device interface for connection to a computer or some computer peripheral device. The data set provides for two-way communication from the data trunk to the TCU. Various network access devices connected to the data trunk communicate with one another. Every normal communication between NADs includes a concurrent, predictable state change in both NADs. The response to a message from one NAD to another includes information concerning what occurred upon receipt of the message. Various latches, sequencers, microprocessor logic and registers provide for functions according to various input and output states of response.

18 Claims, 36 Drawing Figures

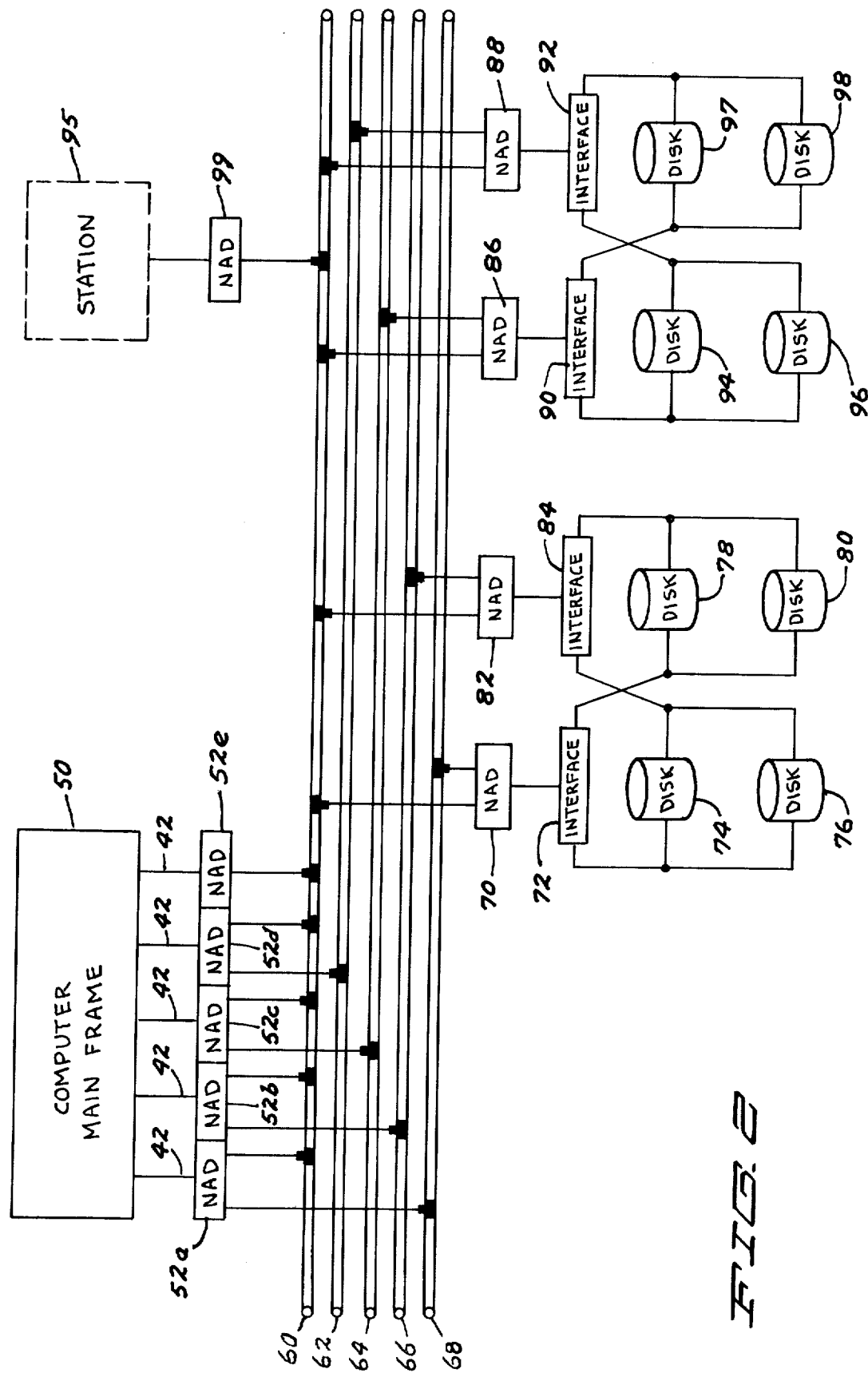

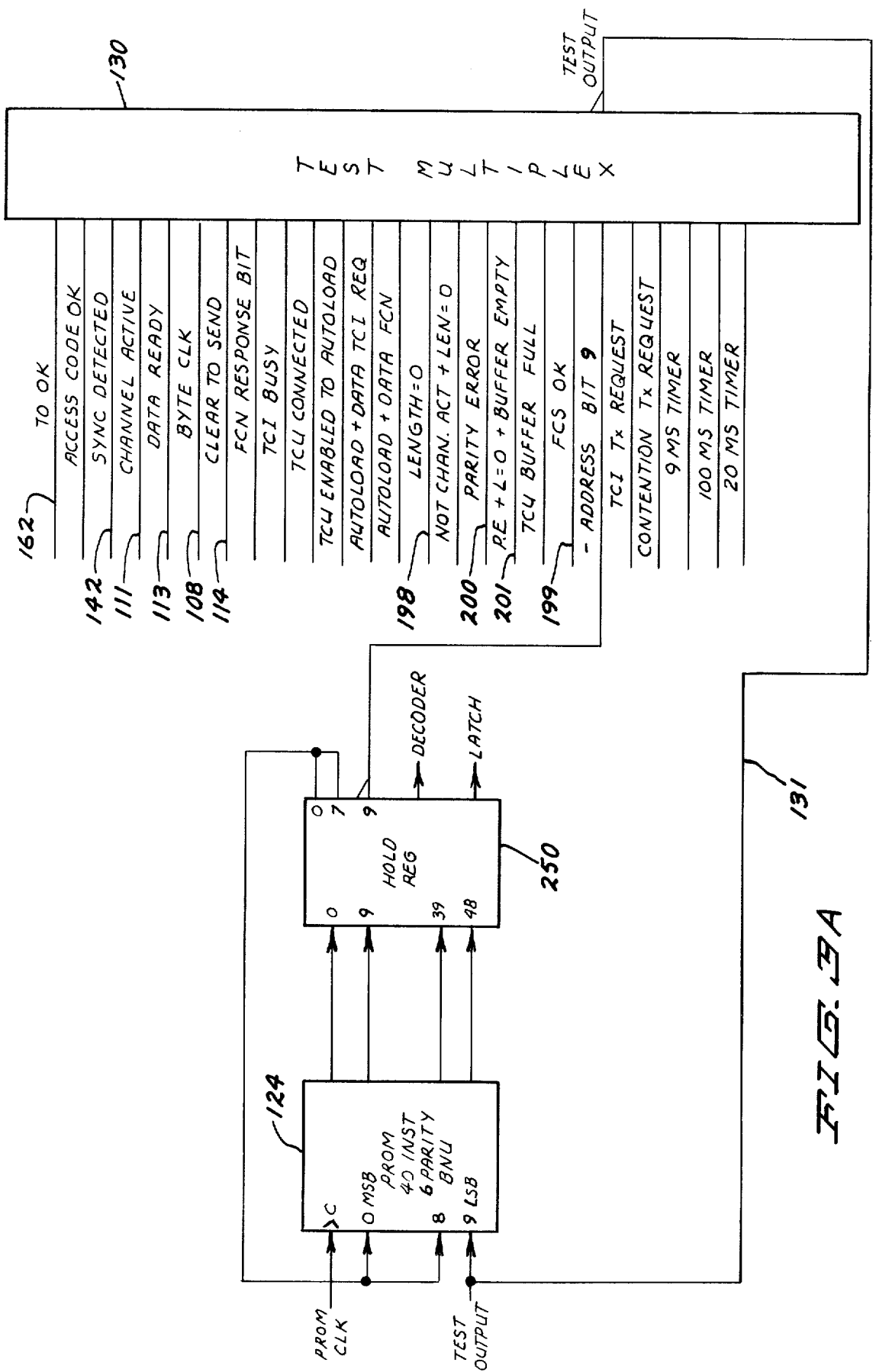

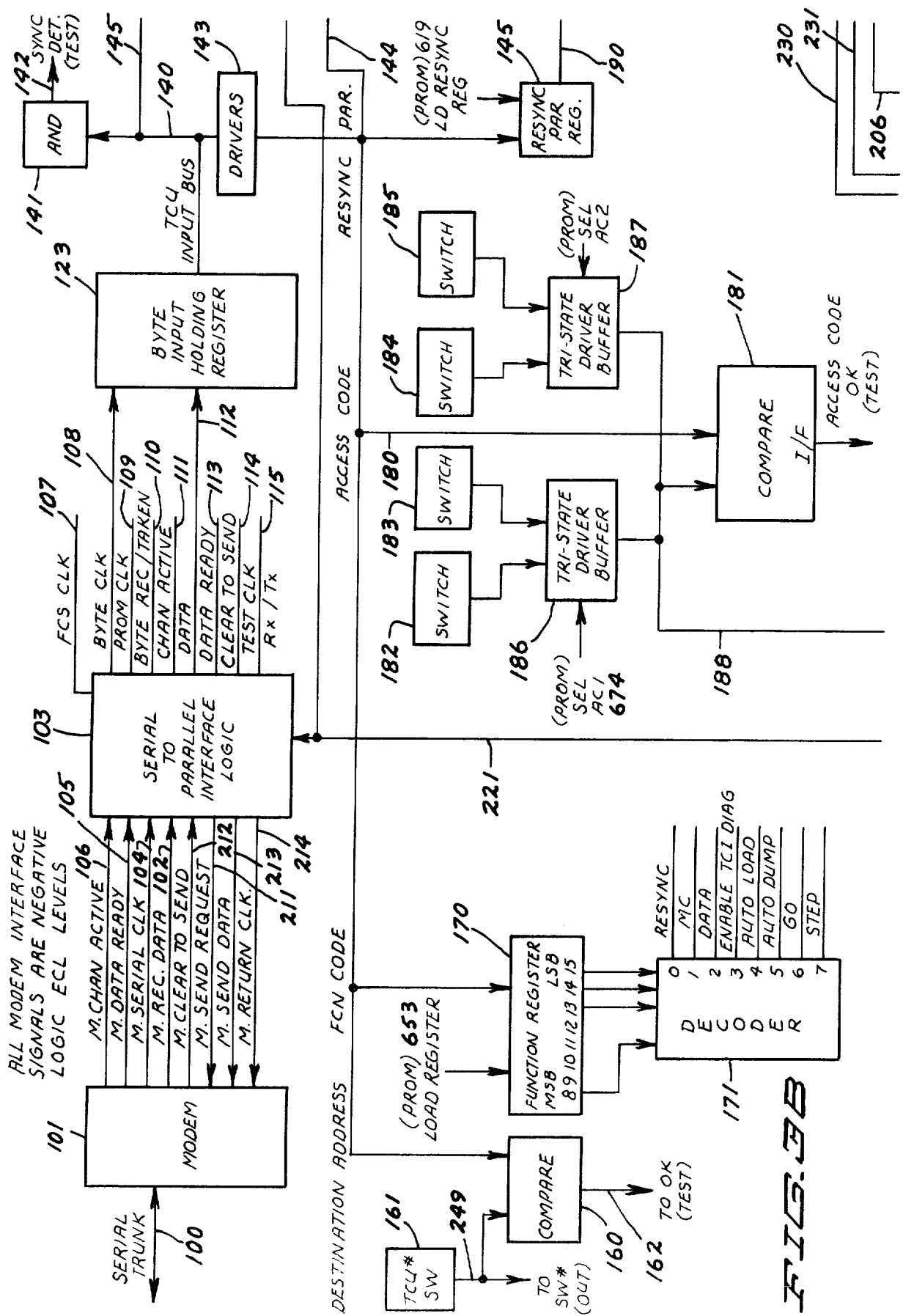

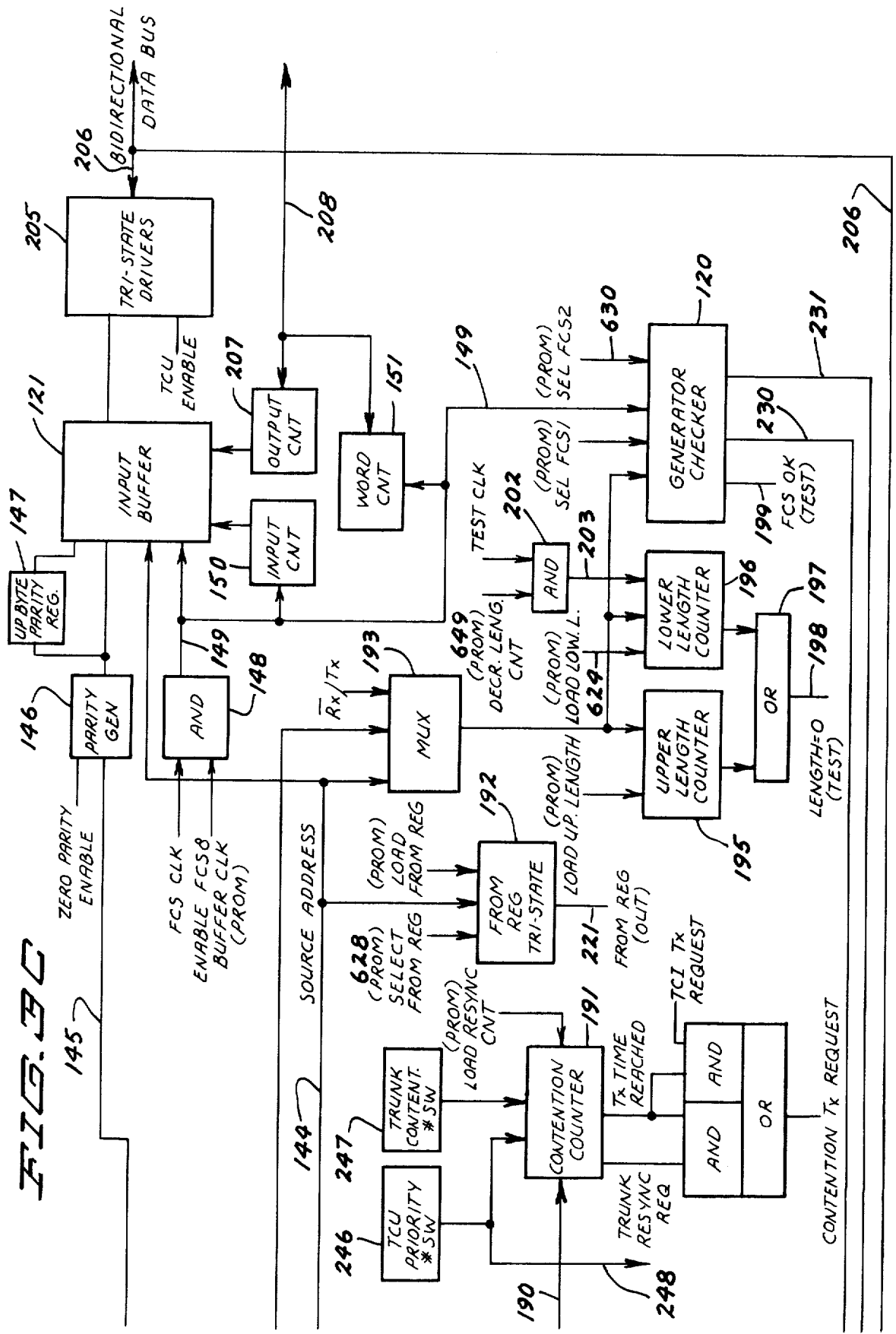

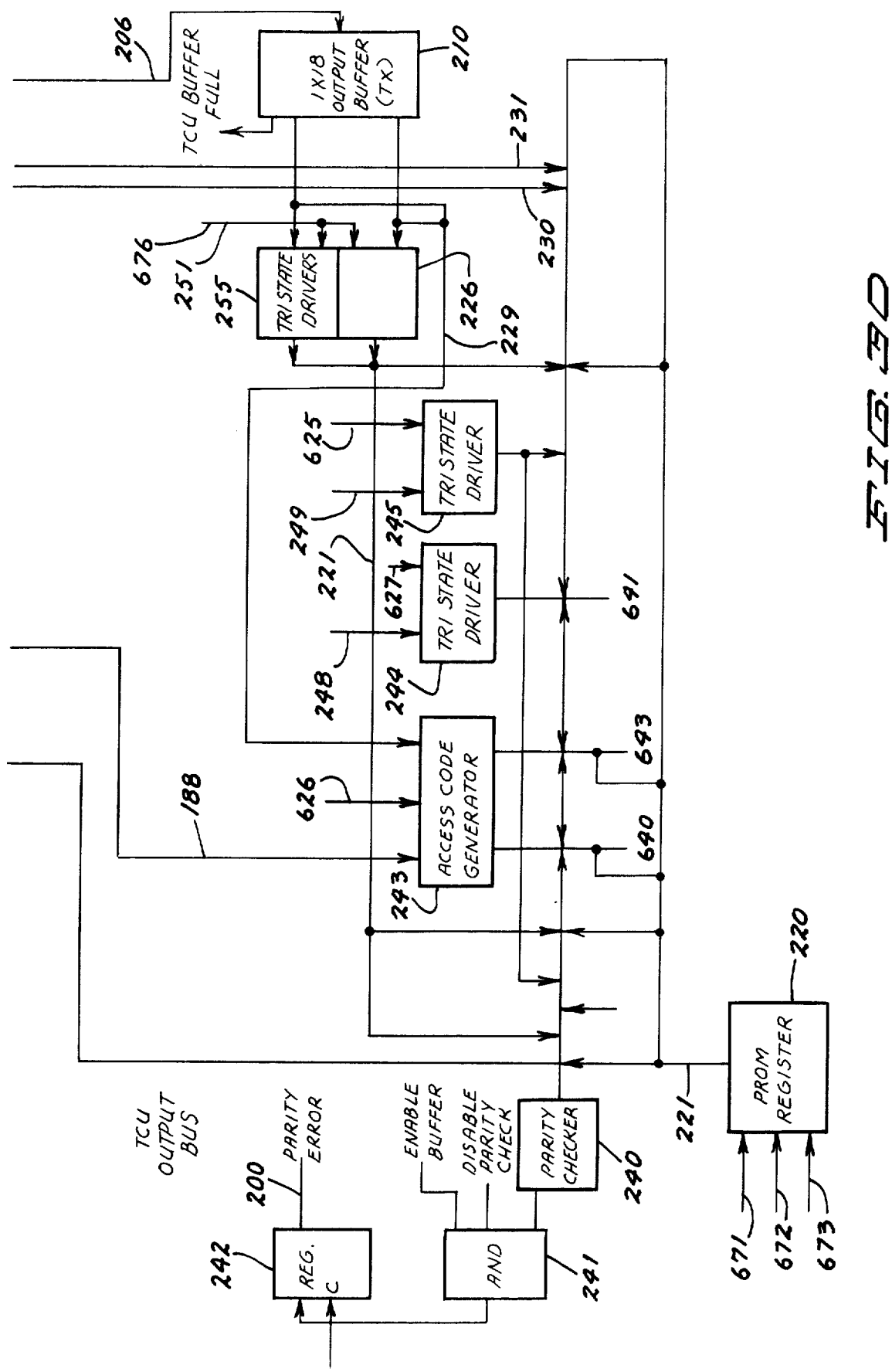

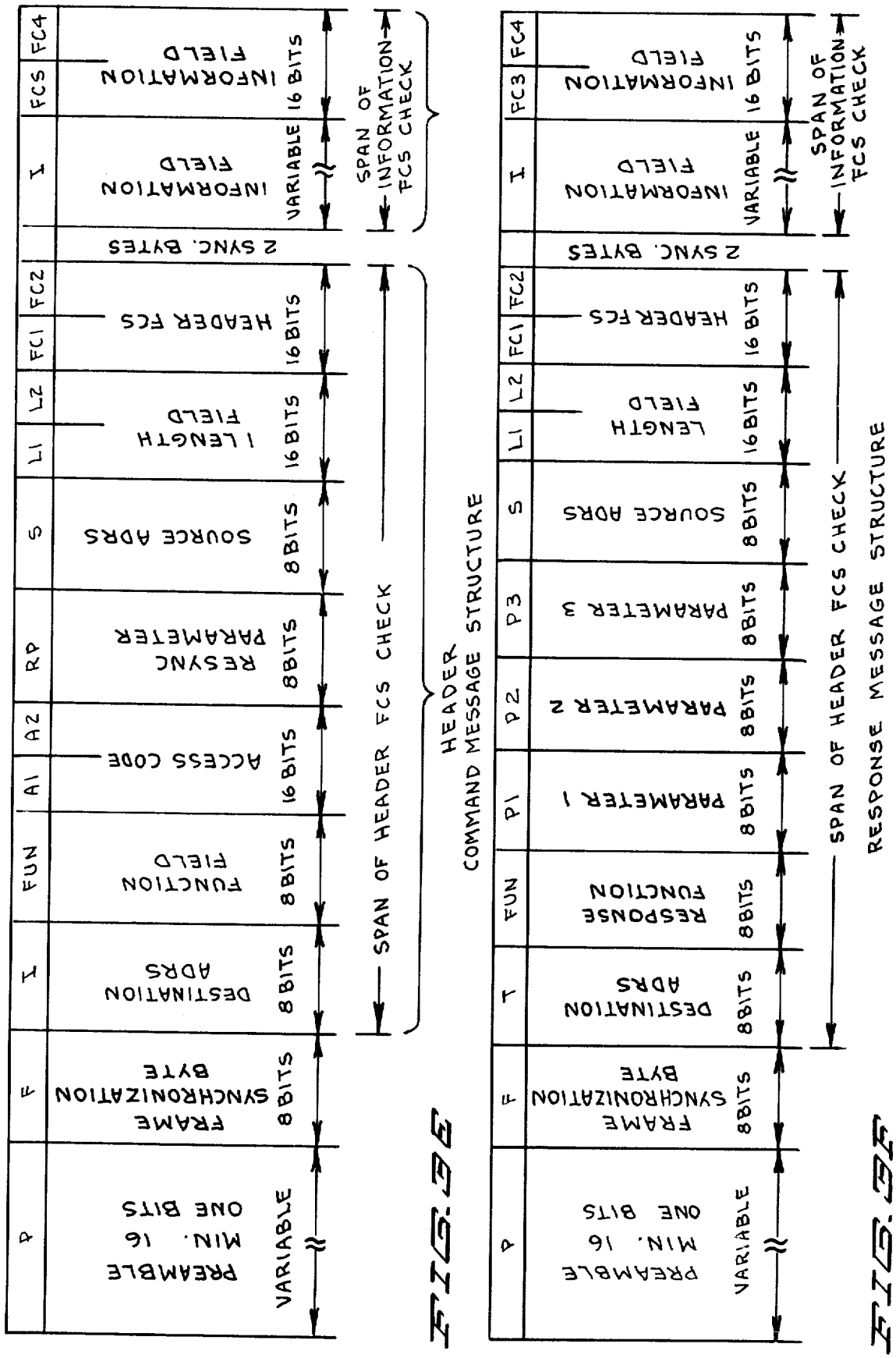

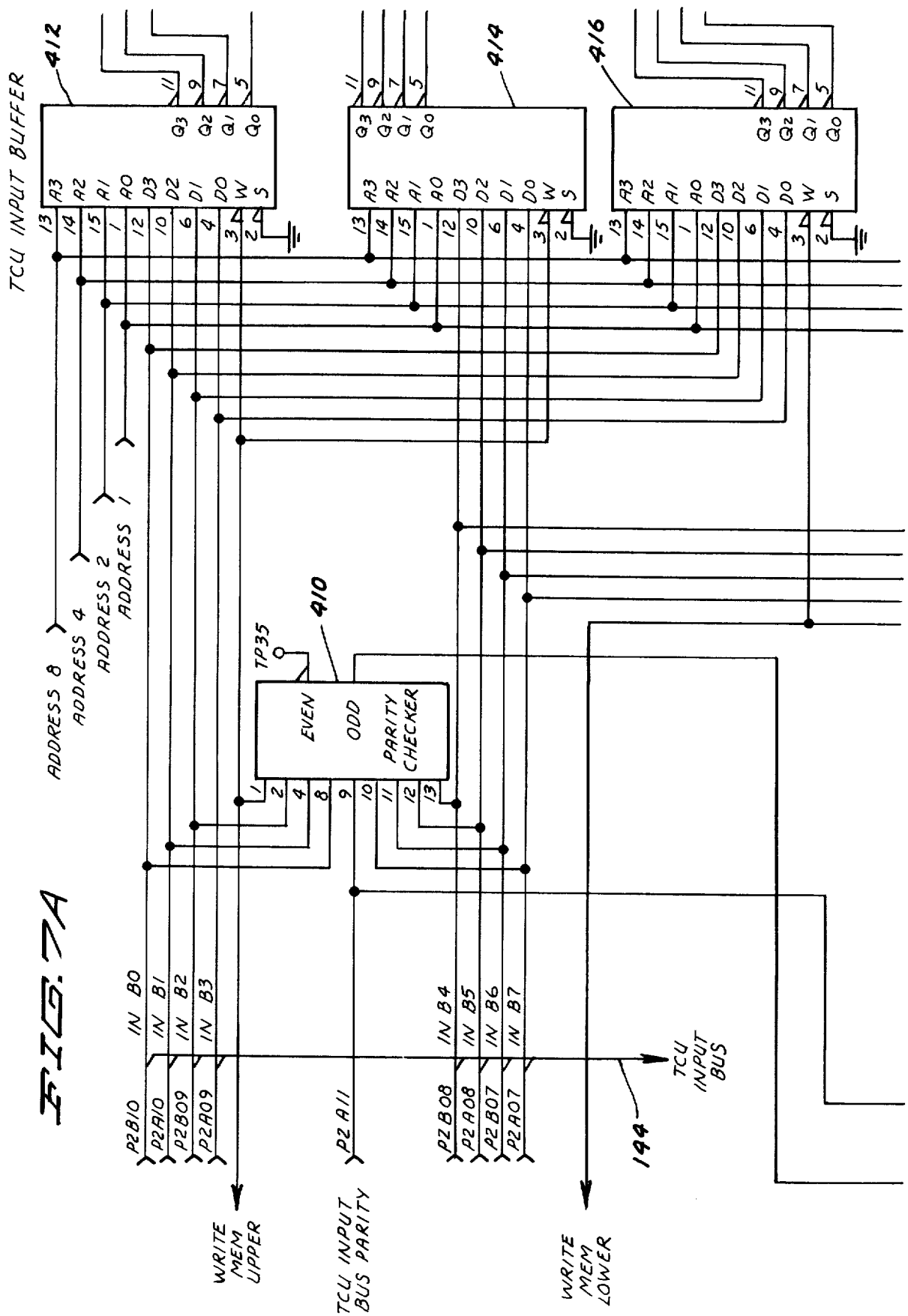

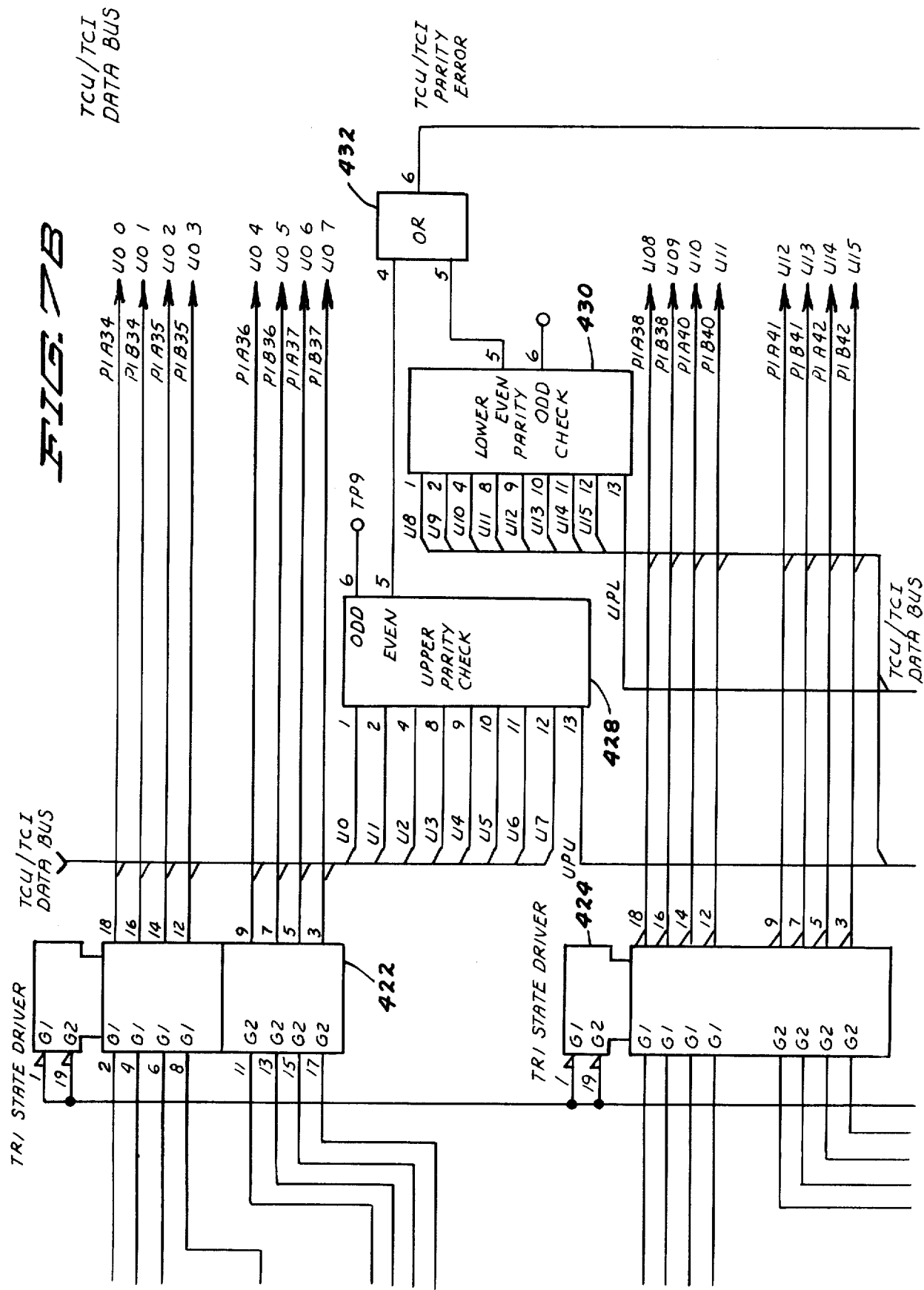

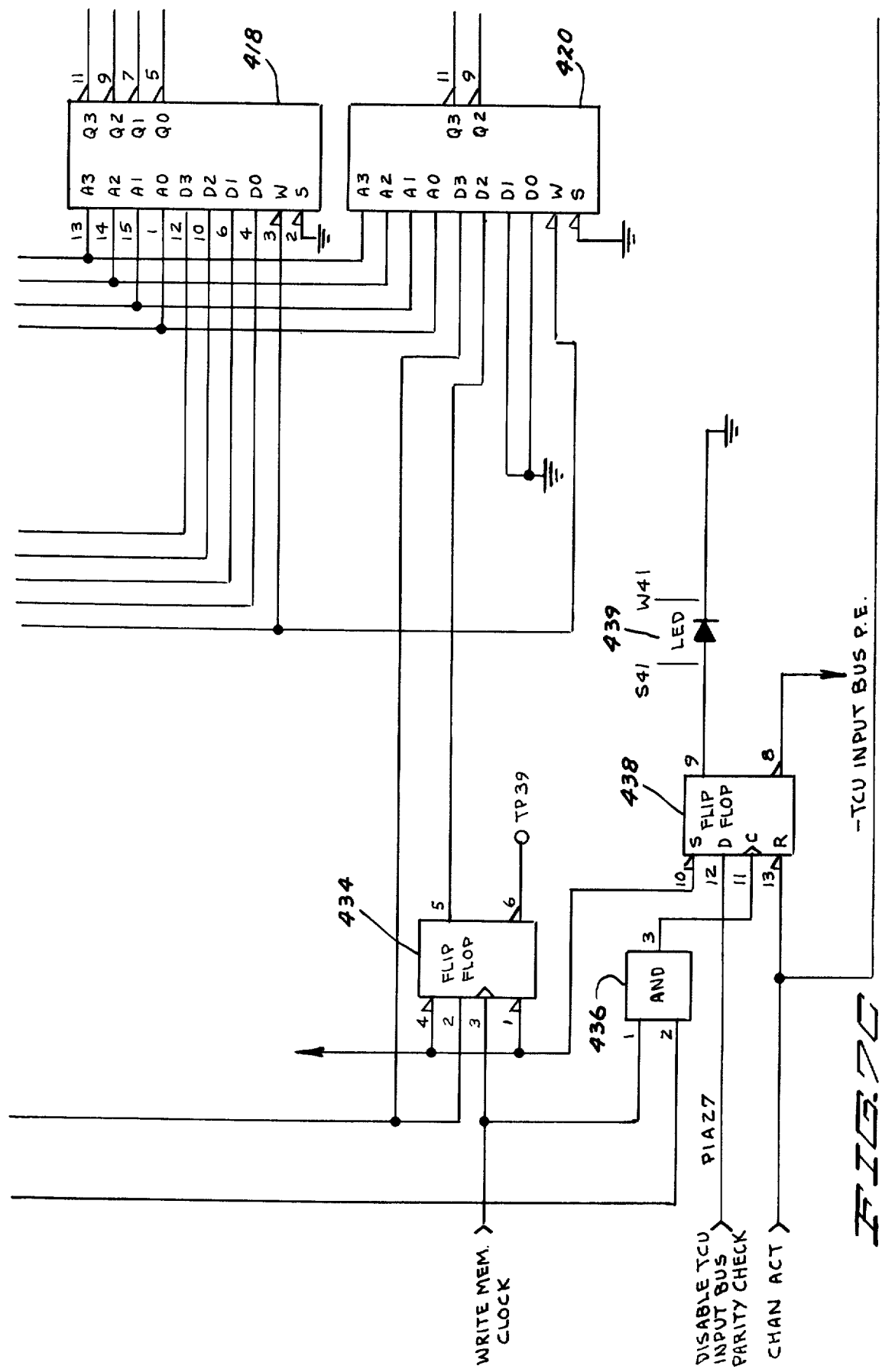

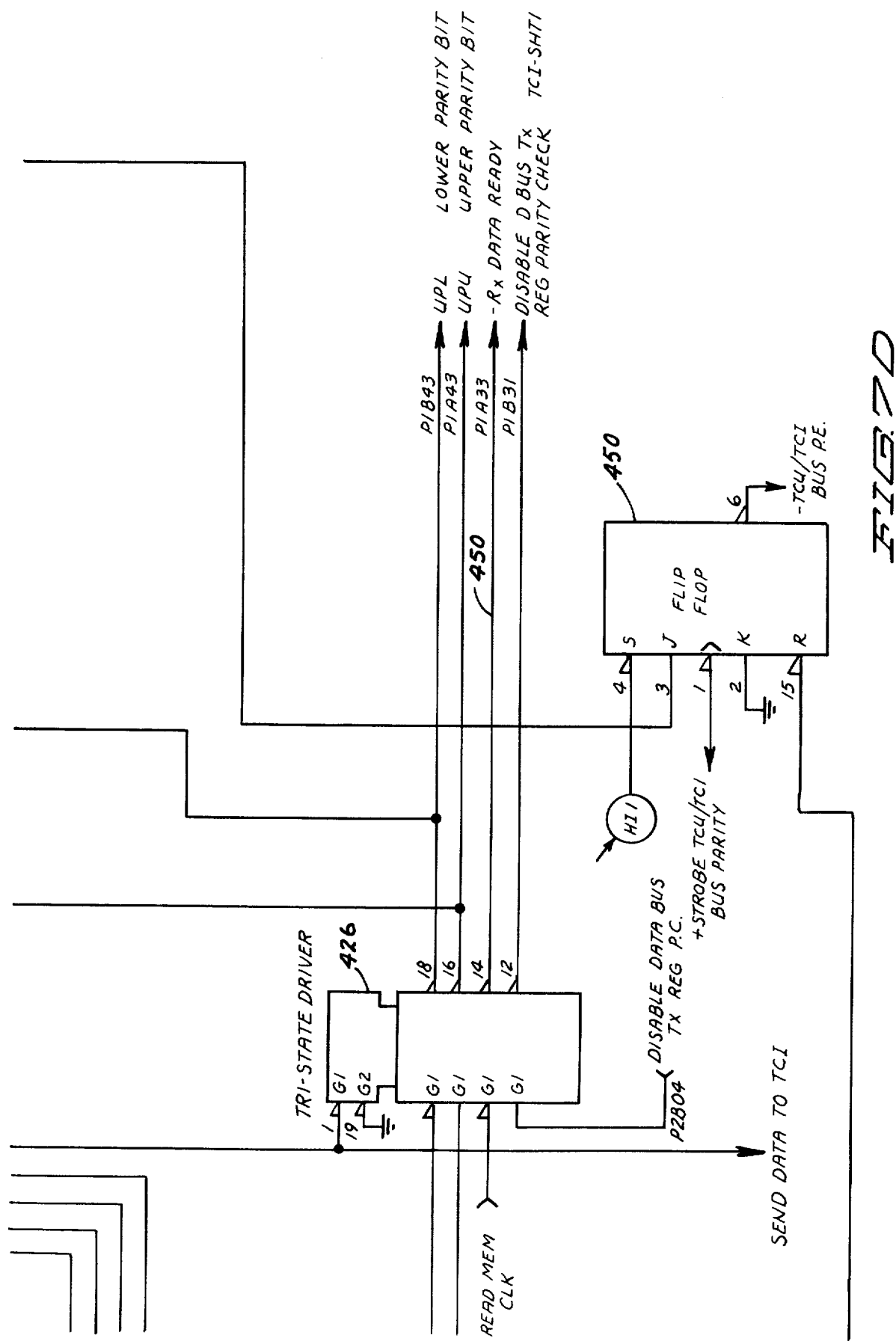

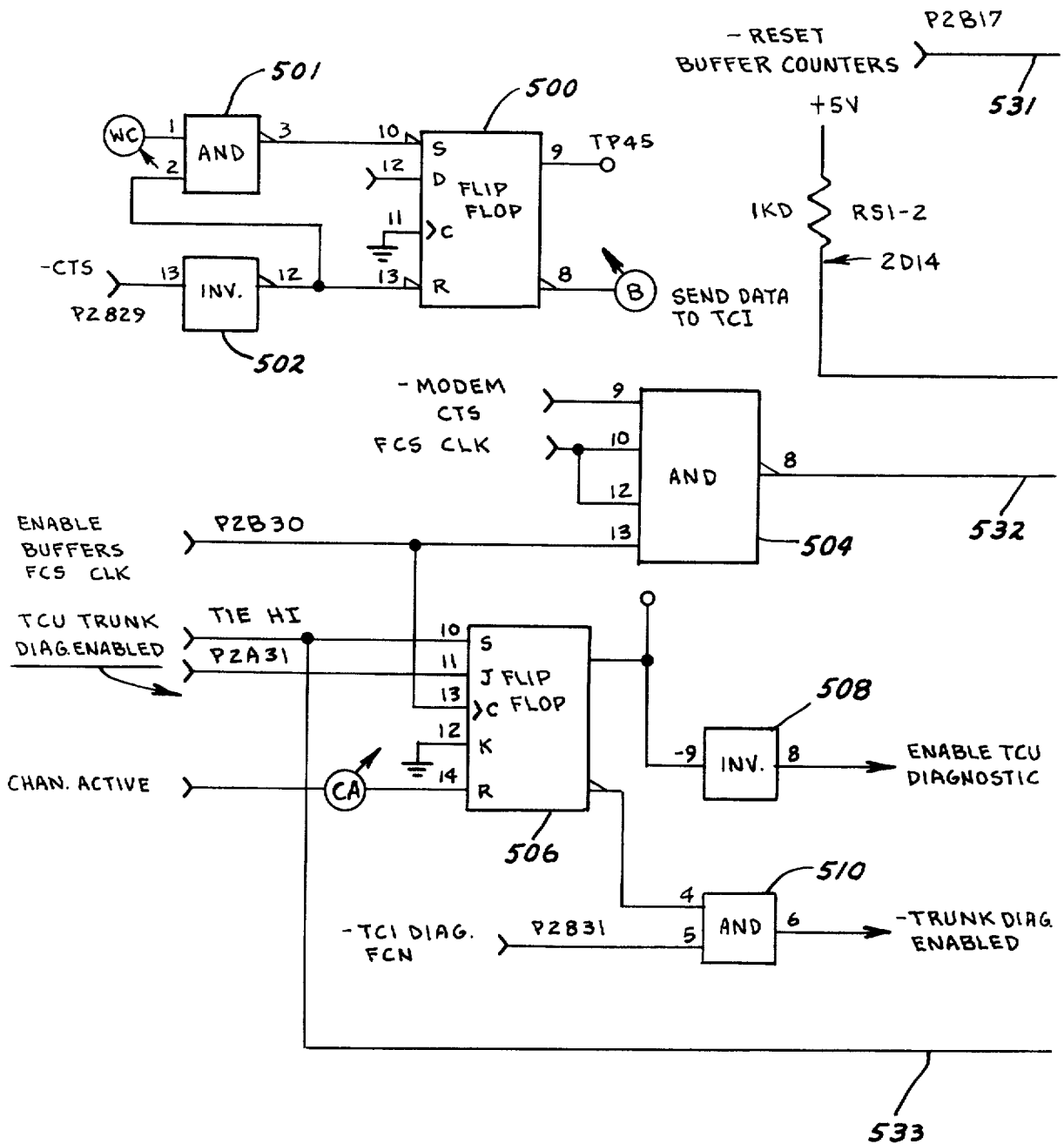

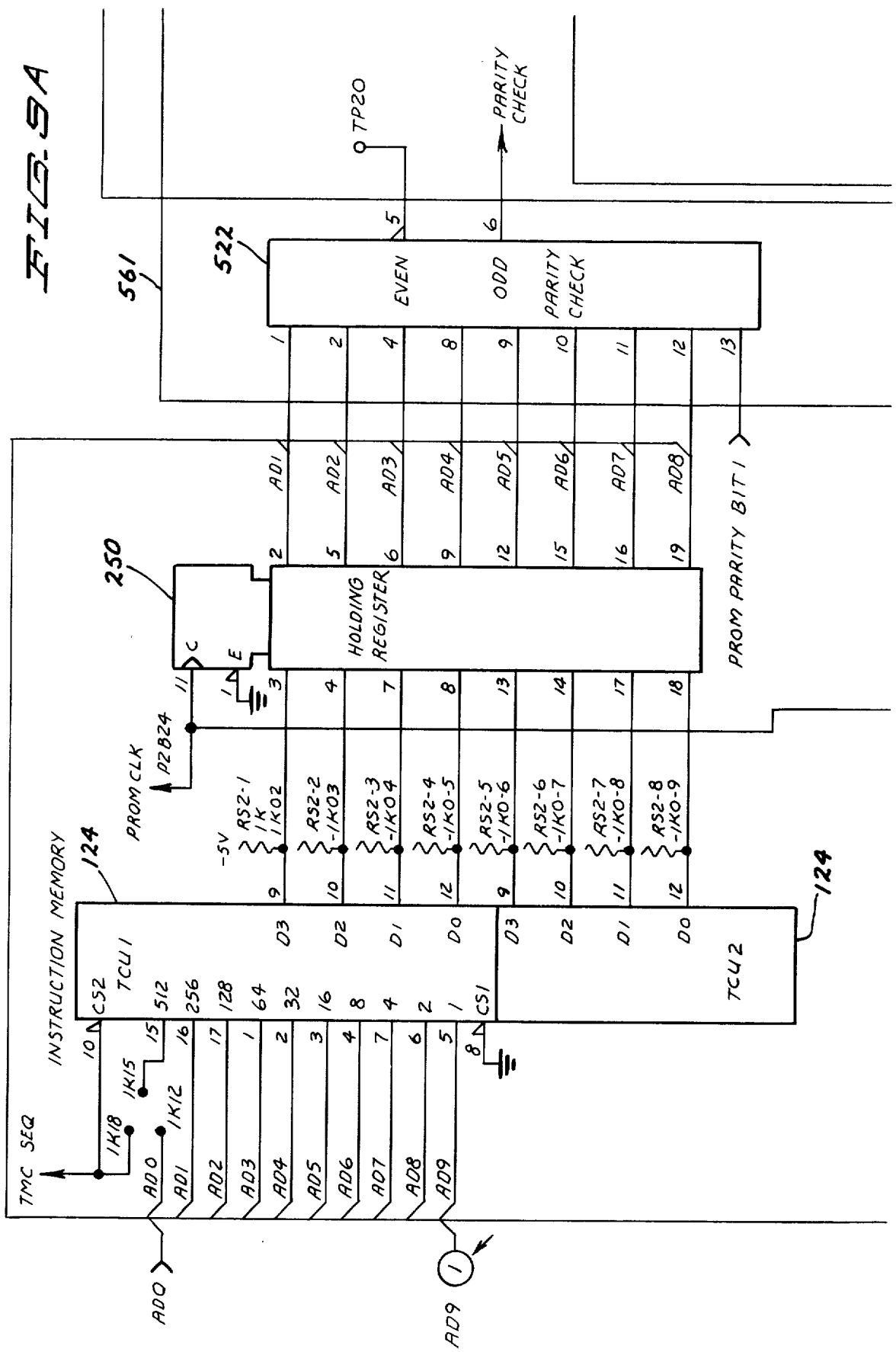

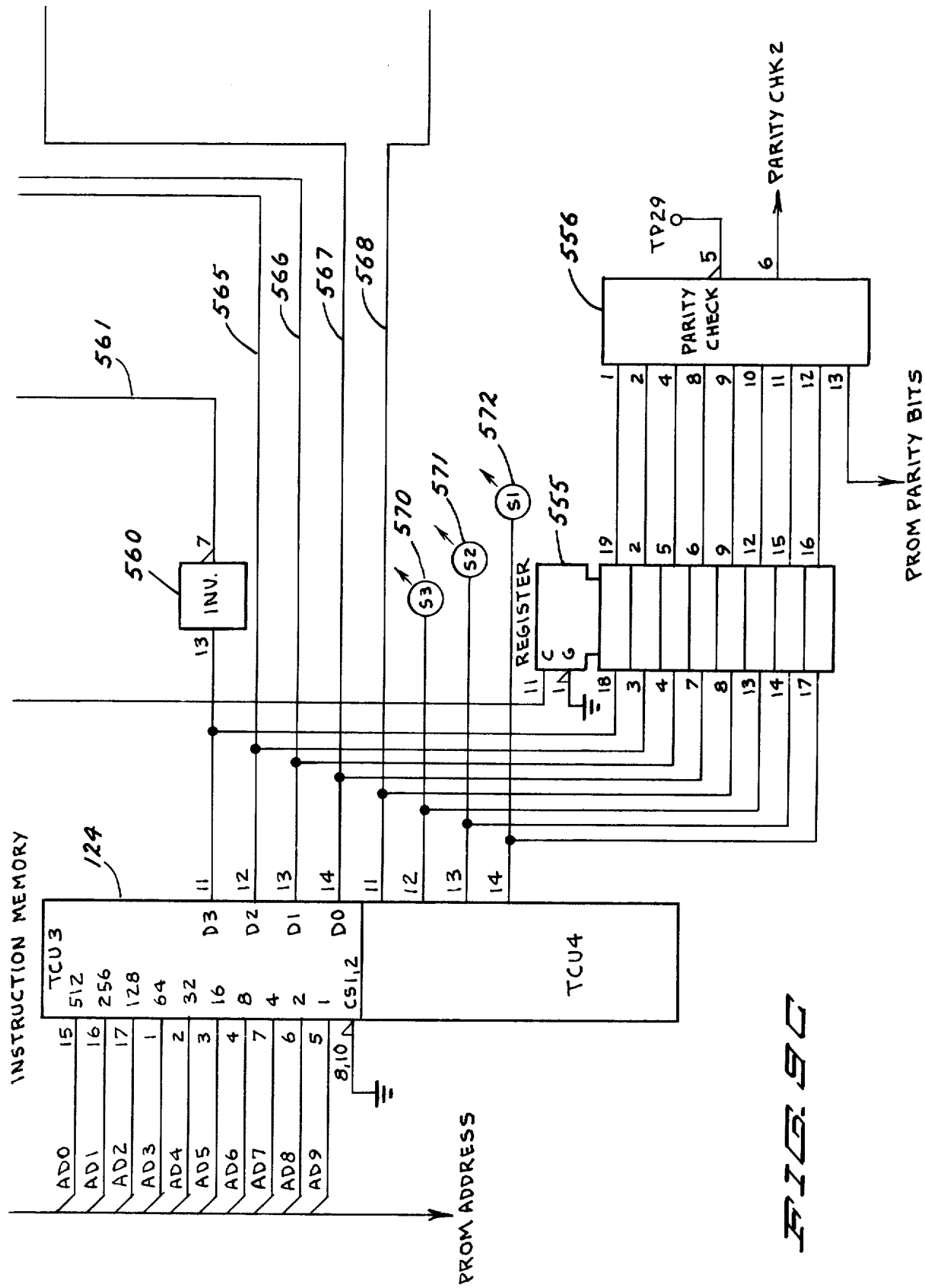

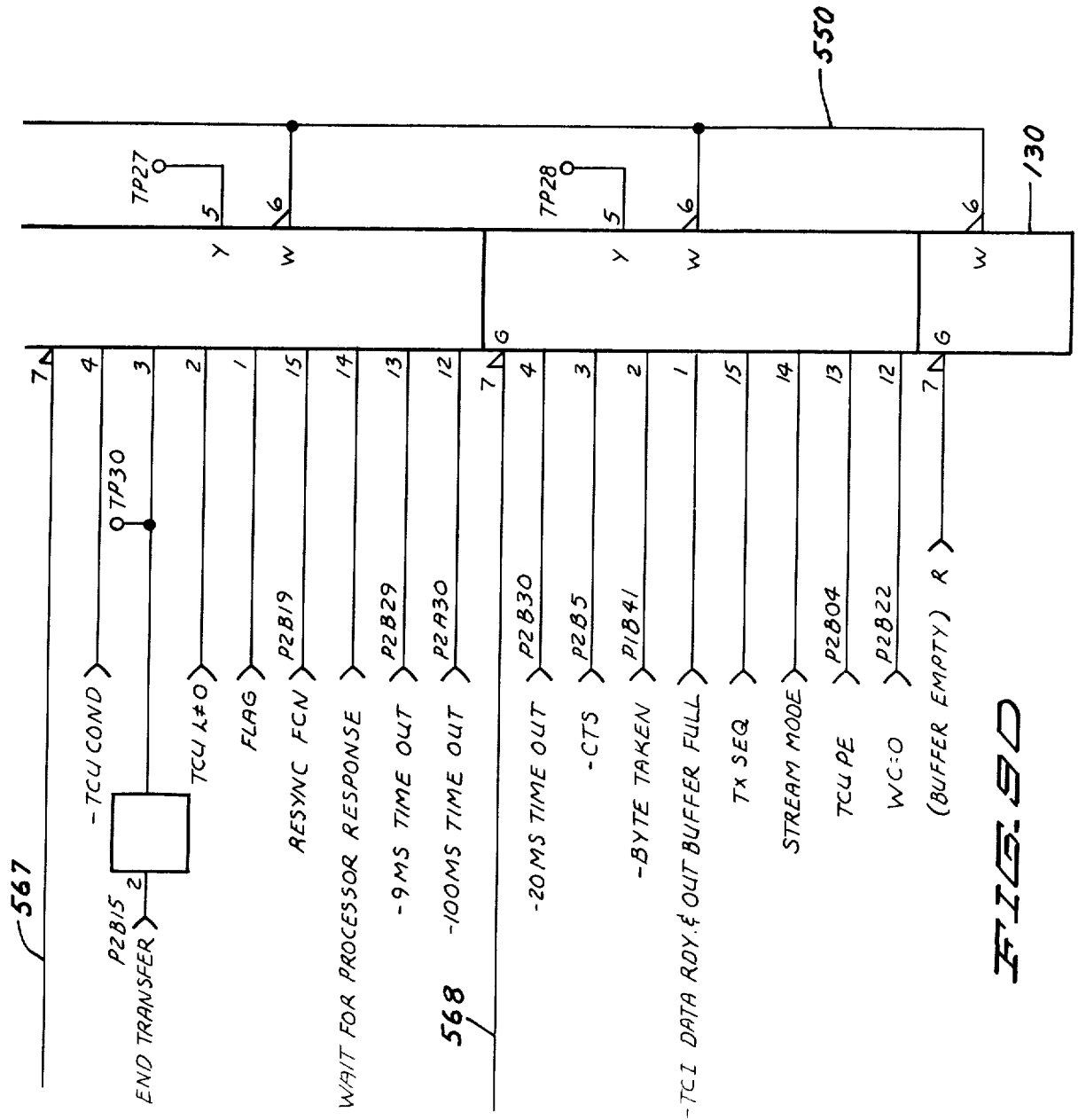

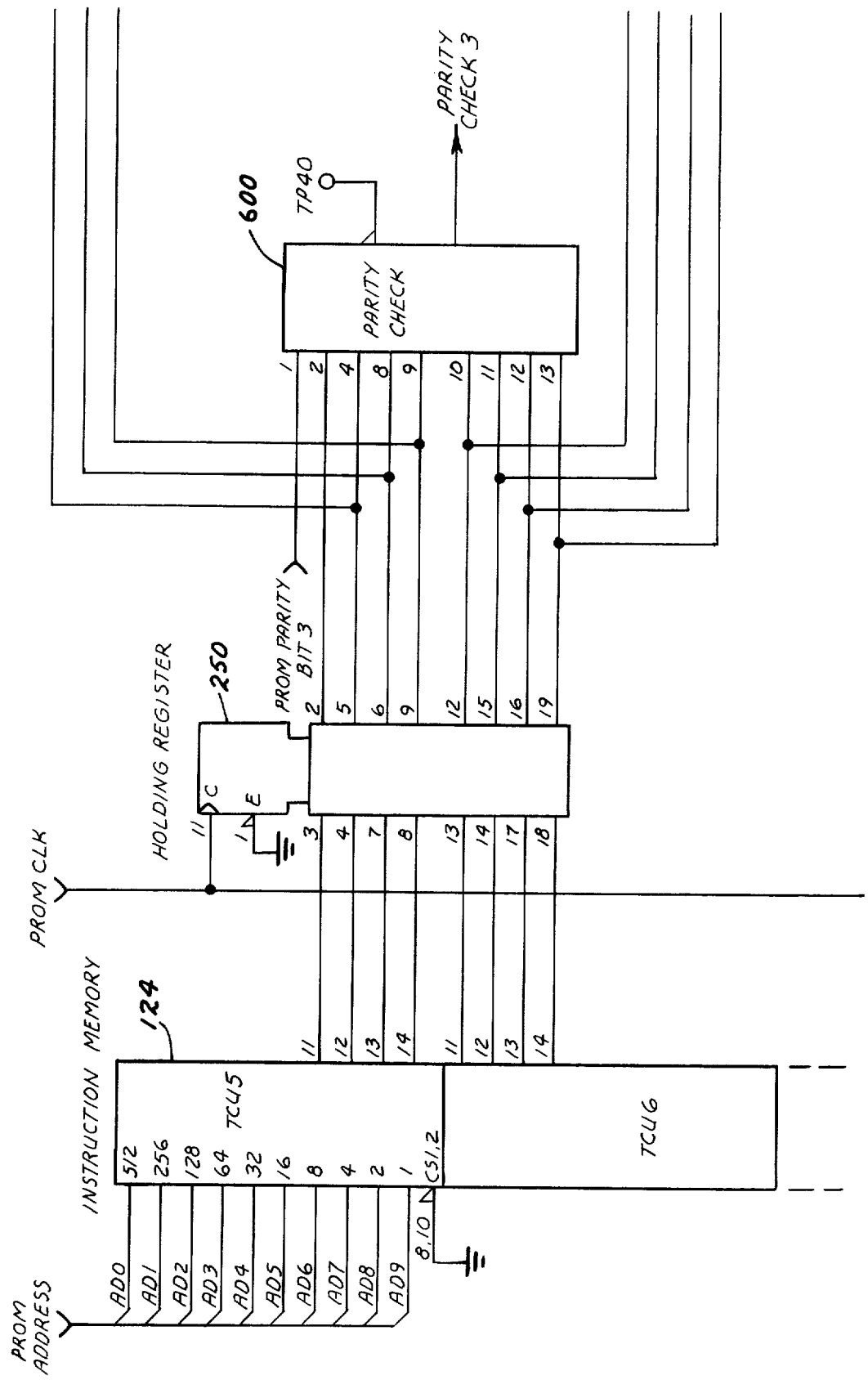

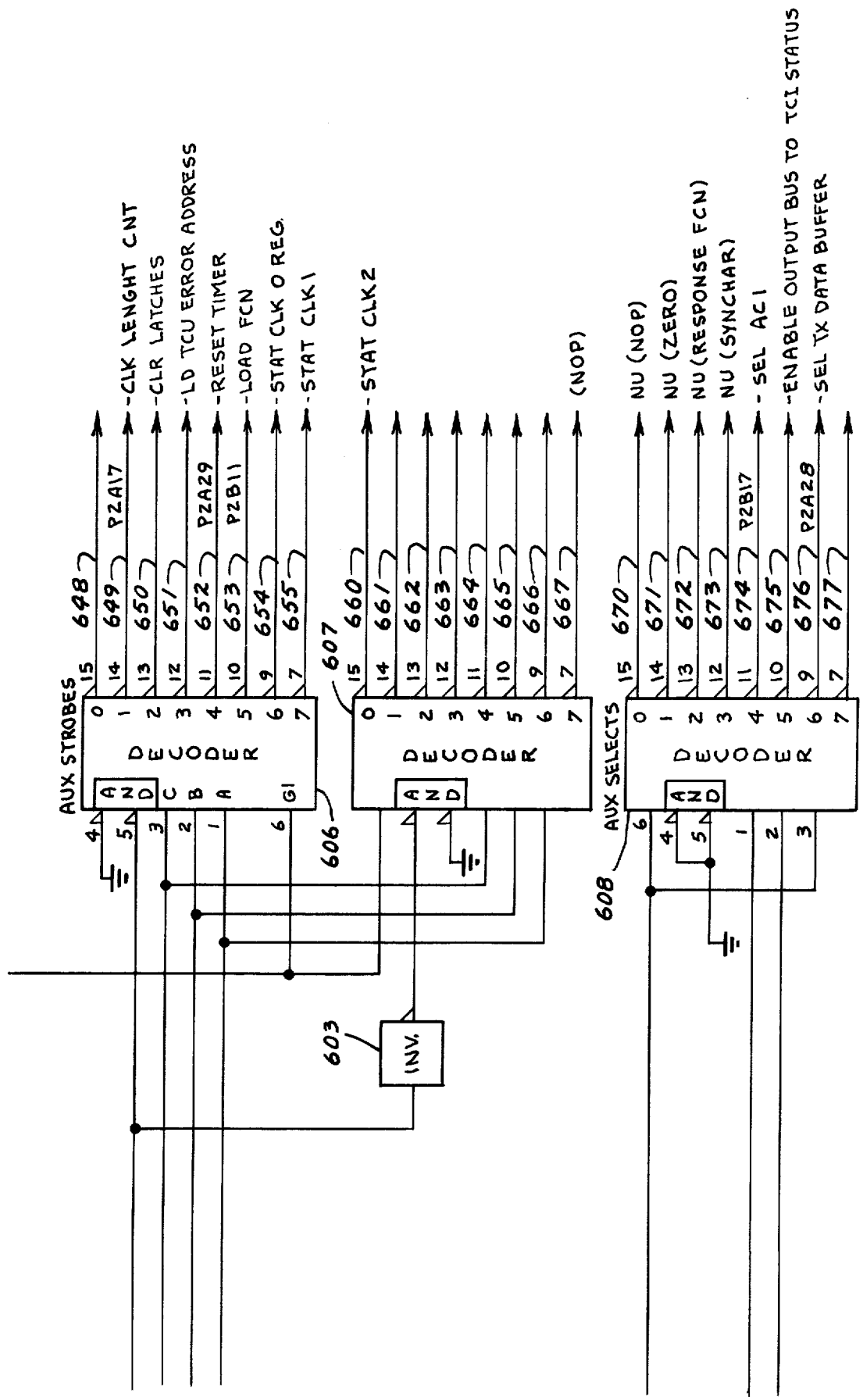

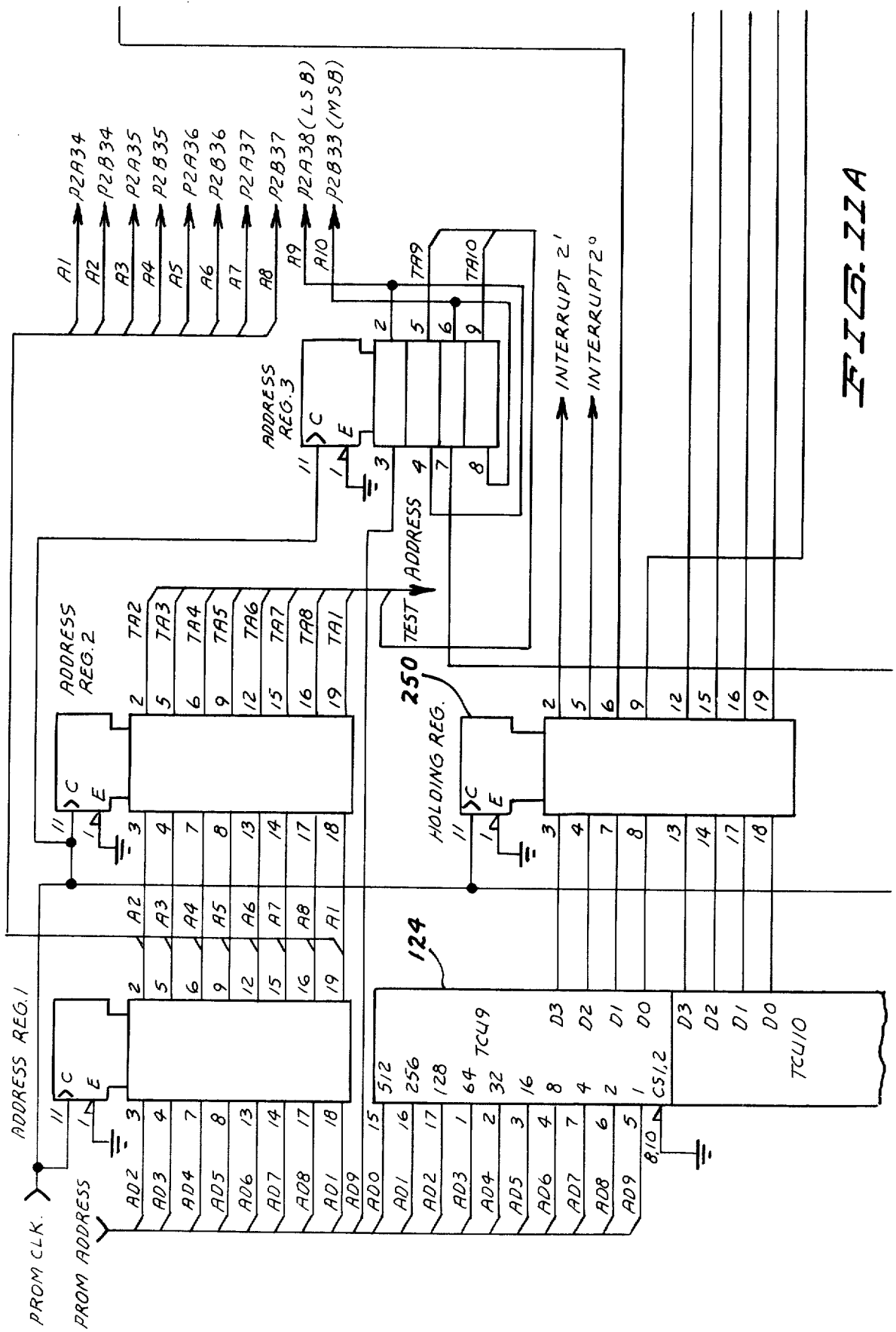

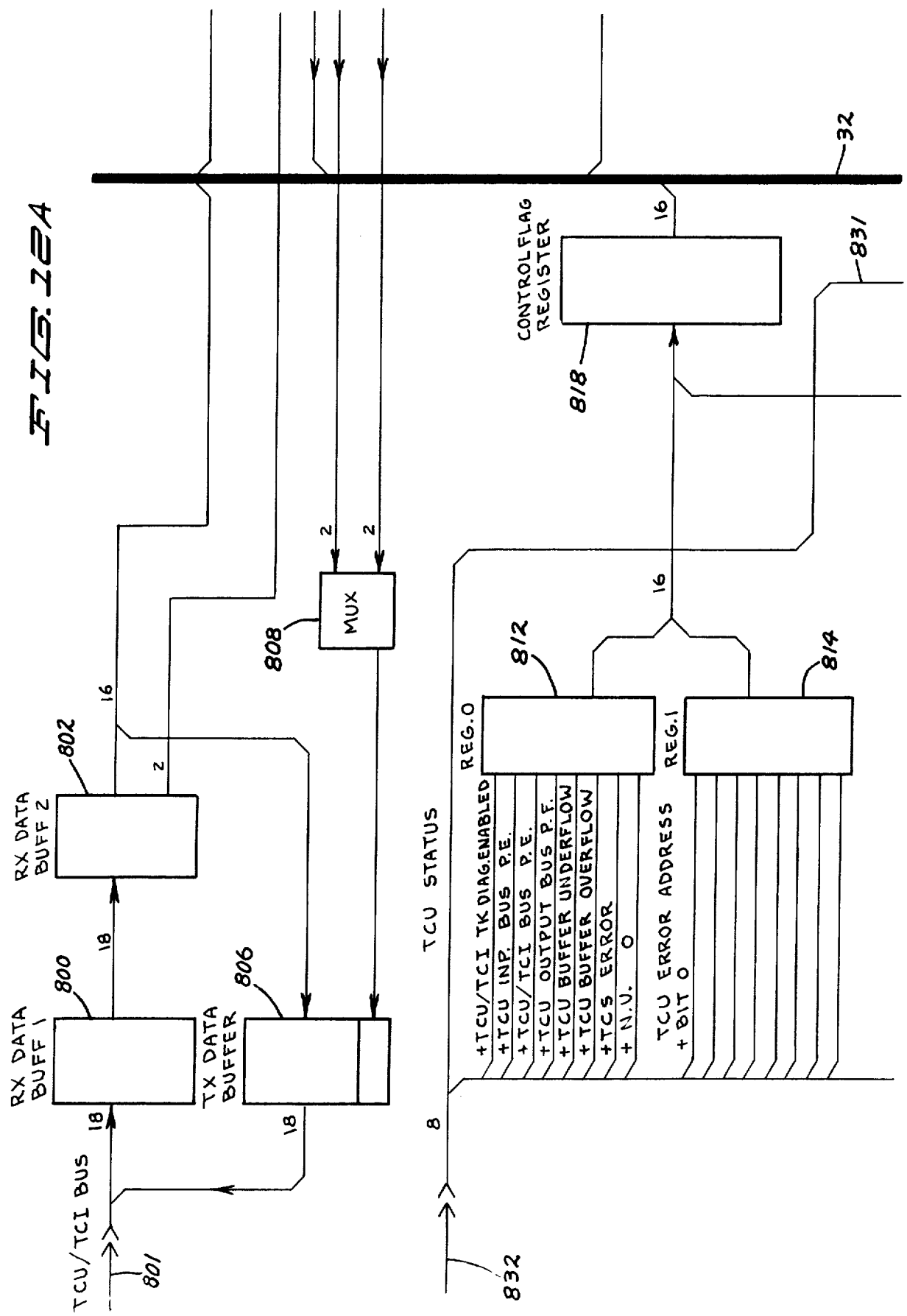

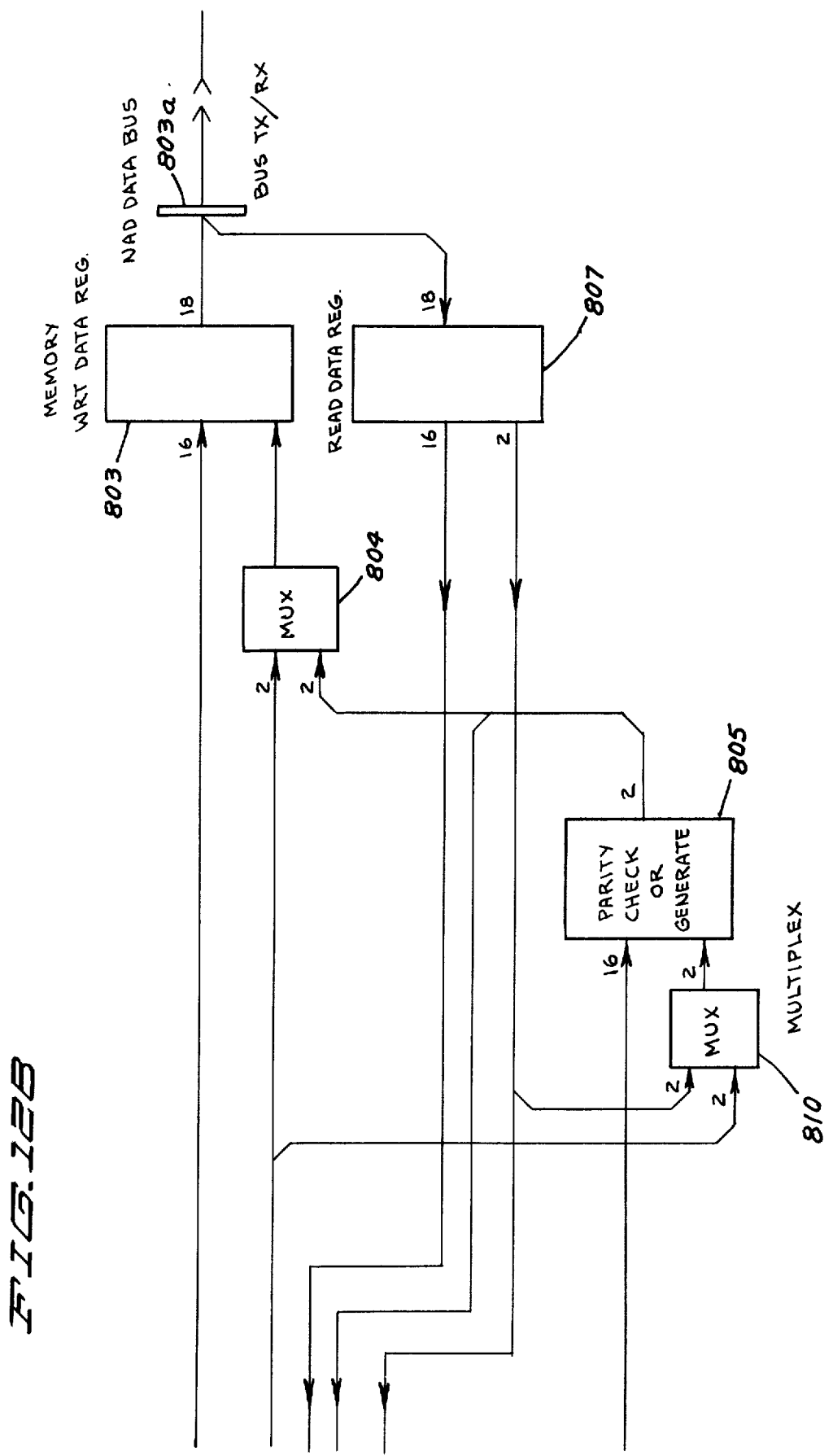

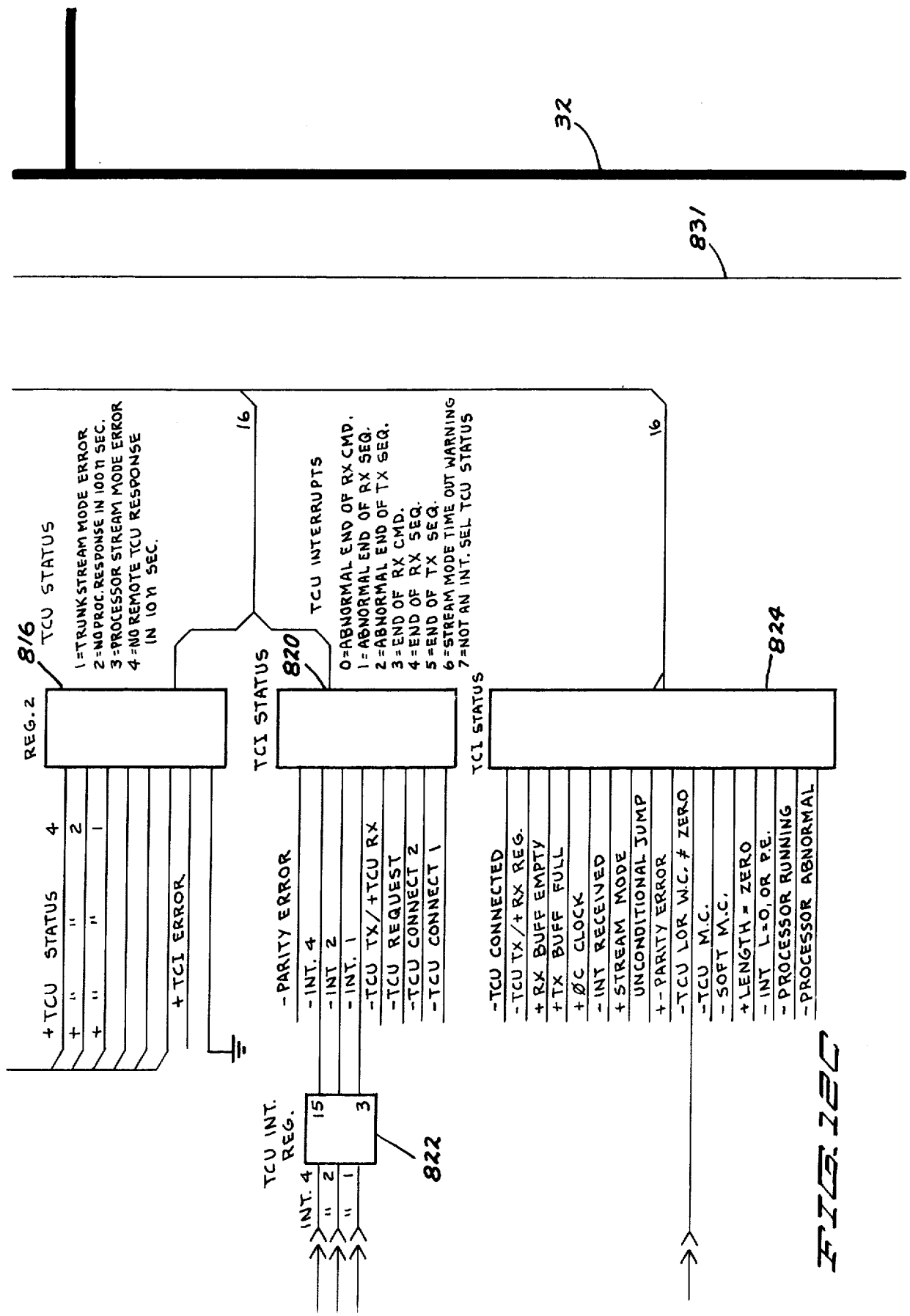

NETWORK ACCESS DEVICE

This is a continuation of application Ser. No. 148,639, filed May 12, 1980 now abandoned.

BACKGROUND OF THE INVENTION

High performance computer systems operating at modern, high-speed data rates must provide for complex communication protocols when connected in a network pattern. This invention relates to the system or device which provides for connection between a computer device of some sort and a network system. The type of computer device which may be connected through a network access device according to the present invention may consist of a computer mainframe, a computer main memory, or any accessory or peripheral device conventionally used with a computer system.

Typical prior art communication devices for interconnecting computer devices with network systems primarily provide for sending messages, receiving messages and acknowledging receipt of the message. The present invention provides for a higher level of logic beyond that of acknowledgment of messages. The present invention provides for a message response protocol which indicates the type of activity or action taken upon receipt of a message.

SUMMARY OF THE INVENTION

Included in each network access device (NAD) is at least one data set, one trunk control unit (TCU) and one trunk control interface (TCI). There may be several data set and trunk control unit combinations, however, all connected to a single trunk control interface within the network access device. Each trunk control unit is connected through a data set to the data trunk or to various data trunks so that a network system involving several data trunks may be employed. Each trunk control interface is connected to a bus system which is connected with a computer mainframe, a main memory or some computer device interface.

Both the trunk control unit and the trunk control interface depend on microprocessor control for various functions and a controlware memory for providing instructions to the microprocessor.

The trunk control interface coordinates, transmits and receives operations between trunk control units and an internal buffer memory.

The trunk control interface enables the selected trunk control unit to deliver incoming messages to the buffer memory and issues commands to a selected trunk control unit to transmit a message on the data trunk.

The trunk control interface responds to microprocessor commands by returning status and interrupt signals which signify the passage of messages between the buffer memory and the trunk control unit. A trunk control unit is enabled for message receiving by the trunk control interface and a received message may be passed to the buffer memory by way of the trunk control interface. A trunk control unit in the transmitting enabled condition may transmit a message coming from memory. A trunk control interface may be enabled in the transmit and receive mode simultaneously and if a contention situation occurs, the receive mode prevails.

The trunk control unit interfaces a bit serial trunk data set or modem (modulator-demodulator) to the bit parallel trunk control interface. The trunk control unit performs data trunk level protocol functions and ensures that a response message is always returned to a correctly received command message. The trunk control unit is always synchronized to the data trunk for transmitting command messages. A trunk control unit is enabled to receive messages by the trunk control interface and will pass the received messages to the trunk control interface and (1) if a response message, release the data trunk and (2) if a command message, wait for a microprocessor signal by way of the trunk control interface to send a response message. If a signal to send a response message is not forthcoming, the trunk control unit will generate and send an error response message.

The data network operates on a time slot system. A trunk control unit when it is enabled to transmit a command message must wait for its particular time slot on the data trunk before it can transmit. If a command message for the particular access device appears on the trunk before the transmit slot time, or appears on another trunk enabled for receive, it is accepted by the trunk control interface and the transmit command is discarded. The network access device microprocessor then must resubmit the transmit message if it is still appropriate.

Command messages are accepted from the data trunk by the trunk control unit and passed to memory through the trunk control interface. After transferring the message into memory, the trunk control interface interrupts the microprocessor control. The trunk control unit and trunk control interface wait for the microprocessor to provide a send response signal. The trunk control unit holds the data trunk active while waiting for this signal. The microprocessor control determines the proper response message and signals the trunk control interface to send that response.

The trunk control unit will always return a response message to a command message correctly received and addressed to it. The response message normally originates in microprocessor memory, but can originate within the trunk control unit when the trunk control unit is not enabled for reception by the trunk control interface, when the trunk control unit is enabled but the trunk control interface is busy, and when the interval timer times out without a send response signal from the microprocessor. The response status messages indicates which of these conditions exist. A command message can be sent from a trunk control unit only during the transmit time slot. If however, a command message arrives before the transmit time, on any of the enabled receive trunks, then the hardware will perform the receive and discard the transmit message.

There are three different modes of communication between pairs of network access devices. Each mode is tailored to a specific work function to effectively use the data trunk and network access device resources. Each command message and response message always occur in pairs.

The first mode of operation consists of one command-response message pair. A control message is directed to the device and has a meaning or function defined by a higher level protocol or a flow control message is directed to the network access device processor.

The second mode is a two command-response message set used for transmission of data. The first command identifies the data path and the buffer size required. The receiving network access device returns to an acknowledged signal and enters the data streaming mode if the data transfer is permissible. The sending network access device then immediately transmits the data and a closing acknowledgment is returned at which time both network access devices exit the data streaming mode. If the receiving network access device cannot accept data, it will return a negative signal and remain in a non-data streaming mode. The data trunk is captured by the pair of network access devices until the final acknowledgment signal is returned.

The third mode is a special form of data transfer in which data trunk multiplexing is eliminated by capturing the data trunk in a streaming mode for the entire duration of a large data transfer. Consequently, total trunk bandwith is allocated to the path capturing the trunk. Two useful results are obtained. First, the data path transfer rate is maximum since trunk loading has been eliminated and protocol usage of the trunk which is a form of operating overhead is minimized. Secondly, all other networks access devices on the data trunk have been suspended momentarily from use of the trunk.

Each message contains several blocks of information in coded fields. Each message includes a header which will be explained in detail later.

Each message contains information defining the function of the message and a message sequence number which is incremented for each message sent. The body of the message is dependent upon the type of command message being sent. For example response messages have no body contents to the message.

A negative response message is generated by the microprocessor. Such a message can be a response to any command message. A negative response informs the sending unit of the command message that the resources necessary to process the command are not available. The sending unit must not attempt another transmission of the same type until notified that it is allowed to do so. A NAK response message instructs the sending network access device to discontinue sending traffic destined for this particular unit. A WAIT-NAK response message instructs the sending NAD to hold all traffic destined for the receiving NAD until a status change message is sent indicating that buffer resources are available so that the rejected transmission may be retried. The status change message is unique in one respect. The status change message can be rejected the same way as any other command message but the sender of the status change message must wait a predetermined time period to retry the same message and not wait for its own status change message before retransmitting. Due to the nature of this message the retry sequence is infinite.

A message transmission retry must occur when there is a message transmission abnormality. A transmission abnormality occurs when no response is forthcoming to the command message sent. The main reasons for a no response are: (1) a nonexistent network access device is addressed, (2) the command message is garbled on the data trunk causing the destination field to address a nonexistent network access or there is a check sum error at the receiving unit in which case no answer back is sent or (3) the command message is received correctly and a response message is transmitted but is garbled on the data trunk. When a transmission abnormality occurs, the command message is retransmitted using the same message sequence number up to a predetermined number of times until a response message is received. If a response message is never received after a number of retries, a fatal error has occurred in the system.

What occurs in response to fatal a error depends on the type of command message sent. During the retry process, the microprocessor control will not attempt to send any other command messages to the particular receiving unit. However, the particular sending unit will accept incoming command messages.

Every response message includes a status indication of the responding network access device. One of these status bits may be a trunk control interface busy bit. This bit signals that, although the command message was received by the destination trunk control unit correctly, it could not be passed onto the buffer memory. Hence the response returned is likewise not from a microprocessor control but is generated internally to the trunk control unit. Since the network access device processor at the destination did not receive the command, the command must be retransmitted. Assuming that the remainder of the response status is correct, the command message would be queued for retry by the sending unit. The retransmissions will occur until accepted by the destination network access device or until a fatal error occurs. Other command messages may be sent during the interval between transmission retries.

A destination fatal error signal may be transmitted indicating, for example, that the associated computer device is not operating or other similar fatal errors at a destination location. A command message is not retransmitted when a fatal error message is returned as the response message.

A fatal message error is one which is caused by a hardware error during the transmission of a trunk command-response pair. These errors can be caused by network access device failures including the trunk control interface or the trunk control unit, data set failures or of complete failure of the network access device. These are error conditions which can be reported by the trunk control interface and trunk control unit hardware by status or interrupt messages. The fatal message errors are considered fatal after the retry sequence occurs unsuccessfully a number of times.

If fatal error occurs while transmitting a user control message, the message is returned to the device via the control message queue. A status bit within the message header indicates the message could not be delivered. A fatal error while transmitting data on an established data path causes the path to be terminated. All resources allocated to that data path are released and the device is notified of the fatal error.

Each message includes a header frame check sequence (FCS) immediately following the length of message field. The frame check sequence field serves to detect errors induced by the transmission data link and to validate the transmission accuracy. The frame check sequence results from a mathematical computation on the digital value of all binary bits in the frame following the frames synchronization sequence. The process is known as cyclic redundancy checking using a particular generator polynomial. The remainder value in the transmitter for the polynomial is initialized to all ones before a frame is transmitted. The binary value of the tranmission is premultiplied by a predetermined factor and then divided by the generator polynomial. Integer quotient values are ignored in the transmitter since the complement of the resulting remainder value, high order bit first, is sent as the frame check sequence field. At the receiver the initial remainder is preset to all ones and the same process is applied to the serial incoming bits. In the absence of transmission errors, the final remainder is a predetermined value. The receiver will discard a message not having that predetermined remainder value. Subsequent retransmission of the discarded message is under the control of error recovery procedures.

IN THE FIGURES

FIG. 2 is a block diagram showing the use of a network access device according to the present invention together with various computer devices in a data network.

FIGS. 3A, 3B, 3C and 3D represents a schematic block diagram of a network access device trunk control unit according to the present invention for FIGS. 3A, 3B and 3C are arranged in left to right order with FIG. 3D beneath 3B.

FIGS. 3E and 3F schematically show the command and response message structure, respectively.

Figure 5A:
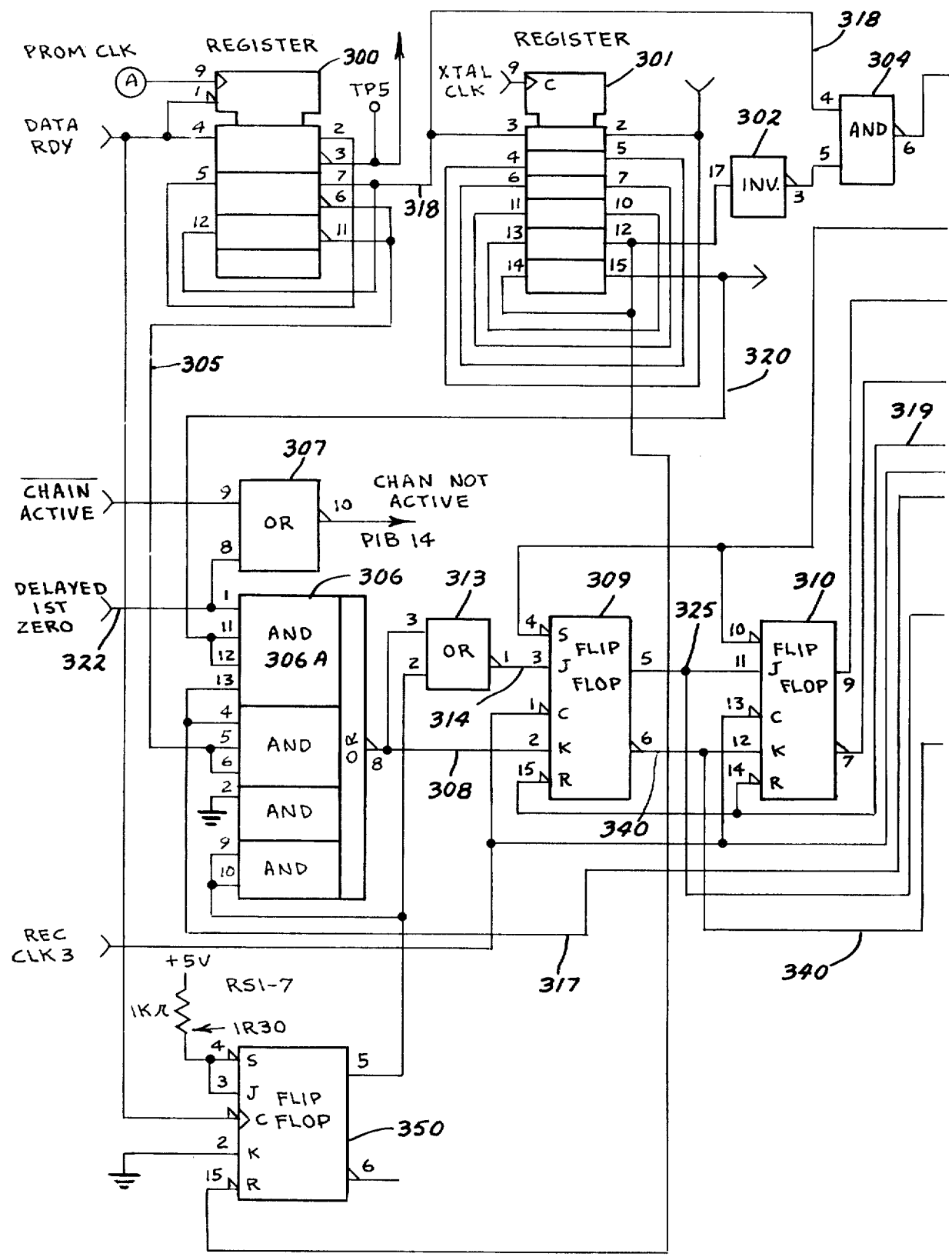
Figure 5B:
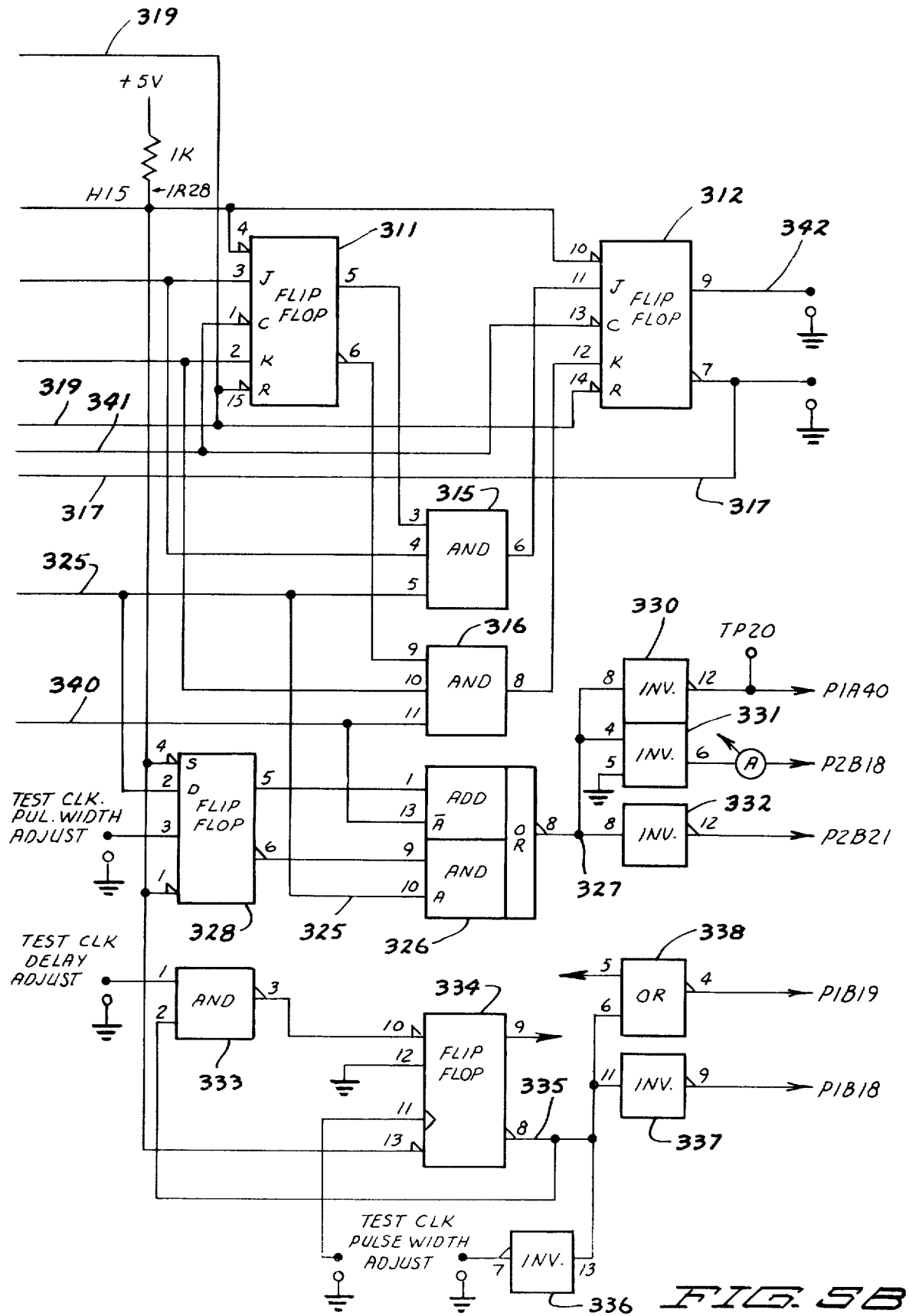

FIGS. 5A and 5B are detailed schematic diagrams of a portion of the device shown in FIGS. 3A through 3D and are to be seen in left to right order with FIG. 5A on the left.

Figure 6A:
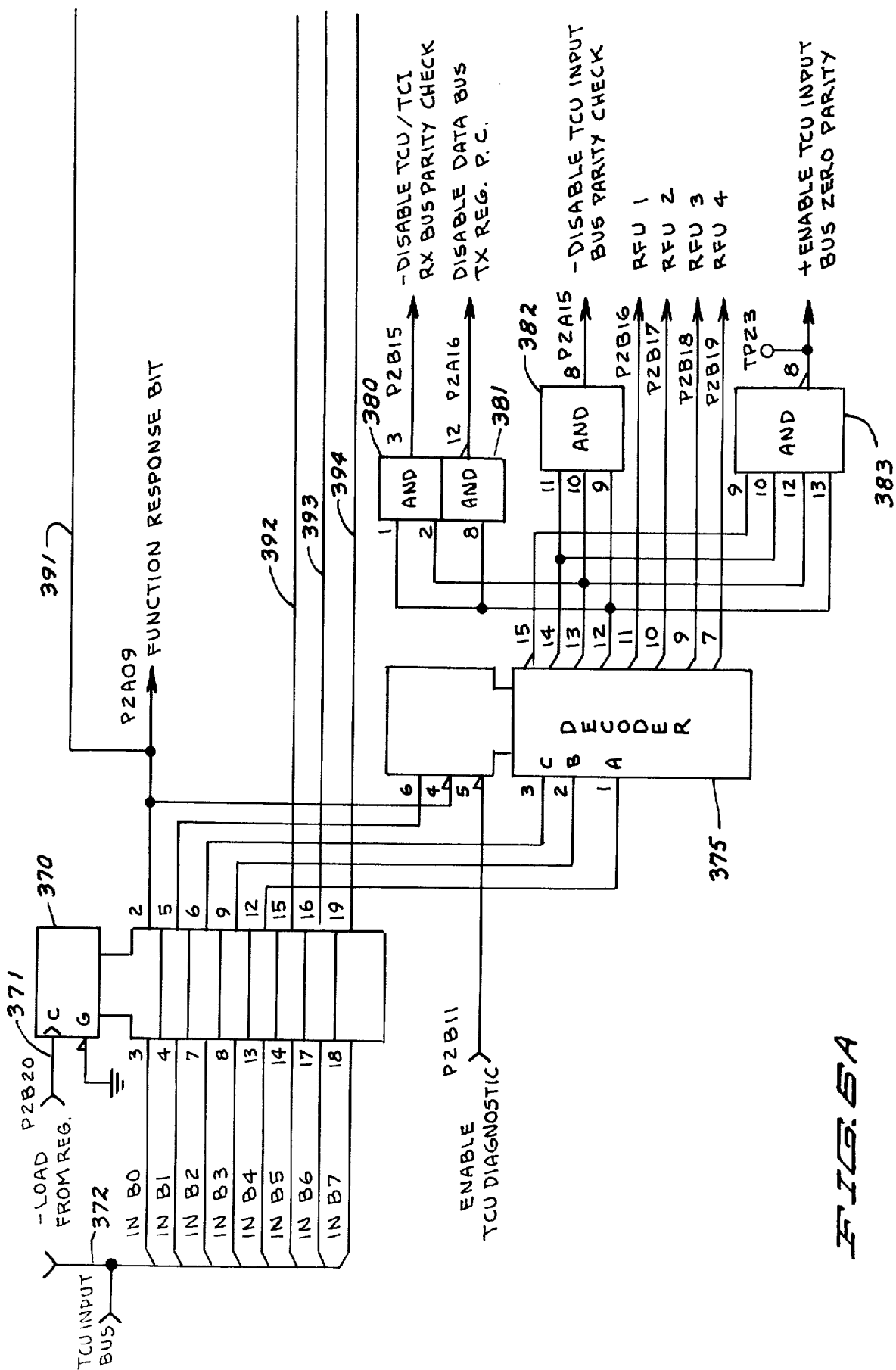
Figure 6B:
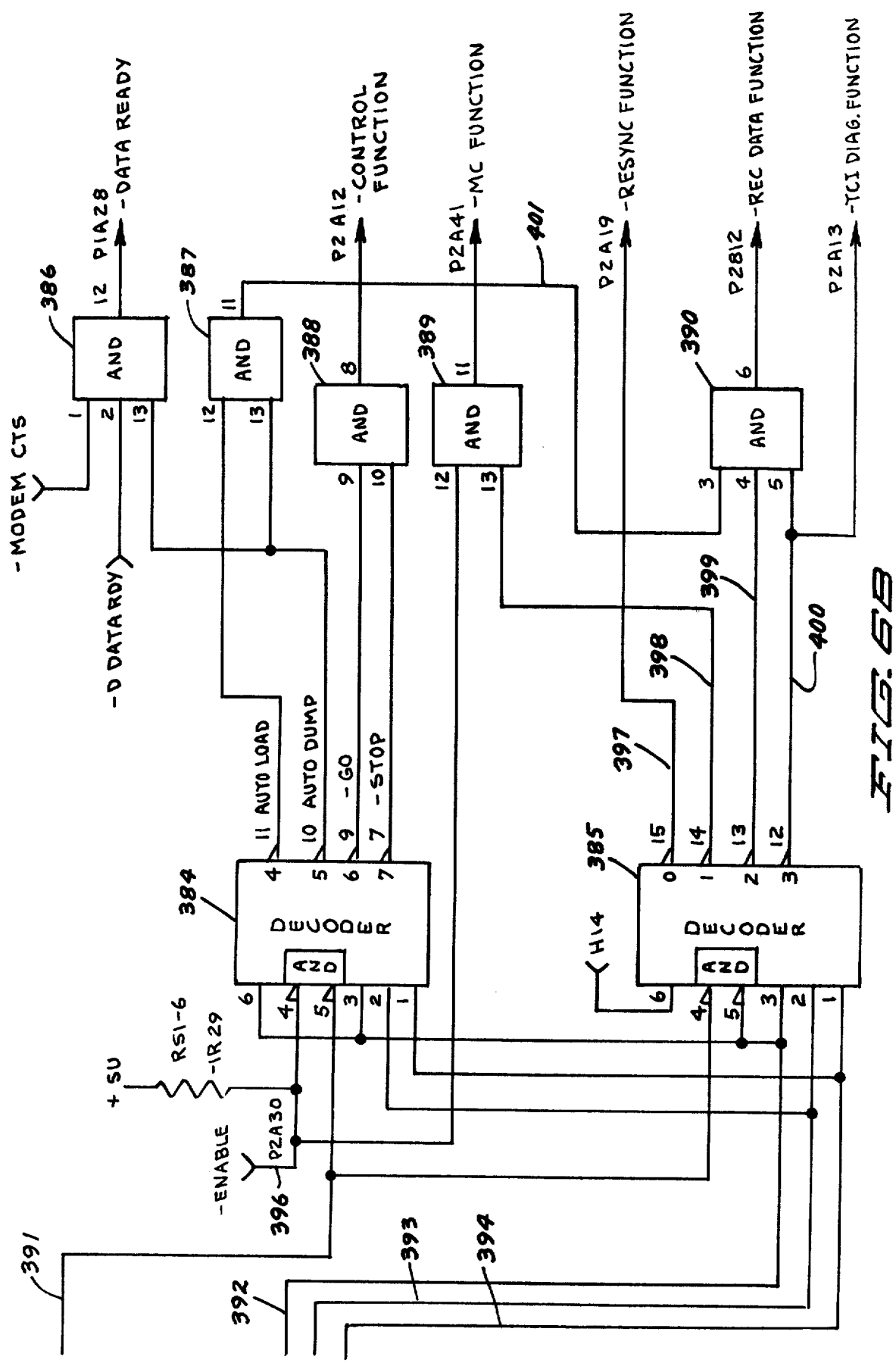

FIGS. 6A and 6B are detailed showings of the device shown on FIGS. 3A through 3D and to be taken in left to right order with FIG. 6A on the left.

FIGS. 7A, 7B, 7C and 7D are detailed showings of the device shown in FIGS. 3A through 3D and are to be taken with FIGS. 7A and 7B in left to right order on the top and FIGS. 7C and 7D in left to right order beneath FIGS. 7A and 7B.

Figure 8B:
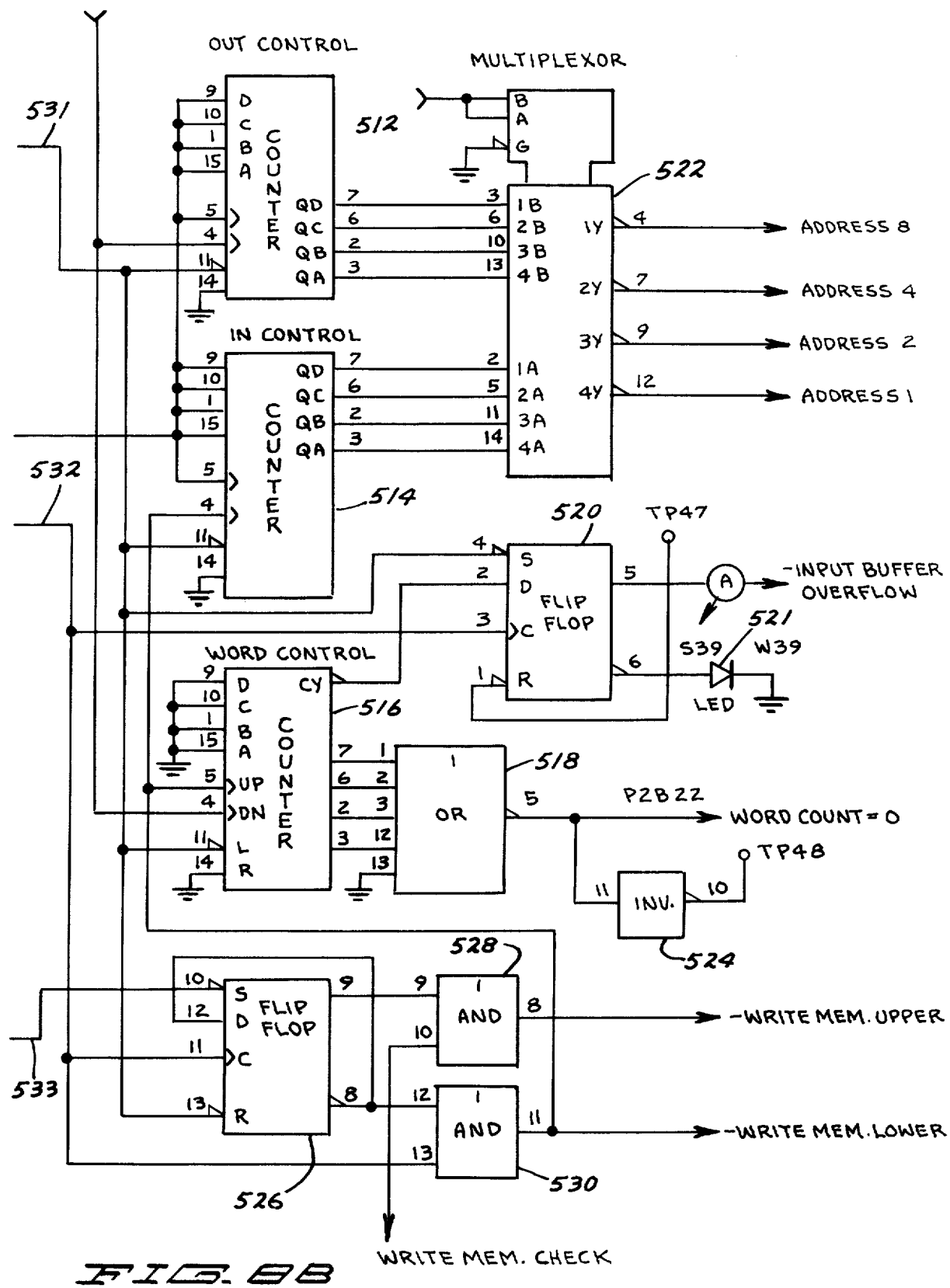

FIGS. 8A and 8B are detailed showings of the device showing in FIGS. 3A through 3D with FIG. 8A to be taken to the left of FIG. 8B.

FIG. 8C is a detail of a portion of the device shown on FIGS. 3A through 3D.

Figure 9B:
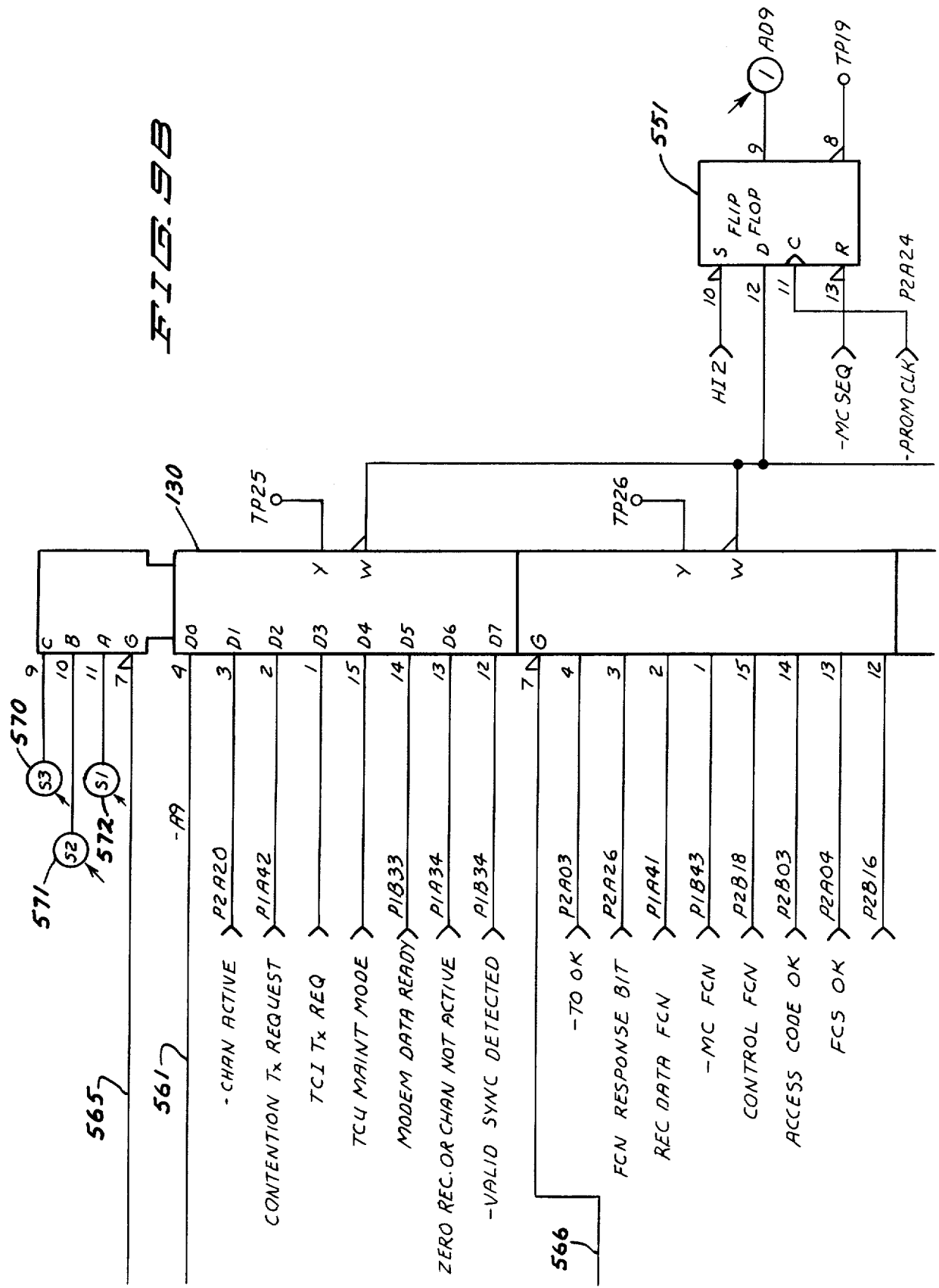

FIGS. 9A, 9B, 9C and 9D are detailed showing of the portion of the device shown in FIGS. 3A through 3D and are to be taken with FIGS. 9A and 9B on the top in left to right order with FIGS. 9C and 9D in left to right order beneath FIGS. 9A and 9B.

Figure 10B:
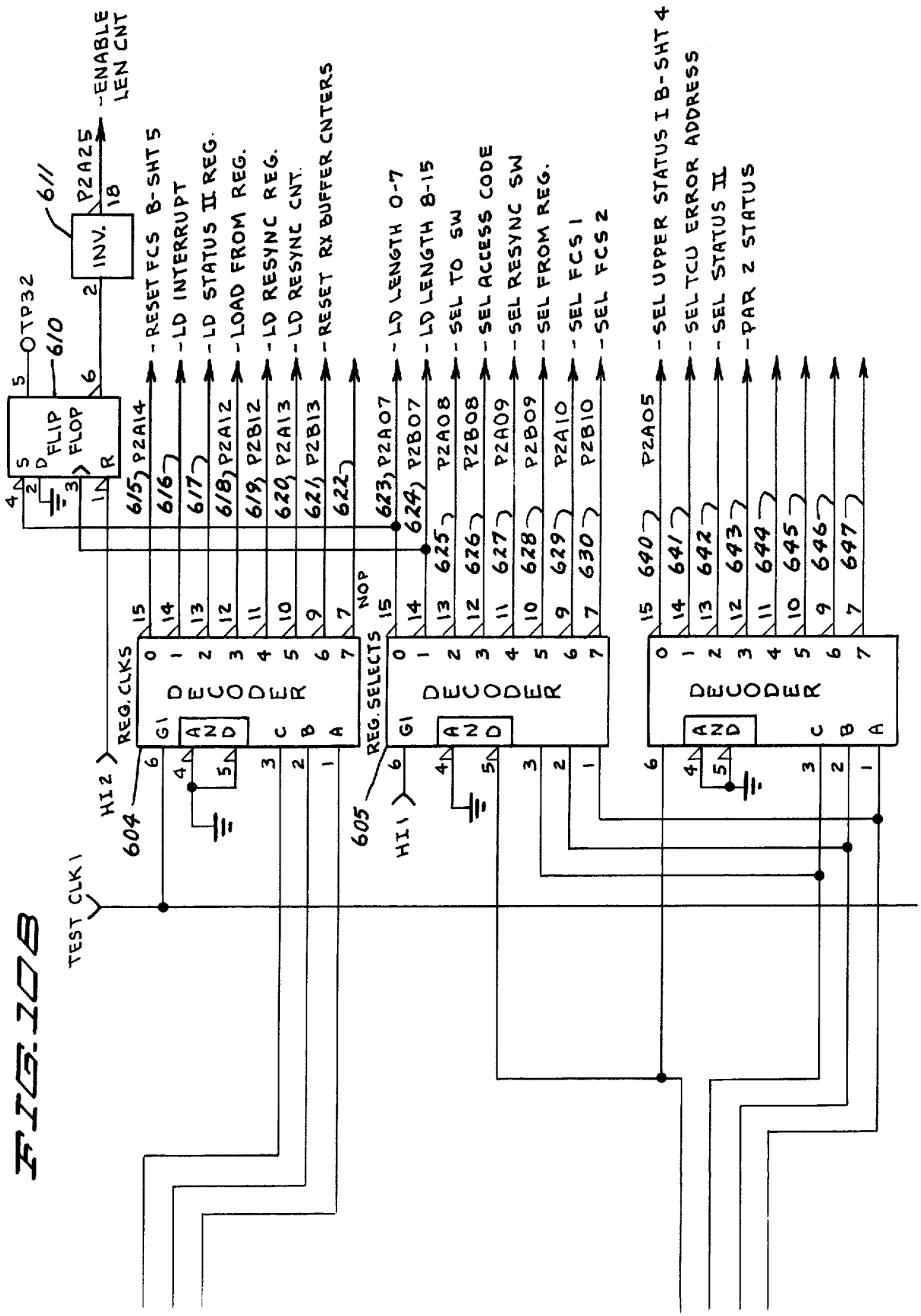
Figure 100:
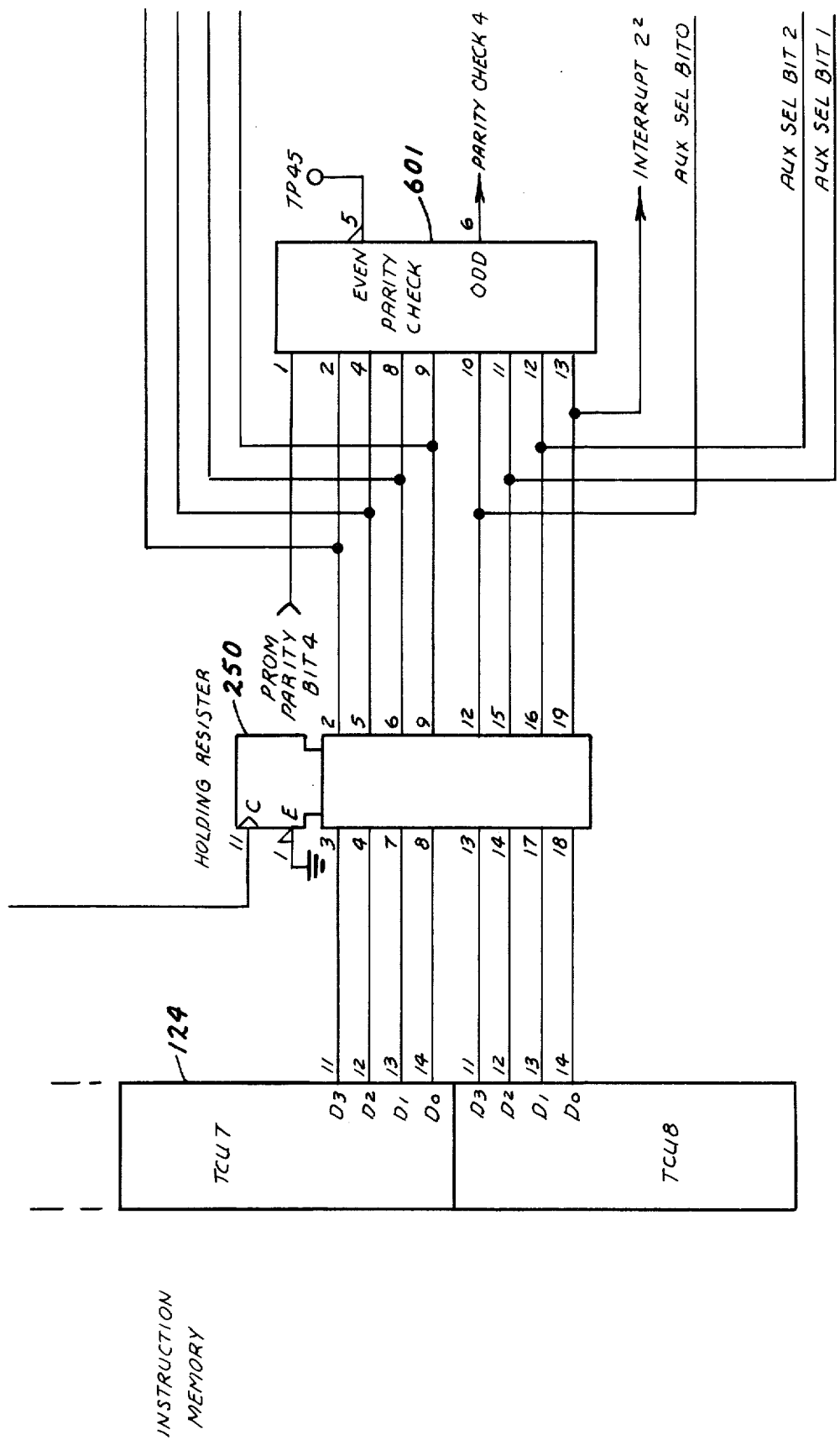

FIGS. 10A, 10B, 10C and 10D are detailed showings of portion of the device shown in FIGS. 3A through 3D and are to be taken with FIGS. 10A and 10B in left to right order and FIGS. 10B and 10C in left to right order beneath FIGS. 10A and 10B.

Figure 11B:
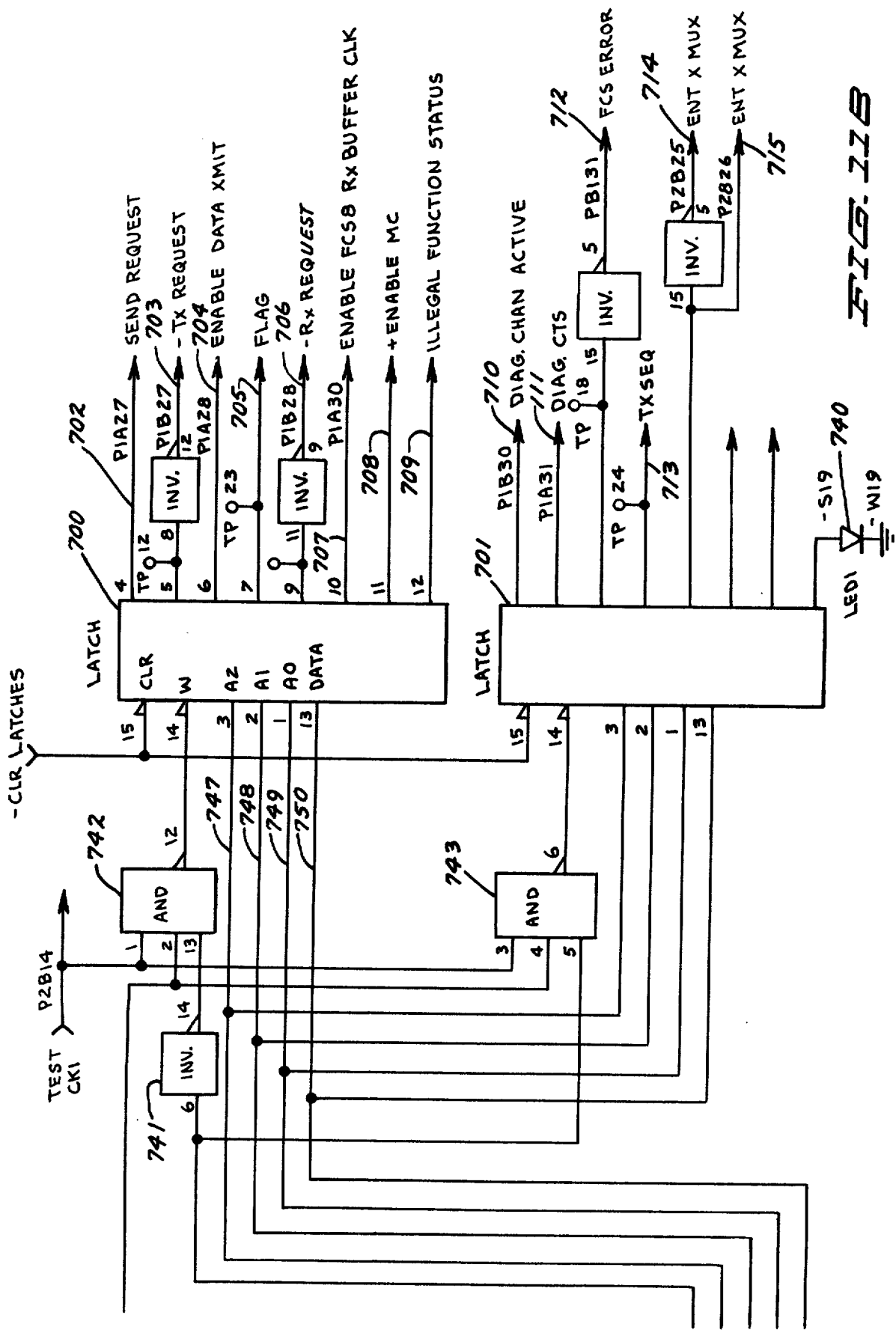
Figure 11C:
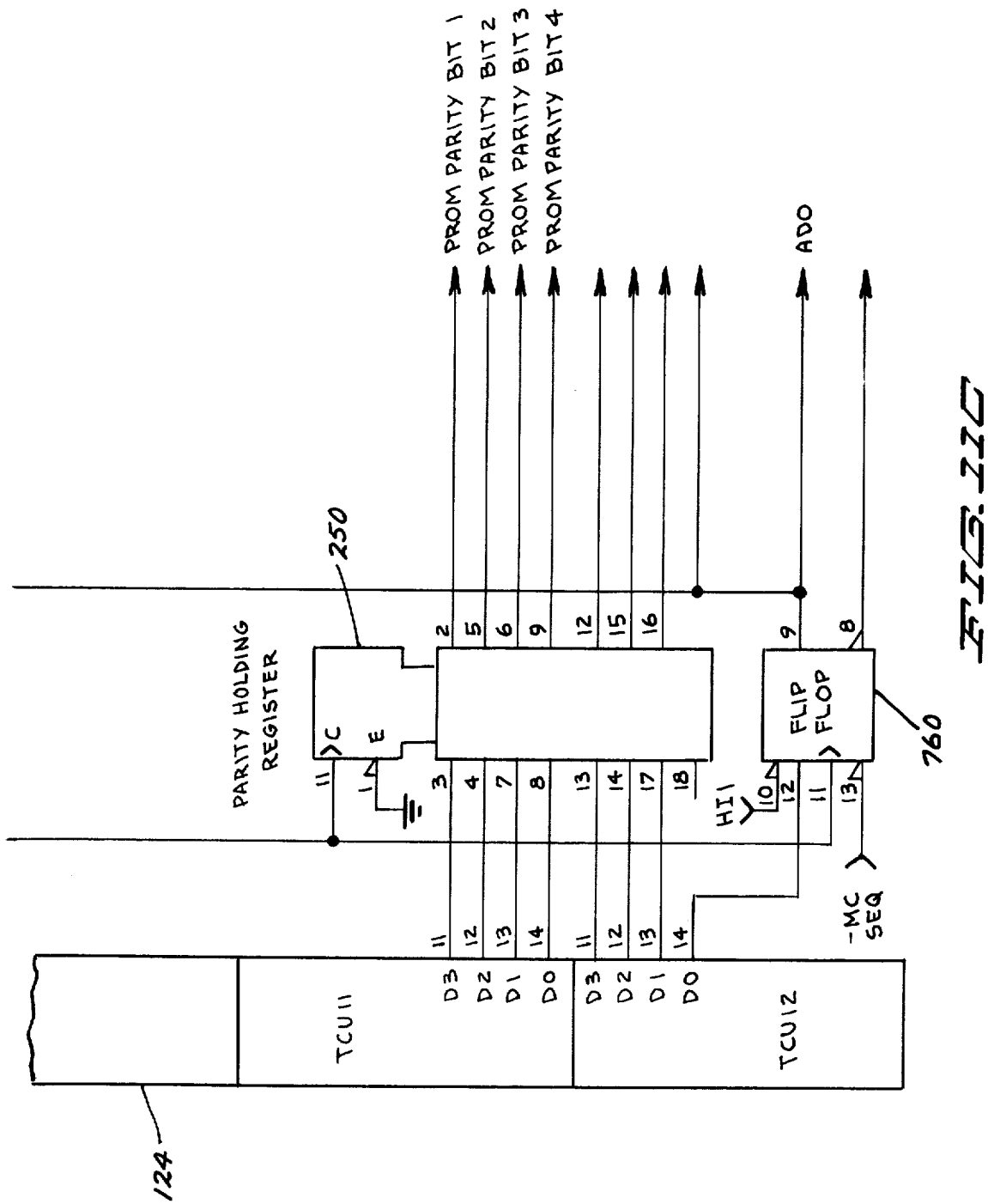

FIGS. 11A, 11B and 11C are a detailed showing of a portion of the device shown in FIGS. 3A through 3D with FIGS. 11A and 11B to be seen in left to right order with FIG. 11C placed below FIG. 11A.

Figure 12D:
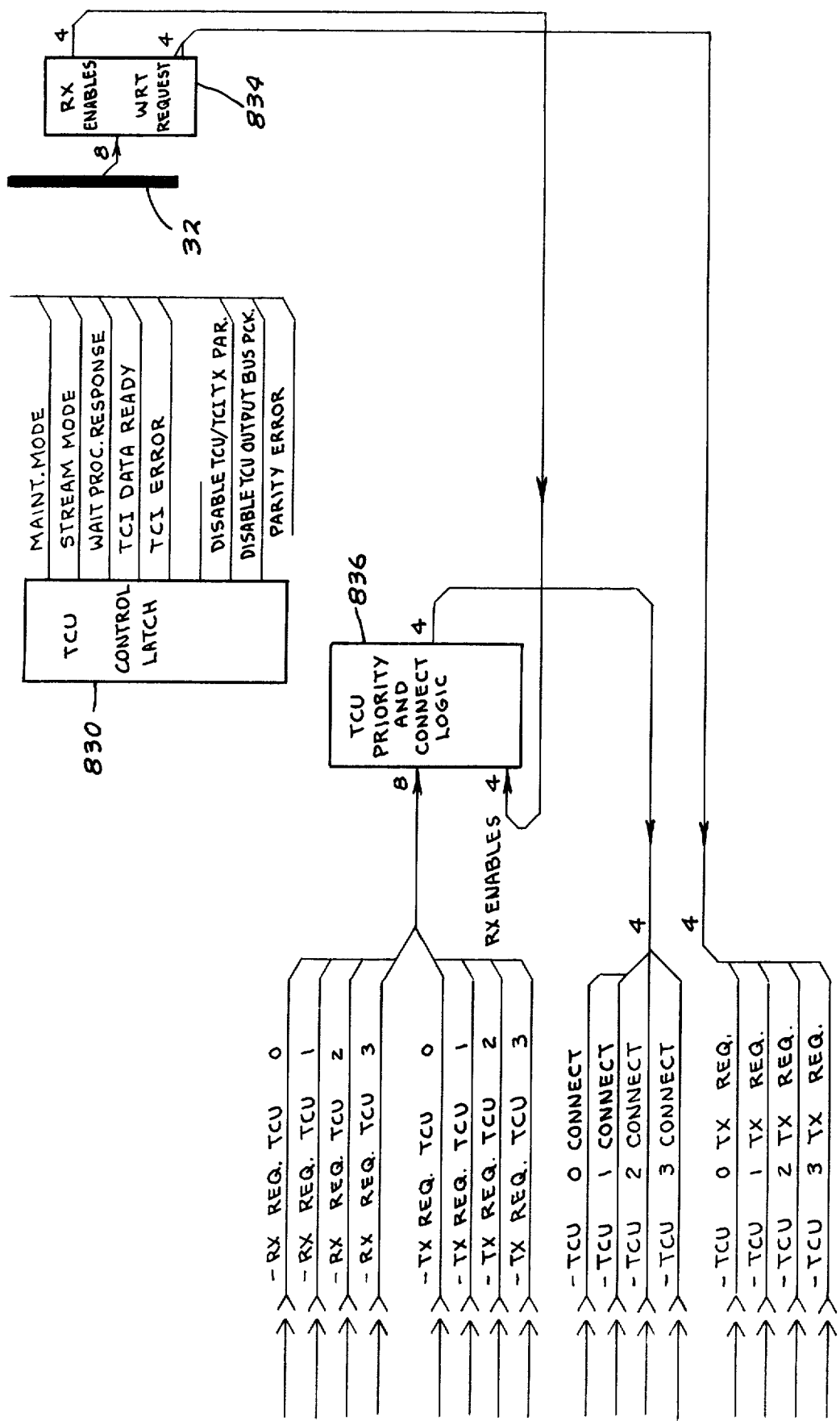
Figure 126:
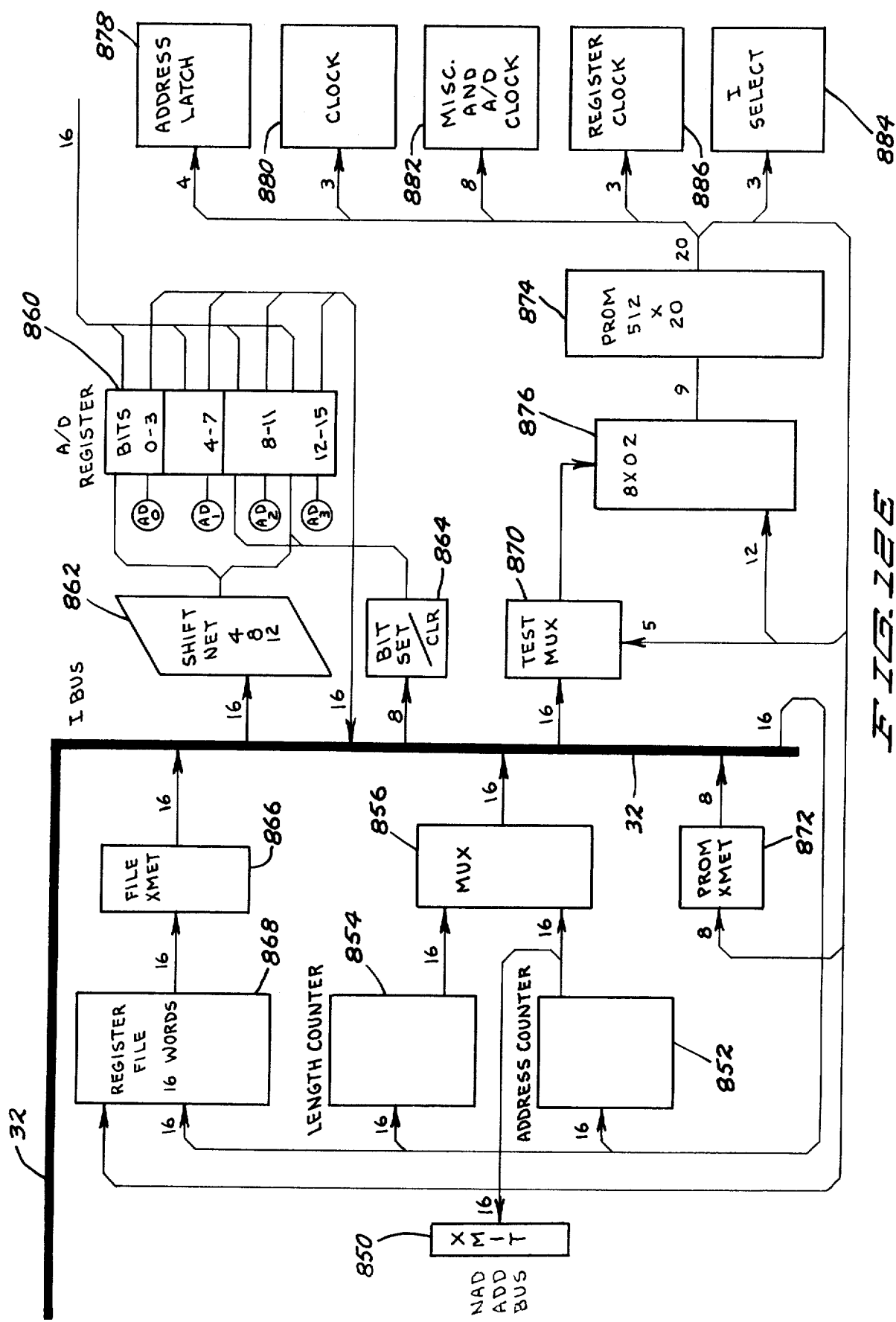

FIGS. 12A, 12B, 12C, 12D and 12E represent a schematic block diagram of a trunk control interface device of the network access device shown in FIG. 1 and are to be seen with FIGS. 12A and 12B in left to right order with FIG. 12C below FIG. 12A and FIG. 12D below FIG. 12C, and FIG. 12E to the right of 12C and below 12B.

DESCRIPTION OF THE PREFERRED EMBODIMENTS

Figure 1:
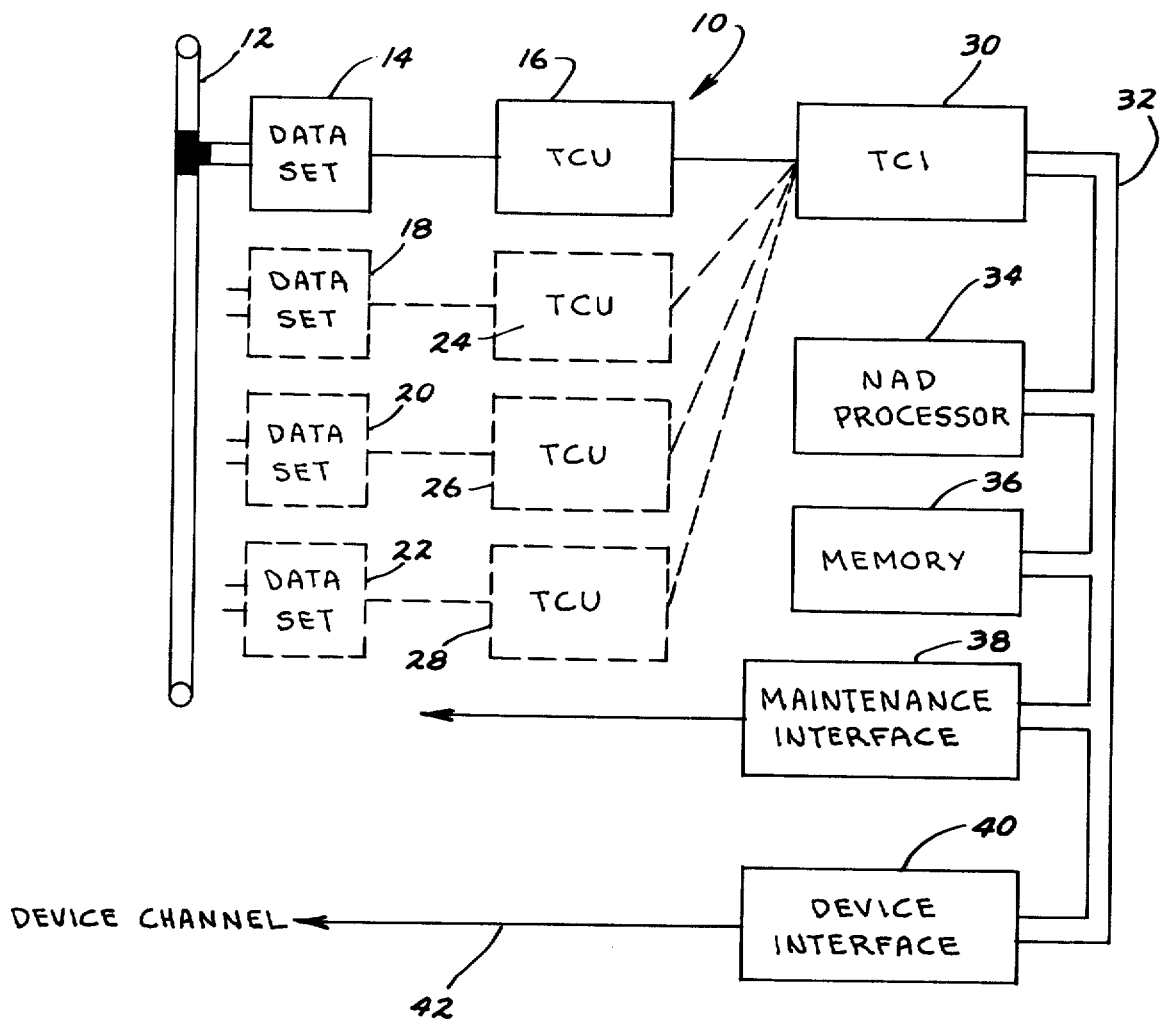
FIG. 1 is a block diagram of a network access device according to the present invention.

Referring now to FIG. 1, a network access device 10 according to the present invention is shown connected with a data trunk 12. A network access device consists of at least one data set 14 connected between the data trunk 12 and at least one trunk control unit 16. Other data sets 18, 20 and 22 may be provided connected to the same or other data trunks. Each of data sets 18, 20 and 22 would be connected with its own trunk control unit 24, 26 or 28, respectively. Trunk control unit 16 is connected to a trunk control interface 30 as would be any other trunk control units in the same network access device. The trunk control interface 30 is connected to an internal data bus 32 which is connected to the network access device microprocessor 34, the buffer memory 36, a maintenance interface for diagnostic maintenance routines 38 and a device interface 40. Device interface 40 provides a data channel 42 to be connected to a computer mainframe, a computer memory or any peripheral or auxillary equipment to be associated with a computer system.

Referring to FIG. 2, a plurality of network access devices according to the present invention are shown in various situations to illustrate their use in a computer communication network system. A computer mainframe 50, which may illustratively be a Control Data Corporation CYBER 176 computer, may have several device channels 42 connected with a plurality of network access devices 52a, 52b, 52c, 52d and 52e. Each of network access devices 52a through 52d has at least two data sets and trunk control units. Network access device 52e is shown to have only one trunk control unit and one data set. Five data trunks 60, 62, 64, 66 and 68 are provided. Thus, the various network access devices 52a through 52d are connected to a pair of data trunks as shown in FIG. 2. All of network access devices 52a through 52e are connected to data trunk 60, for example, while only network access device 52a has a connection to data trunk 68.

A network access device 70 having two trunk control units is shown connected to data trunks 60 and 68 and connected with a mass memory disk storage system by means of a device interface 72 with disk storage units 74, 76, 78 and 80. Similarly the network access device 82 is connected with data trunks 60 and 66 and to a second device interface 84 for the same unit comprised of disk drives 74, 76, 78 and 80.

To represent a similar, but separate, combination network access devices 86 and 88 are connected respectively with interfaces 90 and 92 and with a disk system comprised of disks 94, 96, 97 and 98. Finally, a network access device 99 may be connected with a special purpose station 95 which may have any predetermined described function. Thus, the various network access devices according to the present invention can facilitate a variety of intercommunications between the various devices shown connected to the data network and to other devices which may be located elsewhere but not shown on the data network. It is possible for example for disc 94 to communicate through interface 90 network access device 86 through data trunk 64 to network access device 52c and to computer mainframe 50. However, the same network access device 86 may also set up a communication link with computer mainframe 50 by means of data trunk 60 and network access device 52e. The possibilities are obviously too numerous to be described but should become apparent by inspection of the drawing and proper reflection.

Referring generally now to FIGS. 3A, 3B, 3C and 3D, a block schematic diagram of the trunk control unit is shown. Referring now to FIG. 3B, the data communications trunk (trunk 12 in FIG. 1), is shown schematically by numeral 100 connected to data set 101. The data set or modem 101 supplies serial data on data trunk 102 to the serial to parallel interface logic unit 103.

Clock data is provided from the data set to the interface logic unit 103 on bus 104.

Control signals are provided on buses 105 and 106 from the data set 101 to the logic unit 103. Bus 106 conveys the channel active signal indicating that there is activity on the data channel and the Data Ready signal is provided on bus 105 to indicate that data is to be conveyed into the interface logic unit.

Logic unit 103 takes serial clock data provided on bus 104 and generates various clock signals provided to further logic units in the trunk control as to be described later. The logic unit 103 assembles serial data in 8 bit bytes for transmission to further elements of the system as will be described further.

The FCS clock 107 is used to run the FCS register 120 for both generating and checking. The FCS clock unit is also used for clocking data bits into the TCU data memory input buffer 121. The byte clock on bus 108 is used to control the byte input holding register 123 which assembles for the first time the serial data bits into the 8 bit bytes.

The PROM clock 109 and the test clock 115 are the two clocks that run the trunk control unit sequence unit 124 as shown on FIG. 3A. The channel active signal 111, from logic unit 103, the Data Ready signal 113, the byte clock 108 and the clear to send signal 114 are all connected as inputs to the test multiplex switch 130. The output of switch 130 is connected by bus 131 as an input to the PROM 124. The logic unit 103 produces a channel active signal 111 which is sent through test MUX 130 to the TCU microde. The microcode then realizes that a message is to be received off the data trunk and the unit 103 causes the clock to the sequencer to be stopped until the first zero of the sync byte character is detected by unit 103.

Once the first zero of the sync character is detected by unit by 103, the TCU sequencer in FIG. 3A is provided clock signals again which causes the TCU sequencer to be in bit sync with the data coming off the trunk. As the sync character comes into unit 103, it is then put into byte form at unit 123.

From the holding register 123 the data goes to an input bus 140. On this input bus a logical unit decoder 141 determines whether the proper sync character is on the line at that moment. The output 142 of decoder 141 is fed into the test MUX unit 130 for the TCU microcode to test. The output of the decode of the sync byte decoder is 142. The TCU microcode then tests the output of that decoder and if the valid sync character has been detected, microcode will allow the TCU to begin looking at the rest of the message which is coming from the data trunk. As the data is converted into 8 bit bytes at register 123, the bytes are placed on the TCU input bus 140 which also feeds parity generator 146 though bus 145. The parity generator generates odd parity for each 8 bit byte. The output of the parity generator runs to both the input buffer of the TCU 121 and also to an upper byte parity register 147. The clock which stores each byte of data into memory 121 comes from AND gate 148.

The input buffer memory 121 is also used to assemble 8 bit bytes into 16 bit words. First the upper 8 bits of a word are written into buffer memory and then the lower 8 bits and the two parity bits for each byte are written into buffer 123. This necessitates the upper byte parity register 147 which holds the parity of the upper byte until the lower 8 bits are written into memory buffer 123. The clock from AND gate 148 also on bus 149 is used to increment the input counter 150 which is the address of the input buffer memory location which the data word is to be written into. The clock bus 149 is also used to increment the word counter 151 which is used to tell how many words have been put into the input buffer. TCU input bus line 140 also drives a set of drivers at 143. These drivers then drive a large bus 144 which connects to various decoding and logic units. The first byte following the sync character which has previously been discussed is the destination address. The destination address is compared in compare logic unit 160 against the TCU address switches 161. If the output of logic compare unit 160 is brought into the TCU test MUX 130 on line 162 and if the TCU address does compare, then this signifies that the message being received off the trunk is for this designated TCU and thus the rest of the message will be received.

If the output of compare unit 160 indicates that the message was not to this TCU, the TCU will receive the rest of the header portion of the message to pick up the resync parameters which will be described later on. This is necessary for the trunk contention scheme which is used.

The next byte of data which comes onto the input bus from drivers 143 is the function code. This function code is loaded by the TCU sequencer into register 170. The outputs of 170 are then decoded by decoder 171 into the 8 possible function decodes. The TCU sequencer looks not at each of the function codes individually, it looks at them in groups determined by whether data or an information field is to follow this header field or not.

The next two bytes following the function code are access code bytes. They again come through drivers 143 and come into a compare network 181 on bus 180. The function of the access decoder is to match the access code switches 182, 183, 184 and 185 against the two access code bytes which are received from the trunk.

The access code switches 182 and 183 are connected through tri-state buffer 186 to be used to compare against the first access code which is received. Access code switches 184 and 185 go through buffer 187 to the compare unit 181 to compare against the lower or second access code which is received from the trunk. If either of these compares of the two bytes are negative, the TCU will not consider this message to be for it.

The next byte to be received off the trunk is the resync parameter which is loaded by the TCU sequencer into register 145. It is held there until the TCU has received the complete header portion of the message. If the header has been received with no errors, the output of the resync parameter register line 190 is then loaded by the TCU sequencer into the contention counter 191.

The next byte is the source address. The source address is loaded by the TCU sequencer into what is called the FROM register 192. This specifies the address of the TCU which has sent this message. Multiplexer (MUX) 193 which is connected to the input bus during this receive operation has been connecting each byte of the received data on bus 194 into the FCS checker 120.

Following the source address, the next two bytes of data received in the message are the length count of the information field. The length count is specified as the number of 16 bit words which is contained in the information field following this header field. The input bus which now contains the length bytes connects through MUX 193 into the bus 194 and finally into the length counter. The first byte of the length count is the upper length byte and this goes into counter 195 while the second byte of the length of count is loaded into counter 196. Both of these counters are controlled and loaded by TCU microcode. The output of the length counters is brought into comparator 197 which determines whether the length counter is at zero. The output of comparator 198 is brought into the test MUX 130 and is used by the TCU microcode to determine if an information field is to follow this header field because a length field of zero is permitted.

The final two bytes within the header field are the FCS bytes for the header. As these bytes come in on bus 144 and go through MUX 193 and on to bus 194, they enter the FCS checker 120. After both FCS bytes have been clocked into the FCS checker, the output of the checker is brought into the TCU test MUX. The output of FCS checker 120 is line 199. If the output of the checker indicates that the header has been received correctly, the TCU microcode will then load the resync parameter register 145 into the contention counter 191 as previously stated. It will also go on to accept any data field which may follow the header message.

If the TCU, upon receiving a message, detects that the function code indicates that data is to be sent to the memory of the network access device, the TCU will request to connect up to the trunk control interface. After this connection is made, data from the input buffer is fed through tri-state drivers 205 to the bi-directional data bus 206 to the TCI. The bi-directional data bus 206 is an 18 bit path, 16 bits of data with two odd parity bits.

The purpose of the added sync bytes is to allow the receiving TCU time to reset the FCS generator checker and also to allow microcode control time for housekeeping. The two sync bytes are not put into the buffer memory of the TCU.

Following the sync bytes which are stripped out by the receiving TCU, the data field which follows is enabled into the input buffer 121 and the information also flows through MUX 193 on to bus 194 and into the FCS checker 120. Thus, as the data is input into buffer 121, it is also being checked on checker 120.

The TCU sequencer monitors the output of the length counter 198 to determine when all of the data in the information field is received. The TCU sequencer is also monitoring any error conditions which may be connected with the data transfer, it will abort the data transfer anytime any of these abnormal conditions are found. These error lines are lines 200 and 201. As the data information field is received in input buffer 121, the TCU sequencer is monitoring each byte and decrements the length counters through AND gate 202 which drives line 203 for each 16 bits of information field which are received. For each 16 bits of data transferred to the TCI on bus 206, the output counter 207 is decremented. Thus the input counter 150, output counter 207 and word counter 151 are used to control the input buffer 121 in a circular manner.

After the length counter has counted down to zero indicating all of the data has been received, the TCU then must check the FCS characters for the received data field. This is done in a similar manner as checking the header FCS. Thus the two bytes following the data field come through MUX 193 onto bus 194 and into the FCS checker 120. After those two bytes are clocked into checker 120, the output 199 indicates to the TCU microcode whether the data field has been received correctly. If during any portion of receiving the message the TCU has found an error condition, the TCU will terminate the transfer at that point and will transmit a hardware response message back to the sending TCU to indicate the status of the transfer and to convey as much information about the error as possible. Assuming the the message has been received properly and the data has flowed from the TCU input buffer 121 out through the bi-directional bus 206 through the TCI and then stored into the NAD memory, the processor then interrogates the received message and will send back a response to the message received. Thus, this text will now describe how a message is transmitted back onto the data trunk.

Data comes from the memory of the NAD through the TCI bus 206 and into the TCU output buffer 210. This again is an 18 bit word, 16 bits of data with two odd parity bits. The TCU sequencer handles setting up the transfer to the TCU which sent the original command message. The TCU sequencer brings up the signal send request line which is signal 211 telling the data set to send a preamble onto the trunk. The serial parallel logic 103 is used to send all ones to the data set which is a marking condition on the trunk. When the data set 101 has sent this preamble, a signal clear to send line 212 is returned. Clear to send line 212 informs the TCU sequencer that it may begin sending the message. The first byte of data to be sent out is the sync byte character. This byte originates out of the PROM register 220. The output of register 220 is put on the TCU output bus 221 and is fed into the serial to parallel logic unit 103. This logic is also used as the parallel to serial logic and thus the sync byte which is loaded into the register is shifted out in serial fashion onto the send data line to the data set. Along with the send data signal line 213 the return clock line 214 is sent to the data set. This clock is generated in the TCU and is used by the data set 101 to determine the bit times of the data being sent.

The information which follows would now typically come from the NAD memory assuming this is a processor generated response. The data which has come from the TCI on bus 206 and which was loaded into buffer 210 is now broken into eight bit bytes by the tri-state drivers at 225. Tri-state drivers 225 cause the upper 8 bits of the word from memory to be put on the TCU output bus 221 while the output drivers 226 enable the lower 8 bits of the word from memory to be enabled onto the output bus 221. The first byte following the sync byte comes from the FROM register 192. The output of that register is connected to the output bus 221 and goes into the serial to parallel logic 103 and is sent serially to the data set 101. The output bus 221 is also connected through MUX 193 and onto bus 194 and into the FCS generator 120. This logic is now being used to generate the FCS for the header field which is being sent.

The next byte of data following the destination address which has come from the PROM register 192 is the response function byte. This response function byte comes from the PROM register 220 and goes onto output bus 221 and again to logic 103 and out to the data set as well as going to the FCS generator 120.

The next bytes to go out are the three status bytes, paramemter 1, parameter 2, and parameter 3. These three status bytes are sent out as part of a response message.

The next byte of data following parameter 3 is the source address. This comes from the TCU address register 161 and is enabled onto the output bus 221 and out to the data set.

Following the source address is the length field for the information field which is to be transmitted with this response message. A response message in which there is no data field will be discussed first. This is also called a hardware response which the TCU can generate independent of the rest of the NAD hardware. If the hardware response is to be sent, the length field is set to zero. The zeros for the two bytes of length field come from the PROM memory 220 and are enabled to bus 221 through the interface logic 103 and out to the data set. Following the length field is the FCS for the header field. The two bytes of FCS are enabled onto the output bus from lines 230 and 231 onto bus 221 and through the interface logic 103 and out to the data set 101.

Following the FCS, assuming this was a hardware response, there will be no data field but the TCU will send two sync bytes following the header FCS characters. This is to allow the receiving TCU logic time to process the information before the control signals from the data set terminate the transfer. These two sync characters are enabled out of the PROM memory 220 and onto the output bus 221 and are sent to the data set.

Now assuming the case of a response coming from the processor, the header field will be sent as described previously from the first sync byte through the source address. However, the length field will now come from the NAD memory through the TCI onto bus 206 and into the output buffer 206. The upper byte of the length field is enabled through drivers 225 to output bus 221 and is loaded into the interface logic 203 to be sent to the data set. The lower length byte is enabled through drivers 226 to output bus 221 and is sent through interface logic 203 to the data set. These two bytes of length field also are enabled through MUX 193 to the length counter 195-196 and to the FCS generator 120.

Following the length field the TCU again enables the header FCS characters from the FCS generator 120, lines 230 and 231 onto the ouput bus 221 to send these header FCS characters to the data set. Following the FCS characters the TCU again sends two sync characters which originate from PROM memory 220 onto bus 221 and onto the data set.

Following that the information field is transferred. Prior to that transfer the FCS register 120 is reset to all ones in order to generate the FCS for the data field. Data will now come from the TCI onto bus 206 into the output buffer 210. The upper bytes will then be enabled onto bus 221 by driver 225 while the lower byte will be enabled onto bus 221 by driver 226. As each 8 bit byte of data is enabled onto the output bus 221, it is strobed into the interface logic 103 and sent to the data set. This data also goes through MUX 193 and into the FCS generator at 120 to generate the FCS for the data. In addition, length counters 195 and 196 are decremented for each 16 bits of data which are sent out. The TCU microcode monitors the output of OR gate 197 which is in line 198 to determine when the proper amount of data has been completely transferred. When all of the data has been transferred, the TCU sequencer will enable the data FCS characters from the FCS generator 120 onto lines 230 and 231 to output bus 221. These bytes will be sent to the data set through the serial parallel logic at 103.

As data is put onto the output bus 221 from drivers 225 and 226, the parity bits from the output buffer are also enabled onto the bus 221. The parity checker 240 thus is checking the odd parity for each of the 8-bit bytes which come from the NAD memory. The parity check 240 is run through an AND gate 241 which allows the TCU microcode to check only those bytes coming from the NAD memory itself. Eight-bit bytes of data which come internal to the TCU do not have parity appended to them and thus there is no parity on bus 221 at those times. Also AND gate 241 has an input which allows the disabling of the parity check for diagnostic purposes. The output of AND gate 241 is then clocked at register 242 and the clock of the register 242 is the same as the clock which loads the serial to parallel register in the interface logic 103. Thus if there is a parity error on the TCU output bus for the data which is loaded into the serial parallel register, then register 242 will indicate a parity error which is line 200. This parity error line 200 then feeds back into the TCU sequencer test MUX. If an error is detected during the data transfer the transfer will be immediately terminated by the TCU sequencer.

The next kind of message to be discussed is a command message to be transmitted onto the data trunk. This involves using some logic which previously has not been described. In this kind of message most of the data to be sent is coming from the NAD memory. Thus the data comes from the TCI onto bus 206 and through the output buffer 210 and through drivers 225 and 226. The first word which comes from the TCI will contain the destination address and the function field to be sent through the data set 101.

The next 16-bit word of data which comes into the output buffer will also be transferred to bus 229 into the access code generator 243. The access code generator 243 is also connected via bus 188 to tri-state drivers 186 and 187. These tri-state drivers enable the access code switches 182 and 183 onto bus 188 when the upper access code is to be generated and enables switches 184 and 185 onto bus 188 when the lower or second byte of the access code is to be generated. The output of the access code generator 243 is then enabled to bus 221 which is then sent out through the serial parallel logic 103 to the data set. As before, all information which is put on the output bus 221 is also sent through MUX 193 and into the FCS generating logic 120.

Following the two access code bytes the TCU supplies the resync parameter and the source address. The resync parameter is taken from the TCU parameter switches 246 and is enabled through drivers 244 onto the output bus 221. The TCU parameter switches are on bus 248. The source address comes from the TCU address register 161 and is enabled onto bus 249 and through buffer 245 to the output bus 221. This indicates which TCU has sent out this message. The information field length are the next two bytes and they will come from the NAD memory through bus 206 through buffers 210, 225, 226 and out to the output bus 221. When the length field of the header is on the output bus 221 being loaded into the serial parallel logic 103, it also goes through MUX 193 onto bus 194 and is loaded into the length counters 195 and 196.

Following the length field which specifies how many 16-bit words will be sent following this header, are the FCS characters for the header. These two bytes are enabled as discussed before out of the FCS generator 120 and through lines 230 and 231 onto the output bus 221. Also following the header FCS will be two sync bytes which come from the PROM register 220. Following the two sync bytes, the information field comes from the TCI through the output buffer 210 and onto bus 221. As the information is put on bus 221 and loaded into the serial parallel logic register 103, it also goes to the FCS generator logic to generate the FCS code for the data field. As the information field is being transferred, the length counter is decremented one time for every 16 bits of data being sent out. Thus, when the line 198, which indicates length counter has reached zero, is detected by the TCU sequencer, it signals that the end of the information field has been detected. The TCU will then enable the data FCS bytes from generator 120 onto the output bus 221.

Following the data FCS bytes, there are two sync bytes which originate from PROM memory 220 onto bus 221. These bytes conclude the data command message transfer.

The TCU sequencer is made up of 48 bits from PROM memory 124 and each of the first 40 of the bits out of the PROM are strobed into a holding register 250. The output of this holding register hold one instruction. The output is, in part, used to address the next instruction which is to be executed. These bits are used to generate controls from which hardware signal is to be tested to make hardware decisions. The output is also used, to generate strobes to clock various registers and to generate enables to enable various registers to the output bus, for example.

One additional input to drivers 225 and 226 is a line 251. This line comes from a decode of the holding register 250. It is used to select when data from memory is to be enabled onto the output bus 221.

Figure 4A:
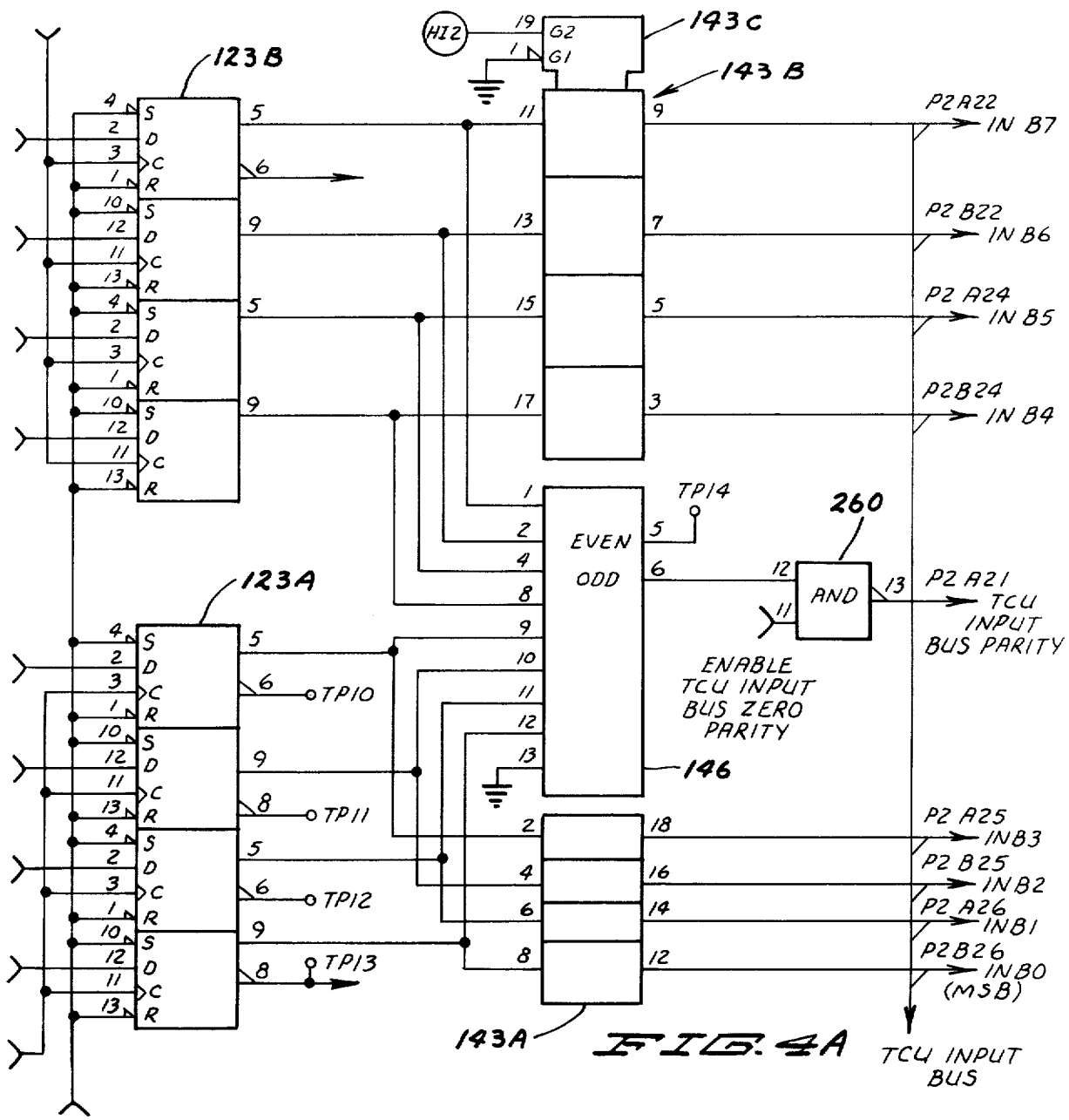
FIGS. 4A and 4B are details of the block diagrams of FIGS. 3A through 3D.
Figure 4B:
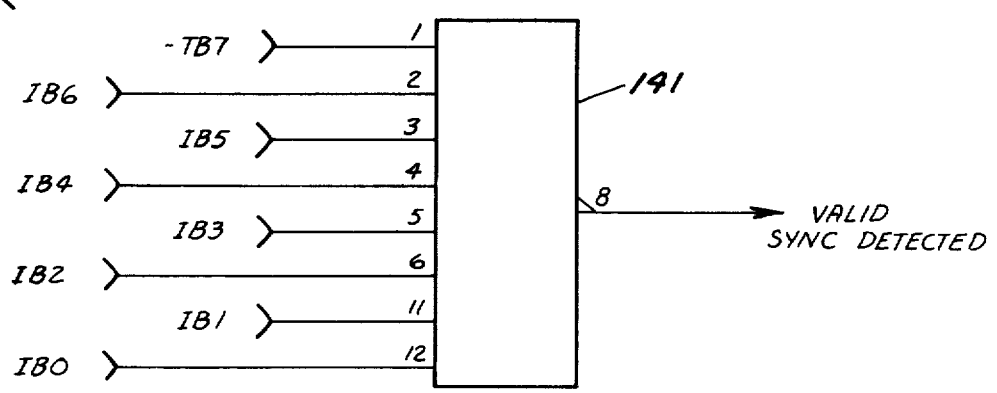

FIG. 4B relates to FIG. 3B AND gate 141. This is a detailed drawing of the valid sync bit detected gate.

FIG. 4A relates to FIG. 3B and is a detailed drawing of the input holding register 123 and the drivers 143. FIG. 4A also relates to FIG. 3C which is the parity generator 146 on FIG. 3C. The output pins shown in FIG. 4A constitute bus 144 shown on FIGS. 3B and 3C. AND gate 260 shown in FIG. 4A, is the gate not shown on the clock diagram 3C but is used to disable passing the parity bit to the input buffer 121 for diagnostic purposes.

The inputs to the input holding register 123, shown in the detailed drawing 4A, are from the serial to parallel shift register contained within the interface logic 103 shown in FIG. 3B. The clock inputs to this holding register also come from that logic and are clocked by the byte clock. Register 123 converts the data from serial into parallel. The output of this register is input to the AND gate in FIG. 4B, which is a valid sync detected gate. This gate determines if the first byte in the message received is a valid beginning of a message. Parity is generated at gate 146 to be put on the TCU input bus. Drivers 143 drive the TCU input bus.

FIGS. 5A and 5B describe part of the logic contained within the serial to parallel interface logic box 103 shown in FIG. 3B. FIG. 5A shows register 300 in which Data Ready, one of the signals from the data set, indicates that data is being received from the trunk. This register delays the Data Ready signal a various number of clock times at the outputs of this chip to provide control signals. One of the outputs goes into AND/OR gate 306 via signal path 305. When Data Ready has been detected, path 305 will go low causing gate 306 to output a one which causes the ring counter comprised of flip-flops 309, 310, 311 and 312 to be cleared.

The flip-flops 309, 310, 311 and 312 comprise a ring counter which is used to develop a timing chain from which all of the clocks for the TCU are developed. As described before, when Data Ready comes into the register 300, line 305 goes low which causes line 308 to go high which also causes OR gate 313 to output a low. This causes the ring counter to clear causing all of the $\overline{Q}$ sides of the flip-flops to become logical ones. AND gates 315 and 316 are used to insure that the ring counters are properly set during start up in power up sequences. The output of flip-flop 312 is fed back around to the AND gate 306 on line 317. This signal line 317 is what is used to complete the ring of the ring counter. When Data Ready is detected, a one signal is started to shift through register 301.

AND gate 304 has as its inputs line 318, which is a Data Ready signal, and the output of inverter 302 which is a delayed Data Ready signal. The output of gate 304 causes a clear signal to be generated to all of the flip-flops in the ring counter thus insuring that upon Data Ready being detected the ring counter is cleared. The output line 320 from register 301 finally becomes a one after seven clock periods. This enables the upper AND gate 306A of gate 306 to be enabled. This stops the ring counter and it awaits for the signal labelled "delayed first zero" to come in from another section of the serial to parallel logic unit. The "delayed first zero" signal starts the clock which causes the TCU sequencer to be in byte sync with the data coming in from the trunk. This is necessary because the TCU sequencer tests and manipulates the data from the trunk on a real time basis.

Once the "delayed first zero" signal is detected, AND gate 306A is made forcing line 308 to be a zero forcing line 314 to be a one. This causes the ring counter to start operating once more. As the $\overline{Q}$ output line 325 of flip-flop 309 goes to a one, this signal goes to AND-/OR gate 326. This positive going edge is fed back around and comes into the clock input of flip-flop 328. This sets the pulse width of the clock which is going to be generated out of inverters 330, 331 and 332. This clock also becomes one of the inputs to AND gate 333. Its output runs into flip-flop 334 whose $\overline{Q}$ output 335 runs through inverter 336 and is used to determine the pulse width of the $\overline{Q}$ output of flip-flop 334. Thus, after the rising pulse edge from flip-flop 309, line 324 causes all of the necessary clocks to be generated for the TCU sequencer. Likewise, the rising edge of flip-flop 309 pin six which is line 340 causes a similar sequence of events to happen. Therefore all the clocks for the TCU sequencer are generated from the pulse edges of flip-flop 309.

The ring counter is operated by a 50 megahertz clock and is fed into the clock inputs via line 341. This causes an 80 nanosecond up and an 80 nanosecond down clock to appear on the output of flip-flop 312 on line 342. OR gate 338 is used to generate a memory clock which is used to write data into the input buffer which is buffer 121 on FIG. 3C. Inverter 337 on FIG. 5B is used to stobe the test inputs from the test MUX 330 to determine the time when the test is taken.

Flip-flop 350 is used at the end of the receive sequence. After the data message has been received, the data set stops sending serial clock and sends only crystal clock. The flip-flop at 350 is used to force the ring counter into a reset state and to allow time for the switching to occur before continuing to generate clocks which run the TCU sequencer.

FIG. 6A is a detail of the function register 170 shown on FIG. 3B. Register 170 is loaded from the TCU microcode signal line 371. The inputs to register 370 come from the TCU input bus 372 which is also the same as bus 144 on FIG. 3B. The outputs of register 370 go to decoder 375. Decoder 375 decodes bits in the function code which relate to diagnostic functions. These allow various parity generators to be disabled so that parity checkers with the TCU input bus line may be checked.

Output line 391 is the upper bit of function register 370 and is used to determine whether the message is a command message or a response message. If line 391 is a command message, its level should be zero to enable decoding of a function code. The function field on a response message should contain only this upper bit and no function code should be decoded for a response message. This is done by pin five of decoder 384 and pin four of decoders 385 and 375 being connected to line 391. Decoder 384 is used to decode functions which control the workings of the NAD processor and decoder 385 is used to decode functions which transfer data or control the TCU and TCI.

To prevent accidental or unauthorized control of the NAD processor, line 396, not enabled, going into decoder 384 pin four is connected to a switch which is under lock and key which disables the decoder if it is not intended for the TCU to manipulate the NAD processor.

Decoder 385 is used to determine what sort of function the TCU is to perform. The output line 397 is a function which the TCU handles on its own and is a function which can be used to obtain status from the TCU which has been addressed.

Function line 398 is a master clear function which is used to master clear the NAD processor. However this signal must go through AND gate 389 which again is connected with the enable switch.

Lines 399 and 400 along with line 401 out of AND gate 387 tell the TCU sequencer that the message received is going to contain an information field following the header. In this case, the TCU must connect up to the TCI in order to input that data into the NAD memory. AND gate 386 is used to disable the not Data Ready condition at times when a lost data condition on the trunk is not checked. AND gate 383 is used to disable the TCU input bus parity bit. This allows checking of the parity checker on the input to the TCU memory and thus this is a diagnostic feature which can be used to verify that the data path is functioning correctly.

The AND gates at 380, 381, 382 perform a similar function as AND gate 383 which was just explained. These gates are used to disable various parity bits in the input bus networks to ensure that the input bus from the TCU all the way through to the NAD memory is functioning correctly and it is to be used with diagnostic functions to verify its correct operation. FIGS. 7A, B, C, and D relate back to FIG. 3C input buffers 121 and tri-state drivers 205 of the bi-directional data bus lines 206. The TCU input bus 144 in drawing 3B comes into FIG. 7A in the upper left-hand corner and goes into parity checker 410. This provides a parity check on the data between the point where it was formed into an 8-bit byte and where it is put into the memory. If a parity error is detected, AND gate 436 will clock flip-flop 438 causing flip-flop 438 to set indicating a TCU input bus parity error. This will also turn on LED 439 to give a visual indication.

The TCU input bus goes on from the parity generator to become inputs to the TCU input buffer which are RAM memory chips 412, 414, 416, 418 and 420 located on FIGS. 7A and C. The upper byte of a 16-bit word is contained in chips 412 and 414 whereas the lower byte of a word is contained in chips 416 and 418. The two parity bits, one for the upper and one for the lower bit, are contained in memory chip 420. Since both parity bits are contained in the same memory, the parity for the upper byte is held in flip-flop 434 until the lower byte is written. The 8-bit input bus comes into these chips and memory is used to assemble 8-bit bytes into 16-bit words. The output of memory comes out to tri-state drivers at 422, 424, and 426 on FIGS. 7B and 7D. These tri-state drivers are turned on by the TCU when the TCU is sending data to the TCI. These tri-state drivers correspond to FIG. 3C driver 205. Line 206 on FIGS. 3C corresponds to the outputs of drivers 422, 424, and 426. The outputs of drivers 422, 424 and 426 go through two parity checkers, an upper parity check 428 and a lower parity check 430. The outputs of these parity checkers go through OR gate 432. The output of gate 432 becomes an input to flip-flop 440. If when the TCU is sending data to the TCI, a parity error is detected on the 16-bit bi-directional bus, then the flip-flop 440 will be set indicating a parity error condition. Driver 426 sends the upper byte and lower byte parity bits to the TCI as well as the control signal indicating to the TCI when the data is valid on line 450 on FIG. 7D.

FIGS. 8A and 8B show the controls for the TCU input buffer. Flip-flop 500 in FIG. 8A is used to control the bi-directional data bus 206 between the TCU and TCI. This flip-flop is controlled by the clear to send signal from the data set. This signal is used such that when data is being received, the driver 205 is enabled to send data to the TCI. When a message is sent out, the clear to send line will be active and will cause the Q output of flip-flop 500 to be a zero. If flip-flop 500 is reset, the drivers 205 are disabled and the TCI is engaged to send data on bus 206 to the TCU.

AND gate 504 has the memory clock as well as enable line 505 from the TCU sequencer as inputs. AND gate 505 allows the TCU sequencer to control what data bytes to put into memory. As stated before, there are two sync bytes between the header and the data field which are not used. Signal line 505 causes the TCU sequencer to delete these two characters from the message as it is stored in NAD memory.

The output of AND gate 504 on line 532 goes to flip-flop 526, AND gate 530 and flip-flop 520. Output line 532 is a clock pulse signal and flip-flop 526 is a simple divide by two flip-flop which selects either writing to the upper 8-bits of the input buffer or writing to the lower 8-bits of the input buffer. AND gates 528 and 530 are used along with the outputs of flip-flop 526 to develop the write signals for the upper and lower parts of the buffer memory. As words are written into the buffer memory, the input control counter 514 is incremented. The input and output control counters 514 and 512, respectively, go through MUX 522 and become the address lines for the TCU input buffer RAM memory chips. The MUX operates on an 80 nanosecond period clock and thus the address is switched from the input counter to the output counter and back again every 80 nanoseconds. This allows a write into the buffer memory and a read out of the buffer memory all within a 160 nanosecond time period which is one byte time on the data trunk. For each word written, the input control counter is incremented and word counter 516 is also incremented. The memory chips used in the input buffer are 16 words deep. Therefore the carry input of word counter 516 goes to flip-flop 520 and if 16 words of data are written into the buffer, then flip-flop 520 will be set which will cause a buffer overflow condition to be noted and LED 521 will light as well as sending out a signal indicating this error condition has occurred.

Typical operation would be that as data is put into the memory from the TCU, the TCI would be taking data out of the memory and thus the word counter would never increment up to 16 because the word counter will be decremented each time a 16-bit word is taken out of the buffer. OR gate 518 simply detects whether the word counter has reached zero. When the word counter is equal to zero it means that no data is left in the TCU input buffer. TCU diagnostic functions are enabled only on the data portion of a transfer. If the TCU diagnostic functions consist of disabling the various parity generators along the TCU input bus on the header portion of the received message, the message would most likely be disregarded because of these induced errors, and thus flip-flop 506 along with AND gate 510 and inverter 508 are used to disable the decoding of the diagnostic portion until the data field part of the received message has been encountered.

FIGS. 9A, 9B, 9C and 9D all relate back to FIG. 3A. These four figures comprise one part of the TCU sequencer. The instruction memory PROMs 124 are shown in FIGS. 9A and 9C. The outputs of PROM 124 shown in FIG. 9A hold the next address portion of the instruction. Every instruction in the TCU microcode has a next address field and every instruction within the microcode is a jump instruction. Each jump is a decision jump based on the output of test MUX 130 shown in FIGS. 9B and 9D. Test MUX 130 shown on those two figures have hardware bits as inputs. The test MUX is controlled from the instruction memory 124 shown in FIG. 9C. The outputs of the PROM memory control which one of the many hardware input bits will be selected to be tested within any one instruction.

The output line 550 of the test MUX is fed to the data input of flip-flop 551. The clock into flip-flop 551 is the test clock which is generated from the serial to parallel interface logic 103. This clock determines the time at which the bit to be tested will be strobed. The output of flip-flop 551 becomes the low order address bit of the next instruction. The decision making capability of this particular sequencer is determined by running the test bit as the lower order address bbit and thus either the next address as specified by the outputs of holding register 250 will have either a low order bit of 0 or 1 depending on the output of the test MUX.

The output of holding register 250 goes to parity check network 552 and this checks parity on the 8 bits of the next address field. The microcode is set up such that every 8 bits of instruction has an odd parity bit associated with it. In FIG. 9C, the instruction memory 124 also connects to register 555. The outputs of register 555 feed the parity check unit 556. This same scheme is repeated throughout the rest of the TCU sequencer logic.

Every instruction in the TCU microcode is a jump instruction. However, in order to simply sequence through memory, the lower bit of the current instruction address is brought out from line 124 into inverter 560. Line 561 brings that lower bit into the test MUX. The instruction memory which selects the test MUX may now test the lowest order bit of the current instruction and the assembler puts the proper bit in that instruction so that the next sequential instruction will be executed. The assembler takes care of putting in the proper next address in the instruction memory 124 as shown in FIG. 9A. By using the low order bit, sequential operation through memory occurs, although the logic of the microcode is actually testing the low order bit.

Lines 565, 566, 567, 568 in FIG. 9C and line 580 on FIG. 10A go to enable one of the five test MUXs. Lines 570, 571 and 572 are then used to select which one of the eight input signals to the selected MUX will become the output of the test MUX. One signal out of all of the input signals to the test MUX becomes the input to flip-flop 551.

Referring now to FIGS. 10A, 10B, 10C and 10D, the instruction memory 124 shown on FIGS. 10A and 10C has its outputs connected to the holding registers 250. The outputs of the holding registers are two parity checkers. A parity bit is associated with each of these two 8-bit bytes. From the outputs of the holding register, the bits go to decoders shown on FIGS. 10B and 10D. The decoders are used to select various registers within the TCU logic and to provide various clock and strobe processes to other registers. All of these decoders provide the interface between the microcode and the hardware. In FIG. 10B flip-flop 610 is used to enable the length counters to count after they have been loaded. The length counter is shown in FIG. 3C at 195 and 196. Line 615 out of decoder 604 is used to clear the FCS register 120 shown on FIG. 3C. The FCS register needs to be set to one before any information is run through the register. The signal line 616 from decoder 604 is connected to the TCI and is used to provide the interupt number which the TCU sends to the TCI at the end of an operation. Signal line 617 loads a status register from the TCU into the TCI. Line 618 loads the FROM register 192 shown on FIG. 3C. Signal line 619 is used to load the resync register 145 shown on FIG. 3B. Line 620 loads the resync counter and is shown on FIG. 3C. Signal line 621 is used to reset the input and output word counters in the input buffer memory 150, 207 and 151 in FIG. 3C. Signal line 622 is not used. Signal line 623 loads the upper length counter 195 shown on FIG. 3C. Signal line 624 loads the lower byte in length counter 196. Signal line 625 enables the TCU address switches 161 onto the TCU output bus. Signal line 626 enables the access code onto the output bus 243. Signal line 627 enables the resync parameter switches 246 onto the TCU output bus. Signal line 628 enables the PROM memory onto the output bus.

Signal line 629 enables the upper or first 8 bits of the FCS onto the TCU output bus and this is shown on FIG. 3C as an input to logic block 120. Signal line 630 is an input to logic block 120 which enables the second or lower byte of the FCS onto the TCU output bus. Signal line 640 enables 8 bits of status information onto the TCU output bus to be sent to the data trunk. Signal line 641 enables the TCU address register to be enabled onto the output bus to be sent to the data trunk. Signal line 643 also enables an 8 bit byte of status onto the output bus to be sent to the trunk.

Signal line 649 from decoder 606 is used to decrement the length counters 195 and 196 shown on FIG. 3C. Signal line 650 is used to clear the latch register which holds various hardware bits which control transmitting and receiving of data. The latch bits will be explained later on in more detail.

The signal line 651 is used in conjunction with the error address register as a clock signal to load the TCU microcode address which has detected an abnormal condition into the error address register. The error address register contains the microcode address which has detected the abnormal condition. This provides a trace mechanism in tracing errors.

Signal line 652 is a clock signal which resets a timer mechanism which the TCU microcode uses to timeout various events. The timer operates from a reset condition. The timer has four time interval lines which the TCU microcode samples to determine when a certain amount of time has elasped from the time the timer was reset.

Signal line 653 loads the function register 170 shown on FIG. 3B. Signal lines 654, 655, and 660 are used to convey status information from the TCU to the TCI. Signal lines 673, 672 and 671 are used to control the PROM memory shown on FIG. 3D. These lines are used to select one of three different bytes which can be selected from the PROM memory onto the TCU output bus. Signal line 674 is the output used to select which of the switches to be gated onto the access code bus 188 to be used for either comparing access codes or for generating access codes. Line 674 is shown on FIG. 3B and is an input to buffer 186.

Signal line 675 is used to enable the TCU output bus to the TCI in order to send status information to the TCI. Thus, this signal is used along with signal lines 654, 655 and 660 to convey status to the TCI. Signal line 676 is used to enable tri-state drivers 225 and 226 to put data onto the output bus of the TCU.

FIGS. 11A, 11B and 11C detail the TCU sequencer, more specifically, the instruction memory, the holding register and the addressable latch system. The instruction memory again is shown as 124 on FIGS. 11A and 11C. The outputs of the instruction memory are held in holding register 250. The output lines of the holding register from FIG. 11A goes to FIG. 11B where these outputs are used to control the setting and clearing of the addressable latch shown in 11B. The addressable latch has two sections 700 and 701. The outputs of this addressable latch are control signals to other logic in the TCU which the TCU microcode cannot control at every instruction cycle so these bits are stored in the latch.

The first bit out of addressable latch 700 which is signal 702 is the send request. This is a signal sent to the data set telling the data set that the TCU is requesting to send a message and asking the data set to send a preamble of ones onto the data trunk. In response, the data set sends a clear to send signal.

The signal line 703 is a transmit request signal sent to the TCI requesting that the TCI connect to the TCU in order to do a transmit. This signal is brought up in response to the TCU detecting a signal from the TCI saying that the TCI has a message to transmit to this TCU trunk. Signal line 704 is also used during a transmit and enables a write timing chain in the TCU hardware which sends out an 8-bit byte which loads every 160 nanoseconds into the parallel to serial register. The timing chain provides all the timing to correctly load the bytes as needed. The flag signal line 705 is an internal signal used by the TCU microcode. The TCU microcode can set this bit and then test it. This is a substitute for subroutining capabilities so that the microcode can decide which of two paths the microcode should take when coming out of a common routine. It is also used to indicate certain error conditions within the microcode. signal line 706 is the not received request and is similar to signal line 703 in that it is sent to the TCI. This signal requests the TCI to connect to it because this TCU is receiving a message from the trunk and wants to send forward that received message to the NAD memory.

Signal line 707 is used by the TCU microcode to enable the message being received to be recorded into the TCU input buffer memory 121. This line 707 is shown coming into AND gate 148 on FIG. 3C. It also is used to control the clock going into the FCS generator checker, also shown on FIG. 3C. Signal line 708 is used to enable a master clear function to the TCI when a master clear function is the function command received in a message. Signal line 709 is a status bit which is set when an illegal function command has been detected in a received message. Thus, status gets sent back as part of the response message indicating to the sender that the function to be executed cannot be executed. Signal lines 710 and 711 are controlled by microcode during diagnostic functions. They are used to enable data to be looped back from the output bus to the input bus and back into the TCI. Signal line 712 is a status bit indicating that the TCU microcode has determined that the received message has an FCS error in it. Signal line 713 is another internal flag signal or indicator signal to the microcode which tells the microcode whether it is doing a transmit sequence or whether it is doing a receive sequence. Line 713 is used to decide which path to take once a microcode instruction comes out of a common routine and this acts as a substitute for subroutine functions.

Signal lines 714 and 715 are used to control the transmitting of data from the TCU output buffer to the TCU output bus. LED 740 connected to latch 701 is used as an idle indicator. When the LED is on, the microcode is in its idle loop. The TCU microcode will shut the LED off whenever the microcode leaves that loop.

Inverter 741 and AND gates 742 and 743 are used to write information into either addressable latch 700 or addressable latch 701. There is a clock input into gates 742 and 743. The other two inputs to gates 742 and 743 control which of the latches will be written into. Lines 747, 748, 749 and 750 control which of the 8 bits will be written and whether the bit will be set or cleared in the addressable latch. The holding register shown in FIG. 11C simply holds all of the parity bits for the instruction memory. All of the parity bits for the instruction memory are held in that holding register.

Flip-flop 760 is used when a 1K instruction memory is used. The TCU will either accept a 512 instruction or a 1K instruction memory. If a 1K instruction memory is used, this flip-flop will provide the needed extra address bit to utilize the 1K capability for that particular PROM.

In FIG. 11A, the address register sections 1, 2, and 3 are used to delay the address which is addressing the instruction memory. The outputs of address register section 2 go to the inputs of the TCU error address register. If an error is detected, the microcode will load the microcode address which detected the abnormal condition.

Referring now to FIGS. 12A, 12B, 12C, 12D and 12E, the trunk control interface is shown on the first four mentioned figures while the universal device interface corresponding to device interface 40 in FIG. 1 is shown on FIG. 12E. In each of the figures reference numeral 32 is used to denote the internal network access device data trunk as shown in FIG. 1. Rx refers to receive data while Tx refers to transmit data.

Referring now particularly to FIG. 12A, the Rx data buffer 800 receives information from the TCU/TCI bus labelled 801 on this figure. This mechanism synchronizes the connected TCU and NAD memory using buffer registers and the control logic for these buffers or the microcode instruction loop. Rx data buffer two 802 serves as a control package mechanism to interlock the Tx and Rx commands. The TCI request word is controlled by the microprocessor Rx program. The Tx enabled bit, bit 12 and this word, interlock the Tx request word. The TCI microcode forms the interlock. The processor program rules are that the Rx program only changes the request bits in the TCI request word and the Tx program only changes the request bits in the Tx request word. The Rx parameter and the Tx parameter are therefore also controlled exclusively by the appropriate processor program.

Referring now to FIG. 12B, the memory data register 803 is a hardware mechanism interlocking the control package TCU Rx and Tx enables. The hardware locks out any Tx enables to TCUs not enabled to receive. This eliminates the problem where two network devices want to transmit to each other and do not want to or forget to permit a receive command. This relates to the rule of the NAD that you must establish a listening return path if transmission is desired. The mechanism of allowing or requesting more than one TCU to transmit the message means that the first TCU that gets a data truck will transmit the message. Redundant data trunks or do not care which trunk or which user and other commands will allow the work to be accepted and accomplished. A multiplex switch 804 provides one input to register 803. This multiplex switch forms a mechanism to hold up or to have the TCU wait for the microprocessor to generate a response for another message. This mechanism also allows the TCI to generate responses such as for autodump and diagnostic loop back functions.

Referring again to FIG. 12A, the first and second Rx data buffers 800 and 802, respectively, receive data from the trunk control unit on trunk control unit bus 801. Buffer register 800 receives data which is passed through buffer 802 in a resynchronization process. Thus, register 802 receives data from the trunk control unit through the first buffer register 800. The contents of the first register 800 are immediately loaded into the second register 802 for transfer to memory.

Referring now to FIG. 12B, memory write data register 803 holds data to be written into the network access device memory 36 as shown in FIG. 1. Multiplexer 804 provides one input to the write data register 803. This multiplexer passes the parity bits received from the Rx buffer register 802 to the write data register 803 or in the case of TCI data generated internally, multiplexer 804 connects the parity bits generated by the parity generate check logic unit 805 to the write data register 803.

Referring again to FIG. 12A, Tx data buffer 806 holds data to be transferred to the TCU for transmission. This register performs part of the resync and buffering functions between the NAD memory and the TCU transmit operation. The output of the Tx data buffer 806 is connected through the bi-directional trunk 801.

Referring again to FIG. 12B, the read data register 807 catches and holds data received from the NAD memory for internal use in the TCI or for transfer to the Tx data buffer 806 for a TCU data transmit operation.

Multiplexer 808 passes on the parity bits from the read data register 807 to the Tx data register 806, or in the case of TCI internally generated data, it connects the parity generate check logic unit 805 to the Tx data register 806 in order to attach proper parity bits to the TCI generated data.

The parity check and generate logic unit 805 checks parity on data received from the TCU or read from NAD memory. In the case of the TCI sending status information or data to the NAD memory or to the TCU, this logic generates the proper parity bits for the data or status information to be sent.

Multiplexer 810 connects the parity bits from the TCU Rx data buffer 802 or the read data register 807 to the parity check logic input in order to perform the proper parity checks. Multiplexer 810 also conditions the parity check generate logic to enable it to generate the proper parity bits for TCI internally generated data. Registers 812, 814 and 816 are status registers which are loaded by the connected TCU in order to pass on the status information generated by the TCU to NAD memory. Control flag register 818 performs the resynchronization and latch function required by the TCI to present stable data to the parity check generate logic unit 805 and to the universal device interface microsequencer test logic. The trunk control interface status logic 820 is a tri-state bus driver to connect the TCI internal status information to the control flag register 818 input.

TCU interrupt register 822 is loaded by the connected TCU in order to inform the TCI of the results of the operation which was performed. The code loaded into this register is also stored into the NAD memory as status information. The TCI test unit 824 is a tri-state bus driver to connect the internal operating status for the trunk and control interface to the control flag register 818. The TCU control latch logic 830 is a mechanism by which the trunk control interface passes on control and status information on bus 831 to the connected TCU on a TCU status bus 832 shown in FIG. 12A. The Rx enable and write request logic unit 834 shown in FIG. 12B perform the mask function of allowing only the receive enabled TCU to be requested to output data to a trunk. This logic also latches and holds the request until a TCU conncts to the TCI.

The TCU priority and connect logic unit 836 performs contention resolution on a request by two or more TCUs to connect at the same time to the TCI. The logic to mask out unselected TCUs or TCUs not enabled is also performed in this unit. Buffers 800, 802 and 806 perform certain logic functions in connection with the data transfer sequence used by the TCI. A waiting flip-flop disables the low clock to the device interface register. When the clock is disabled, the data transfer instruction does nothing because the low clock signal is blocked to inhibit the generation of clock signals for the NAD memory request, the length counter and address counters thus preventing the data transfer to or from a TCU Tx or Rx data buffer.

Referring now to FIG. 12E which contains the universal device interface or device interface 40 as shown in FIG. 1, the tri-state transmitters to the network access device address bus 850 are shown connected to bus 32. The address counter function for the NAD memory addressing is performed by address counter 852. Similarly, length counter 854 counts the length of the data message sent. Multiplexer 856 is selected to allow the address or length counter 852 or 854, respectively, to be connected to the bus 32.

The assemble/disassemble register 860 is used by the TCI for testing of bits, temporary storage, etc. It is not used for the purpose of assembling and disassembling but this type of register is required for this function.

Length counter 854 is used to decrement from a predetermined starting number to determine the length of a data transmit operation or the buffer size limit on an input or receive operation. The shift network 862 permits a shift of 0, 4, 8 or 12 places on data passing through it. The bit set/clear flip-flop 864 is used to allow the setting or clearing of bits 8 through 15 from transferring data into a register.

Tri-state transmitter 866 is used to connect the file register 868 to data bus 32. The file register may be a 16 word by 16 bit file register to store operating parameters and status information. The test multiplexer 870 is used to permit the testing of the contents of the register which is then currently enabled into bus 32.

PROM transmitter 872 is used by the TCI to force bits 0 through 7 on bus 32 to zeros or ones when PROM data is selected to the bus bits 8 through 15. This is to avoid interference on the bus. Thus, the other section of transmitter 872 relating to bits 8 through 15 connects PROM data from PROM 874 to bus 32.

A microsequencer 876 generates addresses, and contains a data stack for fabricating microcode subroutines and also functions as a test mechanism for performing conditional branches. The PROM 874 is a programmable read only memory for storing control programs.

Address latch 878 is an addressable latch for use as required by the programming. The go, stop and master clear functions are permanently assigned to latch 878. The remainder of the latch is not used by the TCI. Clock logic unit 880 is a register clock to determine which register data on the bus 32 is to be loaded into. Clock unit 882 generates address and length counter clock signals and permits parallel operation with other register clock signals. The bus select logic unit 884 determines which register or data is to be enabled into 32. Clock unit 886 is a register clock source. This completes the specific description of hardware elements. The operation of a NAD according to the present invention will now be described.

The NAD bus 32 in FIG. 1 is an interconnect link between the various elements of the NAD. Attachments to bus 32 include the trunk control interface 30, the NAD processor 34, the device interface 40, the memory 36 and the maintenance interface 38. Use of bus 32 is divided equally among the three active elements: the TCI, processor 34 and the device interface 40. Bus access is by time division multiplex with equal access guaranteed for all elements. By way of example, a system according to the present invention may operate on a 320 nanosecond time frame with 106.6 nanosecond apportioned to each device. Thus within its access time slot, the appropriate active element can access any bus address.

Referring now to the drawing figures, the following symbols are used on various signal lines to denote the following functions. The minus M/C signal indicates that a master clear function was received by a TCU which is enabled to control the NAD, or the TCI generated a master clear to the TCU. The minus Rx Data Ready signal loads data from the connected TCU input data buffer into the first TCI input data buffer. The minus TCU Tx Buffer Empty signal informs the TCI that the connected TCU output data buffer can receive data. The Interrupt/Status Enable signal specifies the interrupt sent to the TCI as follows: interrupt zero is an abnormal end Rx command, interrupt one is an abnormal end Rx sequence, interrupt two is an adnormal end Tx sequence, interrupt three is an end of Rx command, interrupt four is an end of Rx sequence, interrupt five is an end of Tx seequence and interrupt six is a stream mode time out warning.

The minus load INT signal latches the three TCU encoded interrupt lines into the TCI interrupt register. The minus status CLK0 signal latches TCU status information into the upper 8 bits of the TCI status one register. The minus status CLK1 signal latches the TCU error address into the lower 8 bits of the TCI status one register. The minus status CLK2 signal latches TCU status information into the TCI status two resiger.

The minus disable data bus Tx register parity check signal, when active, disables checking parity on data the TCI received from the connected TCU. The minus TCU Rx request signal indicates the requesting TCU has received a header message containing the proper TO address and access code fields and is requesting to be connected to the TCI. The minus TCU Tx request signal indicates that the TCU time slot has come up while the TCI Tx request line was active and the TCU data set has captured the data trunk. The TCU length or word count not equal to zero signal provides the TCI with a live status of the connected TCU input buffer condition. The minus TCI Tx request signal indicates that the TCI wants to transmit a message to the trunk or perform a processor initiated diagnositic on the TCU receiving the signal. The minus TCU connected signal indicates that this TCU is logically connected to the TCI. Only one TCU may be connected at a time to a TCI. The minus TCI Rx Buffer Empty signal tells the TCU that the TCI first input buffer can receive data. The minus Tx Data Ready signal loads the TCU output buffer with data.

Referring now to FIGS. 3E and 3F the message field definitions will be discussed in detail. The TO address field is the first 8 bit byte following the synchronization character in the header field. This field defines the logical TCU on the trunk to which the message is directed. Each TCU on the trunk receiving a message compares this field with its own 8 bit logical address. If they match, the TCU will process the remainder of the header field. If the fields do not match, the TCU does not process the remainder of the header field except to input it to its frame checking (FCS) logic. After receiving the complete header field, the TCU tests the results of the FCS logic to determine if the message was received error free. If no errors occurred, and the message was a command message, the TCU will load the received resync parameter into its resync counter. If an error was detected the message is ignored.

The function field is the second byte following the sync character. The function field has four subfields: response command frame, enable TCU trunk diagnostics, trunk diagnostic functions and command functions. In all cases the TO addresss and the header frame check test must be correct before any part of the function field is executed.

The command functions are used by the TCU/TCI to control the data link. The command codes are: 0 is resync, 1 is master clear, 2 is data command, 3 is enable TCI trunk diagnostic command, 4 is autoload, 5 is autodump, 6 is go and 7 is step. The length parameters must equal 0 for command codes 0, 1, 6, and 7. Any data sent with these commands will be lost. The TCU must be enabled by the NAD control switch to process commands 1, 4, 5, 6 and 7.

The resync command code is 0. This command is basically a NOP function which can be used to get the hardware status of the TCU/NAD on the data trunk. The resync parameter field value is inserted by the transmitting TCU hardware. The only action taken by the TCU in response to this command is to load the received resync parameter into its resync counter and to transmit a hardware status response message.

The master clear command code is 1. When this command is received, the TCU tests the enable NAD control signal which is switch selectable. If the TCU is not enabled to control the NAD, the TCU will perform a resync command and will return illegal function status in the hardware response. If the TCU is enabled to control the NAD, and the header FCS has been verified, the TCU will activate the M/C (master clear) line to the TCI for two instruction cycles. The M/C line is bi-directional, connecting all four TCUs and the TCI. This line may be activated by the TCI or any of the TCUs in order to initiate a master clear function. Each TCU receiving the M/C signal compares with the master clear command decode. This is to prevent the TCU which initiated a master clear command to a trunk from master clearing itself and being unable to generate a response message to the command. The response message to a master clear command is transmitted after the TCU sends the master clear signal to the TCI. If the TCI is connected at that time, a processor response will be sent or otherwise the TCU will send a hardware response.

When a TCU detects the master clear signal, it will execute its master clear microcode sequence and will then wait for a predetermined time to receive a command message with which to resync itself with normal trunk operations. If no message is received in this predetermined time, the TCU will send out a trunk resync message and return to its normal idle loop function.

After a master clear, the TCI will accept only the GO, autoload or autodump commands from the connected TCU.

When multiple TCUs in a NAD are enabled to control the NAD processor, the last TCU which sent a master clear to the TCI will be the only TCU through which the GO, autoload and autodump commands will be accepted. Sending, simultaneously, master clear commands to multiple TCUs on a NAD is an illegal system function which must be avoided. If one TCU sends a master clear and starts an autoload sequence, there is no way to prevent another TCU from master clearing the first. The first autoload sequence being halted will be retryed and then halt the second autoload sequence, etc.

The data command code is 2. The TCU will request to connect to the TCI after the TO address and access code have been received and checked. If the header FCS characters indicate that the header field contained an error, the TCU will withdraw its connect request to the TCI and will ignore the message. If the TCI is already connected to the TCU, the TCU will send status to the TCI containing the FCS error status followed by an abnormal end of Rx command interrupt. The TCU will wait for the data set to drop the channel active signal before returning to its idle mode.

If a TCU successfully connects to the TCI and the header is okay, the header and data fields including all FCS characters will be stored into the NAD memory starting at the address assigned by the processor. After the TCU has received all the data from the trunk, it will capture the trunk and wait for a predetermined period of time if not in the data streaming mode for the processor trunk control interface to provide a response message. The TCU will send a hardware response if the processor does not provide one.

Any of the following conditions will terminate a data transfer resulting in data following the error being lost:
1. TCU connected signal drops out,
2. Modem Data Ready signal drops out before TCU data length counter equals 0,
3. TCU input bus parity error,
4. TCU/TCI bus Rx parity error,
5. TCI bus parity error,
6. TCI detected error, or
7. TCU input buffer overflow.

If the TCU is unable to connect to the TCI, it will perform a resync function and the TCI not connected status will be sent in the hardware response.

The command code for the enable TCI trunk diagnostics command is 3. The receiving TCU need not be enabled to control the NAD in order to execute this command. The header length parameter may be 0 only if the diagnostic requires no data to be transferred to the TCI. All of the remaining TCU processing steps for this command are the same as for the GO command. When the TCI decodes this command, it will then decode the TCI trunk diagnostic function field and determine the diagnostic action to be performed. This is a microprocessor function and will not be described in detail.

The command code for the autoload command is 4. If the receiving TCU is not enabled to control the NAD, the TCU will perform a resync function and will return illegal function status in the hardware response. The TCU should already be enabled to connect to the TCI due to a master clear command which must precede this command. The TCI then loads the NAD memory starting at 0 with the contents of the information field in this command message. The TCI discards the header and FCS fields. The number of 16 bit words loaded into memory is specified by the length parameters in the header field received for this command. A processor response is sent by the TCU after the TCI inactivates the wait processor response signal. If another autoload command is received, the data is loaded following the last word of the data from the previous autoload command. The GO command or a processor running status signal will terminate the autoload sequence and disallow autoload commands.

The command code for the autodump command is 5. If the receiving TCU is not enabled to control the NAD, the TCU will perform a resync command and will return an illegal function status in the hardware response. If the TCU is enabled to control the NAD, the TCU will request to be connected to the TCI after the header FCS is verified. The TCI will send wait for processor response to the TCU, to prevent it from sending a hardware response message immediately and will connect to the TCU. Once connected the TCI will input the header. The TCI sets up the data transfer from the NAD memory and will clear the wait for response signal. The TCU then transmits a processor response followed by a data field. This response data field is the contents of the NAD memory starting at the address specified in the second word of the data field. The number of 16 bit words transferred is specified by the first word of the data field of this command. The second word of the data defines the starting address. The TCU will generate and send the FCS characters for the information field.

The GO command code is 6. If the TCU is not enabled to control the NAD, the TCU will perform a resync command and will return illegal function status in the hardware response. If the TCU is enabled to control the NAD, the TCU will request to connect to the TCI after the header FCS is verified. The TCI will pick the function field out of the header field being transferred and will decode the command code field. Upon decoding a GO command the TCI will issue a go signal to the processor. The TCU will transmit a processor response message after the TCI inactivates the wait processor response signal. The TCI will decode and execute this command at any time. If the TCU is unable to connect to the TCI, the TCU will perform a resync function and will transmit a hardware response message with the TCI not connected status set.

The command code for the step command is 7. This is the same as the GO command except the TCI issues step and GO commands to the processor which cause the processor to execute a single instruction.

The access code field is 16 bits long and is contained in the third and fourth bytes of the header field. This field is processed as four independent 4 bit groups. The TCU hardware modifies the access code when a command message is being transmitted. In general terms, the access code is a concatenation of switch selectable hardware bits and of processor generated software bits, although an all hardware or all software access code system is possible.

To generate the access code, each 4 bit group is processed as follows. If any of the hardware bits associated with a specific 4 bit group are non-0, the hardware bits will be sent as that 4 bit group of the access code. If all the hardware bits for a group equal 0, the software bits will be sent as that 4 bit group of the access code. The TCU hardware compares the received access code field with its own switch selectable hardware access code bits only on a command message.

In response messages, the access code field bits in the header are used to send status information back with the response. When the TCU hardware checks the access code field, each 4 bit group is processed independently as follows. If any of the hardware bits in a 4 bit group of the receiving TCU are non-0, the corresponding 4 bit group of the received access code must match the hardware bits. If all the hardware bits of a group equal 0, the corresponding group in the received access code is a software access code which is not compared with the hardware bits. It is up to the NAD processor to verify these software access codes.

The resync parameter field is the fifth byte of the header field. This field is inserted by the transmitting TCU hardware. The resync parameter is contained in the lower 5 bits of this field while the upper 3 bits are always zeros. After a TCU receives a command message and verifies the header FCS, the TCU will load the resync counter with the 5 bit resync parameter received. The resync parameter is a switch selectable value for each TCU. Each TCU on a data trunk must have a unique resync parameter whose value must not be greater than the number of TCUs on the trunk. This relates to the contention scheme used in this device. This field is valid only for command messages. In a response message this portion in the header is used to transfer status information with the response.

The FROM address field is the sixth byte of the header field. The FROM address specifies the logical TCU which sent the message. For all messages the sending TCU logical address switch setting is the FROM address transmitted. When a command header field is received, the FROM address is stored in a register. The contents of this register is then sent as the TO address parameter in the response message.

The length field is the seventh and eighth bytes of the header field. This field defines the number of 16 bit words which are to be transferred in the information field. The data FCS word is not included in this count. The seventh byte of the header contains the high order length count while the eighth byte contains the low order length count.

The header FCS field is the ninth and tenth bytes of the header. These bytes define the end of the header field and are used to validate the correct reception of this field. The FCS used is a cyclic redundancy checking algorithm using the CCITT recommendation V.41 generator polynomial of x to the 16th plus x to the 12th plus x to the 5th plus 1. A TCU has its FCS remainder register initialized to all ones before a message is transmitted or received. Each byte transmitted is premultiplied by x to the 16th and divided by the generator polynomial to obtain a remainder. The TCU transmits the complement of the final remainder. If the message is received without errors, the final FCS remainder in the receiving TCU is a predetermined number.

The data field is made up of two parts, the information field and the information FCS.

The information (I) field is only present if the length field in the header is non-0. It contains the data which is transferred between higher level processes that exist in units attached to the trunk. Since the data length control is all contained in the header field, the I field consists of a variable number of bytes which are code and character independent. The length of the I field must be an even number of 8 bit bytes and a length of 0 is specifically permitted.

The information frame check sequence field is present only if the length field in the header is non-0. This field consists of 16 bits of frame checking which are generated from the contents of the I field in the same manner in which the header FCS field is generated.

The TCU automatically inserts and deletes two sync character bytes between the last bit of the header FCS and the first bity of the information field. This is to allow the TCU time to reset its FCS registers to all ones before processing the information field. These bytes are referred to as the trunk fill bytes. The TCU automatically sends two bytes at the end of each message to act as trunk fill bytes. This is required to allow the receiving TCU adequate time to receive the last byte of the message before the trunk ready signal goes inactive.

The trunk contention mechanism functions to eliminate trunk contention situations by assigning to each TCU, a specific time interval when transmitting onto the trunk is permitted. Each TCU on the trunk is assigned a time interval by means of a hardware scanner which is divided into slots and subslots. There must be at least one slot for each TCU but additional slots are permitted. One slot time must be greater than twice the total transmission line propagation delay. A TCU according to the present invention can be designed with a time slot which readily allows a 2,000 to 3,000 foot long coaxial cable for the data network. Each TCU on a trunk is assigned a unique resync slot number and has its own resync counter which keeps the TCU approximately synchronized with all other TCUs. When a TCU detects a command message on the trunk, it stops clocking the resync counter and processes the header field. If the message was received correctly and the header FCS was correct, the TCU sets its resync counter to the resync number of the TCU which sent the message. The sender resync number is the resync parameter received in the command header field. The TCU receiving the message waits for the Data Ready signal from the data set to drop out while the other TCUs are waiting for the channel active signal from the data set to drop out. The Data Ready signal drops after the last bit of data while the data set has an internal wait for a predetermined time after the last data bit before dropping the channel active signal. When the Data Ready signal drops, the TCU which accepted the message will send data bits of all ones down the data trunk until it can transmit the response message. This keeps the channel active signal high for all the TCUs and prevents them from incrementing their resync counters. The channel active signal to the TCUs will drop out a predetermined time after the response message is sent, enabling the TCU resync counters to count. From this point each TCU will increment its resync counter once every predetermined time interval for as long as there is no message transmitted onto the data trunk. Since the clock of each TCU is not synchronized to all the other clocks, the TCUs would drift out of synchronism with one another if there was no message traffic or the data trunk for a period of time. To prevent this, each TCU also has a contention counter. This counter is incremented each time the TCU reaches its slot time on the data trunk. This counter is reset whenever a transmission is detected on the trunk. When the counter reaches a predetermined count, the TCU sends a trunk resync message down the trunk to keep all the TCUs in synchronism.

A TCU may begin transmitting a command message only in the first predetermined small time interval portion of the trunk slot time. This predetermined small time interval may be approximately 10 percent of the entire slot time. Thus, all TCUs on the data trunk will see the trunk go active during the transmitting TCUs slot time. This will inhibit any TCU from incrementing a resync counter within the transmitting TCU slot time due to physical locations on the data trunk table.

This hardware scanner technique provides access to the data trunk for the TCUs on a rotating priority basis. This prevents any TCU from being locked out of the trunk. A contention channel system consistent with the preceding description is explained in detail in copending application, Ser. No. 903,345 filed May 5, 1978 entitled "Method and Apparatus for Eliminating Conflicts on a Communication Channel" and now issued as U.S. Pat. No. 4,199,661.

The hardware response status field is the status of the TCU, TCI and processor which is returned in each response message transmitted. The hardware response status consists of three 8 bit bytes which respresent three parameters which are sent as the third, fourth and fifth bytes of the response header field.

The first parameter of the hardware response status field has 8 bits which are represented as follows. The first bit is set when a command message is received in which the function field either has bit one set to enable TCU diagnostics or the command function is to enable the TCI diagnostics.

The second bit is set when a parity error is detected on data being written into the TCU input buffer. This status is cleared by master clear or when the data set channel active signal is low. The third bit is set when a parity error is detected on the TCU TCI bus by the TCU. This status is cleared by master clear or when the data set channel active signal is low.

The third bit is set when a parity error is detected on data loaded into the TCU parallel to serial register. This bit is cleared by master clear or when the data set channel active signal is low.

The fifth bit is set if the TCU output buffer was empty when data was loaded into the parallel to serial register and the length count was not zero.

The sixth bit is set if the TCU input buffer word counter equal 15 when a word is written into the input buffer.

The seventh bit is set whenever the TCU detects an FCS error on either the header or information fields.

The eighth bit is set to zero if an abnormal condition is found by the TCU.

The second parameter of the hardware response data field has 8 bits which are defined as follows. The first bit is set when a TCU is unable to connect to the TCI.

The second bit is set by the TCI to indicate it has detected an abnormal condition and represents an error signal. Such conditions may include those where a data transfer is completed but the data buffer is either still full or not empty.

The third bit is set when the processor has stopped.

The fourth bit is set when the processor has detected a memory parity error or when the processor is master cleared.

The fifth bit is set when the NAD control function is attempted through a TCU which is not enabled to execute a NAD control function or when the length field for a command function is incorrect or if the response bit of the function field is set in a command message received from the data trunk.

The sixth bit is set when the TCU data length counter or Rx word counter is not equal to zero.

The seventh bit is set by the TCI when it detects a parity error on the TCI bus or data from the TCU during a Rx or on data from the NAD memory during a Rx sequence.

The eighth bit is set if the TCI processor fails to provide a response message within a predetermined time of receiving a Rx command interrupt or if in the data streaming mode no response command message is provided within a predetermined time of receiving a Rx command/Tx sequence interrupt signal.

The third parameter of the hardware response status field is used if the TCU detects an abnormal condition. This 8 bit byte shows the 8 bits of the TCU sequencer address which detected the abnormal condition. The most significant bit of the TCU error address is in bit 7 of the parameter 1 status. If no abnormal condition has been found, this byte will be all 0s.

There are six interrupt conditions which the TCU may send to the TCI to indicate that the TCU has completed an operation. The interrupts are defined as follows: abnormal end of Rx command—this interrupt indicates that the TCU detected an abnormal condition while receiving a command message. Abnormal end of Rx sequence—this interrupt indicates the TCU detected an abnormal condition while transmitting a response message. Abnormal end of Tx sequence—this interrupt indicates that the TCU detected in abnormal condition while transmitting a command message or receiving a response message. End of Rx command—this interrupt indicates that the TCU has completed receiving an error free command message. End of Rx sequence—this interrupt indicates the TCU has completed transmitting an error free response message. End of Tx sequence—this interrupt indicates the TCU has completed transmitting an error free command message and received an error free response message. Stream mode time out warning—this interrupt indicates the processor must provide a response message or Tx command within a predetermined time interval to prevent the TCU from sending a hardware response message or terminating the Tx command stream mode sequence.

The trunk resync message is initiated by the TCU hardware in order to keep all of the TCUs on a trunk synchronized. Since this message is directed to all TCUs on the trunk, the TCU which transmits this message puts its own logical address into the TO address parameter field. This prevents all of the TCUs receiving this message from generating a response message.

The stream mode is initiated by higher level protocols within the NAD microprocessors to transfer large blocks of data. The stream mode is the only trunk operation in which the trunk is not available ot other TCUs between command response message frames. The trunk is dedicated to the two TCUs in stream mode until operation is completed or until an error is detected by either of the NADs.

When receiving a command message the TCU interrogates the TCI stream mode line only after sending the TCI end of Rx command interrupt. If the stream mode line is active, the TCU will capture the trunk by setting the send request and sending binary ones continuously down the data trunk. If the processor does not supply a response message within a predetermined time interval of when the interrupt was sent, the TCU will send a stream mode time out warning interrupt to the TCI. If no response is received within a predetermined time interval of this interrupt, the TCU will send a hardware response to the originating TCU. The originating TCU NAD processor should drop that TCU out of stream mode on receipt of the message. A processor stream mode error status and abnormal end of Rx sequence interrupt are sent to the processor which will terminate stream mode in the receiving TCU.

When receiving a response message the TCU interrogates the stream mode line only after sending a Tx sequence interrupt to the TCI. If the stream mode line is active, the TCU will capture the trunk and wait a predetermined time interval for a new Tx message from the processor. A stream mode time out warning interrupt is sent to the TCI if a Tx message is not received within this predetermined time interval. If a Tx message is not received within a predetermined time interval of this interrupt message, the TCU will release the trunk, that is drop the send request signal, and will send a processor stream mode error status and abnormal end of Tx sequence interrupt to the TCI which will terminate stream mode in the originating TCU. Releasing the trunk will cause the remote TCU to drop out of stream mode.

Since every microcode instruction is actually a jump instruction, a next address field is specified with each instruction. Sequential memory referencing is provided by using the current address as the hardware condition being tested. The sequencer had a unique diagnostic feature called an error address register.

The TCU Microcode Sequencer performs four basic functions.

1. It provides timed pulses to clock various hardware registers.

2. It provides signals to transfer data onto the internal hardware bus from various source registers.

3. It provides a latch mechanism to store program flags.

4. It provides a mechanism to perform conditional microcode jumps dependent on the condition of the specific hardware condition being tested.

The sequencer has no data manipulation or program subroutine capabilities. The sequencer is constructed such that the least significant address bit (LSB) for the next address is dependent on the hardware condition being tested. If the hardware condition being tested is true, the LSB of the next address is forced to a logical one, if the condition being tested is false, the LSB of the next address is forced to a logical zero. since every instruction is actually a jump instruction, a next address field is specified with each instruction. Sequential memory referencing is provided by using the LSB of the current address as the hardware condition being tested. The sequencer has a unique diagnostic feature called an error address register. This register is loaded by a field decoded from the microinstruction. The data loaded into this register is the 10 bits of the address of the instruction preceding the instruction containing the load command. This provides a unique and very informative pointer to each abnormal condition detected by the sequencer while using a common error handling routine.

What is claimed is:

1. A network access device adapted to be connected to a data trunk for transmitting and receiving messages from said data trunk and for interconnecting various computer devices to said data trunk, said network access device comprised of:
  a data set for receiving and transmitting data into and out of the network access device for connection to a data trunk,
  a trunk control unit connected to said data set for bi-directional communication into and out of said trunk and for transmitting at least first and second types of command messages and for receiving at least first and second types of response messages, a first type of command message being generated by said trunk control unit to indicate the status of said trunk control unit and a first type of response message being used by said trunk control unit to control the status of said trunk control unit,
  a trunk control interface connected to said trunk control unit and having means for connection with at least one additional trunk control unit for buffering of data transmitted to and received from said trunk control unit, said trunk control interface being responsive to control signals to respond to said trunk control unit in a selected function from a group of available functions, said available functions including receiving data from or transmitting data into said data trunk, a network access device internal bus connected to said trunk control interface, a network access device processor operating as a microcode sequencer and issuing output control signals connected with said internal bus for controlling said trunk control interface and trunk control unit by generating addressed status and interrupt control signals to said trunk control interface and to said trunk control unit, said processor generating at least some of said addressed control signals in response to signals received from said trunk control interface and said trunk control unit, said processor also generating a second type of command message and receiving a second type of response message to control the network access device, a trunk control unit input bus connected to said trunk control unit and said data set to receive signals from said data set and which is accessed by a number of tri-state drivers included in said trunk control unit each of which is controlled by said microcode sequencer logic and clock signals produced by said network access device processor and transferred by said trunk control interface to control access to said trunk control unit input bus at predetermined times according to said microcode sequence, an internal network access device memory connected with said internal bus, and a device interface connected with said internal bus for communication through said trunk control interface to said trunk control unit and to said data trunk through said data set and having an output device channel adapted for connection to an appropriate computer device.

2. The network access device of claim 1 wherein said trunk control interface is connected with a plurality of trunk control units each of which has an associated data set for connection to a data trunk.

3. The network access device of claim 1 wherein said device interface includes a message counter-comparator and an address counter-comparator each of which is connected to receive signals from said network access device internal bus, each of which respectively compares by issuing a compare output signal the message length and address used with header information received on a command message on said internal bus to use in determining that the data message has been correctly received.

4. The network access device of claim 1 in which said trunk control unit includes an input holding register and an input buffer connected to said trunk control unit input bus, a plurality of tri-state drivers connected to said input buffers to drive an output bi-directional data bus connected with said trunk control interface, an input word counter connected with said input buffer, an output word counter connected with said input buffer wherein said counters are controlled by an input header portion of a command message received from said data trunk and decrement to zero as said message is supplied to said input buffer and out of said input buffer to said trunk control interface wherein a zero count is used to determine that a message has been fully transitted.

5. The network access device of claim 4 wherein said trunk control unit is further comprised of internal latches responsive to said network access device processor to receive and store microcode instructions prior to a time when used and responsive to clock signals from said network access device processor to generate a microcode sequencing function to perform selected functions in a predetermined sequence.

6. The network access device of claim 4 wherein said trunk control unit is further comprised of logic means connected to said trunk control unit input bus for producing FCS check characters to be sent in command messages in both a header portion and a data portion of said message in response to microcode latch instructions received from said network access device processor in sequence in response to clock signals.

7. The network access device of claim 1 wherein said trunk control interface includes a trunk control unit control latch for receiving status information from said trunk control unit with respect to the mode of operation of said trunk control unit.

8. The network access device of claim 1 wherein said trunk control unit is further comprised of a function register, an internal trunk control unit input bus connected to receive signals from said data set and connected to said function register to provide the contents of said function register from said data set, a decoder receiving the contents of said function register and producing an output control signal, said function register and decoder being responsive to clocking signals from said network access device processor to selectively receive data from said trunk control unit input bus at a predetermined time in a sequence of timed operations.

9. The network access device of claim 8 wherein said trunk control unit further comprises an input buffer connected to said trunk control unit input bus, an input buffer counter connected to said input buffer, means responsive to said counter to indicate when said buffer is either full or empty and logic means connected to said means responsive to said counter for sending an error signal on said data trunk in response to said trunk control unit buffer being full.

10. The network access device of claim 1 wherein said trunk control unit includes logic means for responding to said first type of command message received from said data set with a first type of response message sent to said data set indicating an error or a diagnostic within a predetermined time in the absence of second type of response message control of said trunk control unit by said network access device processor.

11. The network access device of claim 1 wherein said trunk control unit is comprised of:
an instruction address holding register for holding each instruction address in a received message from said data set during execution by said network access device so that it is not last,
an error detection logic means connected to said instruction address holding register for detecting an error status in the trunk control unit, and
means connected to said error detection logic means for sending a first type of command message to said data set indicating an error status in response to a signal from said error detection logic means, said message containing a portion which consists of the instruction address received from said instruction address holding register which resulted in the error status.

12. The network access device of claim 11 wherein said trunk control unit includes means for resynchronization with said data trunk including the trunk control unit generating said second type of command message in response to microcode instructions from said network access device internal processor as part of a predetermined microcode sequence of operations.

13. The network access device of claim 12 wherein said data set provides data in a serial mode to said trunk control unit and wherein said trunk control unit includes a serial to parallel interface logic unit connected to said trunk control unit internal bus and an input holding register wherein data is received in bit serial form and output in byte parallel form to said trunk control interface.

14. The network access device of claim 13 wherein said trunk control unit includes a plurality of tri-state drivers connected to said trunk control unit internal bus each of which is controlled by microcode sequence logic signals provided by said network access device internal processor to control access to said trunk control unit input bus at predetermined times.

15. The network access device of claim 1 wherein said trunk control interface includes a trunk control unit control latch for receiving status information from said trunk control unit with respect to the mode of operation of said trunk control unit.

16. A network access device comprised of:
a data set adapted to be connected to a data trunk,
trunk control unit means connected to said data set for bi-directional communication into and out of said trunk and for transmitting first and second types of command messages and for receiving response messages, and wherein for each command message sent as the response to a received message, the command message provides status information about the network access device,
wherein said trunk control unit is comprised of:
an instruction address holding register for holding each instruction address in a received message from said data set during execution by said network access device so that it is not lost,
an error detection logic means connected to said instruction address holding register for detecting an error status in the trunk control unit, and
means connected to said error detection logic means for sending a first type of command message to said data set indicating an error status in response to a signal from said error detection logic means, said first type of command message containing a portion which consists of the instruction address received from said instruction address holding register which resulted in the error status, a trunk control interface connected to said trunk control unit for buffering of data, said trunk control interface having means for connection to at least one additional trunk control unit, and wherein said trunk control interface includes a control latch for receiving status information from said trunk control unit with respect to the mode of operation of said trunk control unit,
a network access device internal bus connected to said trunk control interface,
a network access device microprocessor connected with said internal bus for controlling said trunk control interface and trunk control unit by generating addressed control signals to said trunk control interface and said time control unit,
an internal network access device memory connected with said internal bus, and
a device interface connected with said internal bus for communication through said trunk control interface to said trunk control unit and to said data network through said data set and having an output device channel adapted for connection to an appropriate computer device.

17. The network access device of claim 16 wherein said trunk control unit includes a trunk control unit input bus connected to a plurality of tri-state drivers each of which is controlled by microcode sequence logic generated by said network access device microprocessor to control access to said trunk control unit input bus at predetermined times according to said microcode sequence, and wherein said trunk control unit includes at least one instruction holding register latch means connected to said input bus for holding microcode instructions from said processor received prior to the time of execution and which are latched until the time of execution according to said microcode sequence.

18. The network access device of claim 17 in which said trunk control unit includes an input buffer connected to said trunk control unit input bus, a plurality of output tri-state drivers connected to said input buffer an output bi-directional data bus connected with said trunk control interface and to said output tri-state drivers, an input word counter connected with said input buffer and an output word counter connected with said input buffer wherein said counters are controlled by an input header portion of a second type of command message and decrement to zero as said message is supplied to said input buffer and out of said input buffer to said trunk control interface wherein a zero count is used to determine that a message has been fully transmitted.

* * * * *